United States Patent
Law et al.

(10) Patent No.: US 11,836,706 B2
(45) Date of Patent: Dec. 5, 2023

(54) SYSTEMS AND METHODS FOR FACILITATING A TRANSACTION USING A VIRTUAL CARD ON A MOBILE DEVICE

(71) Applicant: sticky.io, Inc., San Francisco, CA (US)

(72) Inventors: Simon Law, Mississauga (CA);
Michael Shvartsman, Miami, FL (US);
Pierre Antoine Roberge, Toronto (CA);
Peter Thien Duong, Mississauga (CA)

(73) Assignee: sticky.io, Inc.

( * ) Notice: Subject to any disclaimer, the term of this patent is extended or adjusted under 35 U.S.C. 154(b) by 0 days.

(21) Appl. No.: 14/395,457

(22) PCT Filed: Apr. 16, 2013

(86) PCT No.: PCT/CA2013/050294
§ 371 (c)(1),
(2) Date: Oct. 17, 2014

(87) PCT Pub. No.: WO2013/155627
PCT Pub. Date: Oct. 24, 2013

(65) Prior Publication Data
US 2015/0134540 A1    May 14, 2015

Related U.S. Application Data

(60) Provisional application No. 61/713,302, filed on Oct. 12, 2012, provisional application No. 61/673,096, (Continued)

(51) Int. Cl.
*G06Q 20/34* (2012.01)
*G06Q 20/32* (2012.01)
(Continued)

(52) U.S. Cl.
CPC ........... *G06Q 20/351* (2013.01); *G06Q 20/02* (2013.01); *G06Q 20/20* (2013.01); *G06Q 20/229* (2020.05);
(Continued)

(58) Field of Classification Search
CPC .. G06Q 20/1235; G06Q 20/305; G06Q 20/38; G06Q 30/0239; G06Q 50/12;
(Continued)

(56) References Cited

U.S. PATENT DOCUMENTS 5,237,627 A    8/1993   Johnson et al.
5,706,330 A    1/1998   Bufferd et al.
(Continued)

FOREIGN PATENT DOCUMENTS

CA    2682610 A1    10/2008
CA    2730175 A1    1/2010
(Continued)

OTHER PUBLICATIONS

Asokan et al.; "The State of the Art in Electronic Payment Systems", IEEEComputer, vol. 30 No. 9, Sep. 1997.
(Continued)

*Primary Examiner* — Mohammad A. Nilforoush
(74) *Attorney, Agent, or Firm* — Perry + Currier

(57) ABSTRACT

Systems and methods are provided for facilitating contactless payment using cloud-based wallet containing payment credentials (e.g. Visa, Mastercard, American Express) using a near field communication (NFC)-capable device and payment gateway servers. A user can use their existing payment card, herein referred to as a funding card, for contactless payments. A second payment card, herein referred to as a virtual card, is generated. The virtual card is associated with the funding card on a payment gateway server. The virtual card is used on a NFC-enabled mobile device. When a
(Continued)

payment is initiated, the virtual card data is sent through the NFC system from a point of sale terminal. This information is sent to the payment gateway server, which retrieves the funding card to make the payment. The funding card, not the virtual card, is used to transfer the money to make payment.

14 Claims, 31 Drawing Sheets

Related U.S. Application Data filed on Jul. 18, 2012, provisional application No. 61/624,947, filed on Apr. 16, 2012.

(51) Int. Cl.
```
G06Q 20/40      (2012.01)
G06Q 20/20      (2012.01)
G06Q 20/38      (2012.01)
G06Q 20/02      (2012.01)
G06Q 20/22      (2012.01)
```

(52) U.S. Cl.
CPC ....... *G06Q 20/3278* (2013.01); *G06Q 20/385* (2013.01); *G06Q 20/40* (2013.01); *G06Q 20/409* (2013.01); *G06Q 20/4012* (2013.01)

(58) Field of Classification Search
CPC ............. G06Q 20/023; G06Q 30/0248; G06Q 20/065; G06Q 20/356; G06Q 30/0617; G06Q 30/0635; G06Q 20/3226; G06Q 20/405; G06Q 20/4093; G06Q 20/325; G06Q 20/42; G06Q 30/061; G06Q 50/30; G06Q 20/204; G06Q 20/24; G06Q 20/384; G06Q 20/00–425; H04L 51/14; H04L 51/20; H04L 511/26; H04L 61/103
See application file for complete search history.

(56) References Cited

U.S. PATENT DOCUMENTS

| | | | |
|---|---|---|---|
| 5,787,175 A * | 7/1998 | Carter | G06F 21/6209 707/999.008 |
| 5,838,812 A * | 11/1998 | Pare, Jr. | G06Q 20/4097 382/115 |
| 5,991,413 A | 11/1999 | Arditti et al. | |
| 6,052,675 A | 4/2000 | Checchio | |
| 6,195,542 B1 | 2/2001 | Griffith | |
| 6,332,135 B1 | 12/2001 | Conklin et al. | |
| 6,363,488 B1 | 3/2002 | Ginter et al. | |
| 6,493,685 B1 | 12/2002 | Ensel et al. | |
| 6,650,887 B2 | 11/2003 | McGregor et al. | |
| 6,807,410 B1 | 10/2004 | Pailles et al. | |
| 6,868,391 B1 | 3/2005 | Hultgren | |
| 6,871,276 B1 | 3/2005 | Simon | |
| 6,901,387 B2 * | 5/2005 | Wells | G06Q 20/04 705/35 |
| 6,963,857 B1 | 11/2005 | Johnson | |
| 6,968,316 B1 | 11/2005 | Hamilton | |
| 6,978,380 B1 | 12/2005 | Husain et al. | |
| 6,980,796 B1 | 12/2005 | Cuellar et al. | |
| 7,016,875 B1 | 3/2006 | Steele et al. | |
| 7,146,159 B1 | 12/2006 | Zhu | |
| 7,184,747 B2 | 2/2007 | Bogat | |
| 7,209,890 B1 | 4/2007 | Peon et al. | |
| 7,343,174 B2 | 3/2008 | Suryanarayana et al. | |
| 7,373,515 B2 | 5/2008 | Owen et al. | |
| 7,447,494 B2 | 11/2008 | Law et al. | |
| 7,488,886 B2 | 2/2009 | Kemp | |
| 7,596,530 B1 | 9/2009 | Glasberg | |
| 8,655,782 B2 | 2/2014 | Poon et al. | |
| 9,424,413 B2 * | 8/2016 | Hammad | G06F 21/34 |
| 2002/0059146 A1 * | 5/2002 | Keech | G06Q 20/10 705/64 |
| 2002/0147658 A1 | 10/2002 | Kwan | |
| 2003/0005896 A1 | 1/2003 | Jacobsen et al. | |
| 2003/0009672 A1 * | 1/2003 | Goodman | H04N 1/32776 713/176 |
| 2003/0119478 A1 | 6/2003 | Nagy et al. | |
| 2003/0126094 A1 | 7/2003 | Fisher et al. | |
| 2003/0154165 A1 | 8/2003 | Horn et al. | |
| 2003/0182228 A1 | 9/2003 | Wolf | |
| 2003/0191945 A1 | 10/2003 | Keech | |
| 2003/0200184 A1 | 10/2003 | Dominguez et al. | |
| 2004/0032495 A1 | 2/2004 | Ortiz | |
| 2004/0088250 A1 | 5/2004 | Bartter et al. | |
| 2004/0122685 A1 | 6/2004 | Bunce | |
| 2004/0159700 A1 | 8/2004 | Khan et al. | |
| 2004/0176071 A1 | 9/2004 | Gehrmann et al. | |
| 2005/0160051 A1 | 7/2005 | Johnson | |
| 2005/0188005 A1 | 8/2005 | Tune | |
| 2005/0234833 A1 | 10/2005 | VanFleet et al. | |
| 2006/0054688 A1 * | 3/2006 | Rose | G06Q 20/4014 235/380 |
| 2006/0080111 A1 | 4/2006 | Homeier-Beals | |
| 2006/0085357 A1 | 4/2006 | Pizarro | |
| 2006/0136334 A1 | 6/2006 | Atkinson et al. | |
| 2006/0206709 A1 * | 9/2006 | Labrou | G06Q 20/4014 713/167 |
| 2007/0083465 A1 | 4/2007 | Ciurea et al. | |
| 2007/0112671 A1 | 5/2007 | Rowan | |
| 2007/0125838 A1 | 6/2007 | Law et al. | |
| 2007/0198432 A1 | 8/2007 | Pitroda et al. | |
| 2007/0244811 A1 | 10/2007 | Tumminaro | |
| 2007/0270124 A1 | 11/2007 | Johnson et al. | |
| 2007/0288377 A1 | 12/2007 | Shaked | |
| 2008/0010191 A1 | 1/2008 | Rackley. III et al. | |
| 2008/0046363 A1 | 2/2008 | Ali et al. | |
| 2008/0126145 A1 | 5/2008 | Rackley, III et al. | |
| 2008/0162318 A1 | 7/2008 | Butler et al. | |
| 2008/0237340 A1 | 10/2008 | Emmons et al. | |
| 2008/0288405 A1 | 11/2008 | John | |
| 2008/0294556 A1 | 11/2008 | Anderson | |
| 2009/0006254 A1 * | 1/2009 | Mumm | G06Q 20/385 705/44 |
| 2009/0098854 A1 | 4/2009 | Park et al. | |
| 2009/0119209 A1 | 5/2009 | Sorensen et al. | |
| 2009/0164371 A1 | 6/2009 | Arroyo et al. | |
| 2009/0177581 A1 | 7/2009 | Garcia et al. | |
| 2009/0228816 A1 | 9/2009 | Vilmos | |
| 2010/0030698 A1 | 2/2010 | Goodin | |
| 2010/0064349 A1 | 3/2010 | Randle et al. | |
| 2010/0106643 A1 * | 4/2010 | Adiseshann | G06Q 20/3255 705/42 |
| 2010/0114681 A1 | 5/2010 | Mohsenzadeh | |
| 2010/0125516 A1 * | 5/2010 | Wankmueller | G06Q 40/00 705/35 |
| 2010/0144314 A1 | 6/2010 | Sherkin et al. | |
| 2010/0274691 A1 * | 10/2010 | Hammad | G06Q 20/3224 705/30 |
| 2011/0078079 A1 * | 3/2011 | Shin | G06Q 20/322 705/44 |
| 2011/0082767 A1 | 4/2011 | Ryu et al. | |
| 2011/0113237 A1 | 5/2011 | Hird et al. | |
| 2011/0153498 A1 | 6/2011 | Makhotin et al. | |
| 2011/0161201 A1 | 6/2011 | Stocker | |
| 2011/0161233 A1 * | 6/2011 | Tieken | G06Q 20/4014 705/71 |
| 2011/0184867 A1 | 7/2011 | Varadarajan | |
| 2011/0246324 A1 | 10/2011 | Keresman, III et al. | |
| 2011/0313898 A1 | 12/2011 | Singhal et al. | |
| 2012/0116902 A1 | 5/2012 | Cardina et al. | |
| 2013/0282582 A1 * | 10/2013 | Pereira | G06Q 20/20 705/44 |

FOREIGN PATENT DOCUMENTS

| | | | |
|---|---|---|---|
| CN | 1399216 A | | 2/2003 |
| CN | 106850699 A | * | 6/2017 |
| EP | 1164777 A2 | | 12/2001 |

(56) References Cited

FOREIGN PATENT DOCUMENTS

| GB | 2372615 A | 8/2002 |
|---|---|---|
| GB | 2476989 A | 7/2011 |
| WO | WO-0225495 A1 | 3/2002 |
| WO | WO-2003023674 A1 | 3/2003 |
| WO | WO-2008005018 A2 | 1/2008 |
| WO | WO-2008019216 A2 | 2/2008 |
| WO | WO-2008033960 A2 | 3/2008 |
| WO | WO-2008103882 A2 | 8/2008 |
| WO | 2009112793 A1 | 9/2009 |
| WO | WO-2012014231 A1 | 2/2012 |

OTHER PUBLICATIONS

"Bill Minder 2.0," Apple iPhone School, retrieved from URL <http://www.appleiphoneschool.com/2009/08/20/billminder-20-coming-soon/> on Dec. 13, 2012; Aug. 20, 2009; 7 pgs.

International Preliminary Report on Patentability for International Patent Application PCT/CA2013/050294, dated Oct. 30, 2014, 6 pages.

International Search Report and Written Opinion for International Application No. PCT/CA2013/050294, dated Aug. 12, 2013, 8 pages.

International Search Report in PCT/CA2009/000946; dated Oct. 1, 2009; 4 pages.

International Search Report in PCT/CA2011/000197; dated Jul. 6, 2011; 3 pages.

International Search Report in PCT/CA2011/050771; dated Apr. 18, 2012; 5 pages.

Kungpisdan et al.; "A Secure Account-Based Mobile Payment Protocol", IEEE Proceedings of the International Conference on Information Technology, Apr. 2004.

Kungpisdan, "Modelling, Design and Analysis of Secure Mobile Payment Systems"; Monash University, 2005.

Li et al.; "Undeniable Mobile Billing Schemes", Proceedings of the 4th European Conference on Public Key Infrastructure: Theory and Practice, Jun. 2007.

Murdoch, S. et al.; "Verified by Visa and MasterCard SecureCode: or, How not to Design Authentication"; Financial Cryptography and Data Security '10; Jan. 25 to 28, 2010; Tenerife (pre-proceedings draft).

"Verified by Visa System Overview"; Verified by Visa; Visa International Service Association; External Version 1.0.2; Dec. 30, 2006; Copyright 2002-2006 External Version 70040-01.

Supplementary Search Report in EP2310996A1; dated Jul. 11, 2012; 7 pages.

Visa, "3-D Secure TM Mobile Authentication Scenarios", Version 1.0, Jun. 30, 2002. [Retrieved on Feb. 6, 2012]. Retrieved from the Internet at URL:http://citeseerx.ist.psu.edu/viewdoc/download?doi=10.1.1.199.4148&rep-=rep1&type=pdf.

Notification of the First Office Action and its English Translation dated Dec. 23, 2016 for Chinese Patent Application No. 201380031768.9.

Extended European Search Report dated Dec. 17, 2015 for European Patent Application No. 13777771.0.

U.S. Appl. No. 12/500,395, filed Jul. 9, 2009, by Law et al.
U.S. Appl. No. 13/324.888, filed Dec. 13, 2011, by Law et al.
U.S. Appl. No. 13/324,905, filed Dec. 13, 2011, by Law et al.
U.S. Appl. No. 14/173,089, filed Feb. 5, 2014, by Poon et al.

Communication pursuant to Article 94(3) EPC dated Mar. 13, 2017 for European Patent Application No. 13777771.0.

CIPO, Examination Report, dated Feb. 2, 2018, re Canadian Patent Application No. 2909081.

\* cited by examiner

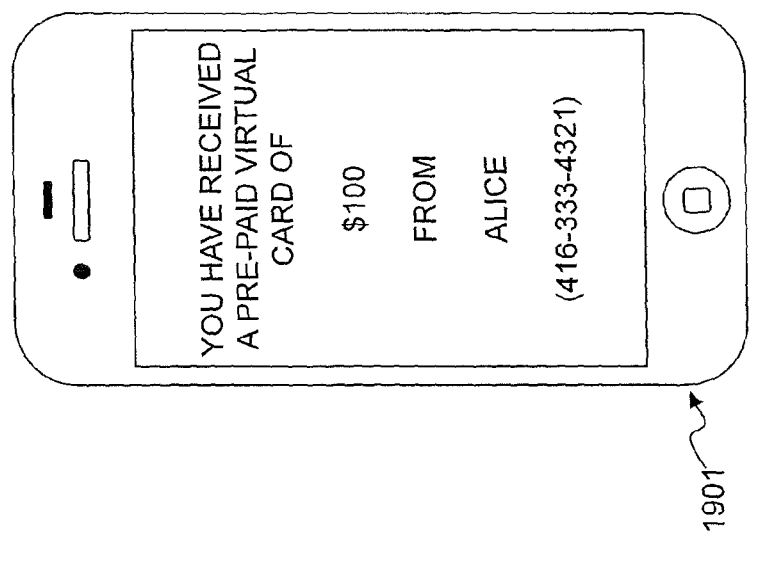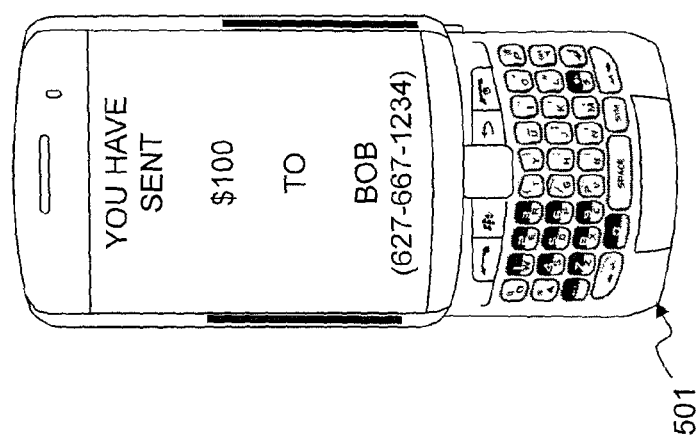
FIG. 22

SYSTEMS AND METHODS FOR FACILITATING A TRANSACTION USING A VIRTUAL CARD ON A MOBILE DEVICE

CROSS-REFERENCE TO RELATED APPLICATIONS

This application is the national stage of International (PCT) Patent Application No. PCT/CA2013/050294, filed Apr. 16, 2013, and published under PCT Article 21 (2) in English, which claims priority from: U.S. Provisional Application No. 61/624,947 filed on Apr. 16, 2012, and titled "SYSTEMS AND METHODS FOR MAKING A PAYMENT USING A MOBILE DEVICE"; U.S. Provisional Application No. 61/673,096 filed on Jul. 18, 2012, and titled "SYSTEMS AND METHODS FOR FACILITATING A TRANSACTION USING A VIRTUAL CARD ON A MOBILE DEVICE"; and U.S. Provisional Application No. 61/713,302 filed on Oct. 12, 2012, and titled "SYSTEMS AND METHODS FOR FACILITATING A PARTY-TO-PARTY VALUE TRANSFER USING A VIRTUAL CARD ON A MOBILE DEVICE". The entire contents of these applications are herein incorporated by reference.

TECHNICAL FIELD

The following relates generally to facilitating a payment transaction at a merchant location using a virtual card on a mobile device.

DESCRIPTION OF THE RELATED ART

Mobile devices can be used to facilitate a payment transaction, for example, in exchange for a good or service at a merchant store. A mobile device can be equipped with a near field communication (NFC) system which can be used to transfer the buyer's payment credential, such as credit card information, to a point of sale terminal that is also equipped with a NFC-compatible system to complete the payment transaction.

BRIEF DESCRIPTION OF THE DRAWINGS

Embodiments will now be described by way of example only with reference to the appended drawings wherein:

FIG. 22 is an example embodiment illustrating the sender's mobile device and the receiver's mobile device, after the tapping in FIG. 21, with both devices showing a GUI indicating that the party-to-party value transfer has been completed.

DETAILED DESCRIPTION

Figure 1:
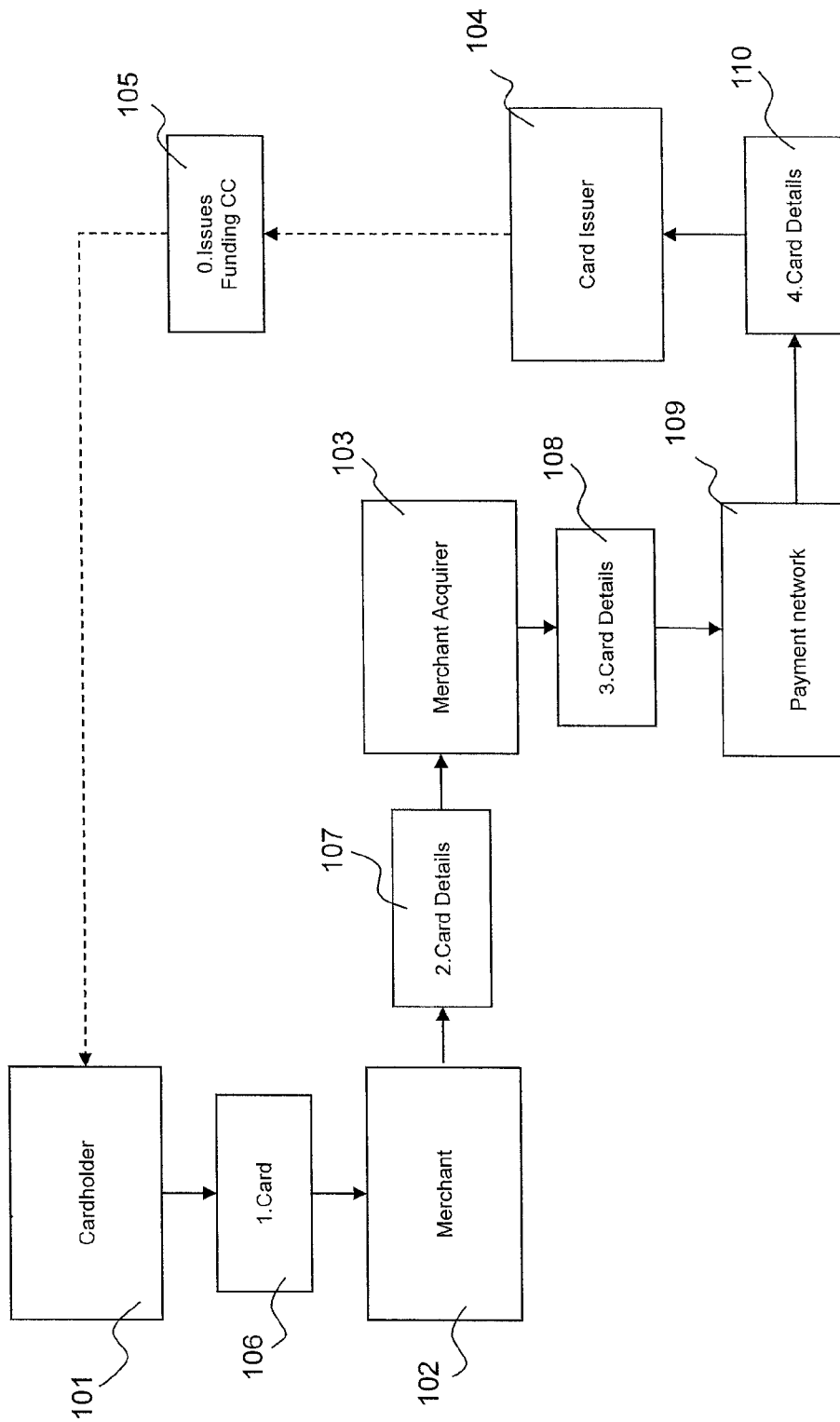
FIG. 1 is a schematic diagram of an example embodiment of a payment system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

FIG. 1 shows an example embodiment of a typical in-person payment flow between a cardholder 101, a merchant 102, a merchant acquirer 103, a payment network 109 and a card issuer 104. The merchant 102, the merchant acquirer 103, the payment network 109 and the card issuer are each associated with computing devices including processors and memory. By way of background, this payment flow is also known as a standard 4-party model, or a standard 4-party protocol. The card issuer 104 is typically a bank which is associated with a payment network. It facilitates the cardholder's use of the payment card to pay for goods or services based on the cardholder's promise to repay the card issuer for the purchase. Non-limiting examples of payment networks include Visa, MasterCard, American Express and Diners Club/Discover. The card issuer 104 issues the payment card, which is associated with a payment network 109, to the cardholder 101 (block 105). It is understood that all references to credit card would also apply to debit card, prepaid card, or other payment credentials used to facilitate payment at a merchant location. The term "funding card" is used herein to refer to debit cards, credit cards, prepaid cards, and the like.

To make a purchase or payment, the cardholder 101 (e.g. a person) provides funding card information to the merchant 102 (block 106). For example, the funding card can be "swiped" using a magnetic stripe card reader device, or the funding card number can be read to the merchant 102. The merchant 102 (e.g. a computing device) sends the payment authorisation, including the funding card details, to a merchant acquirer 103 (block 107). An acquirer 103 is an organization that collects payment-authorisation requests from merchants and facilitates the payment transaction with the payment network on behalf of the merchants.

When the acquirer 103 gets the funding card payment authorisation request, the acquirer submits the payment transaction (block 108) to the payment network 109.

When the payment network 109 receives the funding card payment authorisation request, the payment network forwards the payment transaction (block 110) to the card issuer 104 for payment authorisation.

When the card issuer 104 receives the payment transaction, it checks the transaction details for validity. This includes checking the card number, the expiration date, the funding card limit, etc. The card issuer 104 responds to the merchant acquirer 103 with a payment authorisation code (approved or declined response, transaction identification number, etc) via the payment network 109. The merchant acquirer 103 forwards the response to the merchant 102. Then the merchant 102 shares the payment authorisation results with the cardholder.

It is recognized that such an established computer payment system is well-established and is adopted by many users and large companies. It is recognized however, that such a computer payment system does not provide data processing means for making payments on a mobile device. Such a computer payment system also requires that the funding card details pass through the merchant 102 and the merchant acquirer 103, which can expose or reveal sensitive financial data. This security risk posed by such a computer payment system is undesirable.

Figure 2:
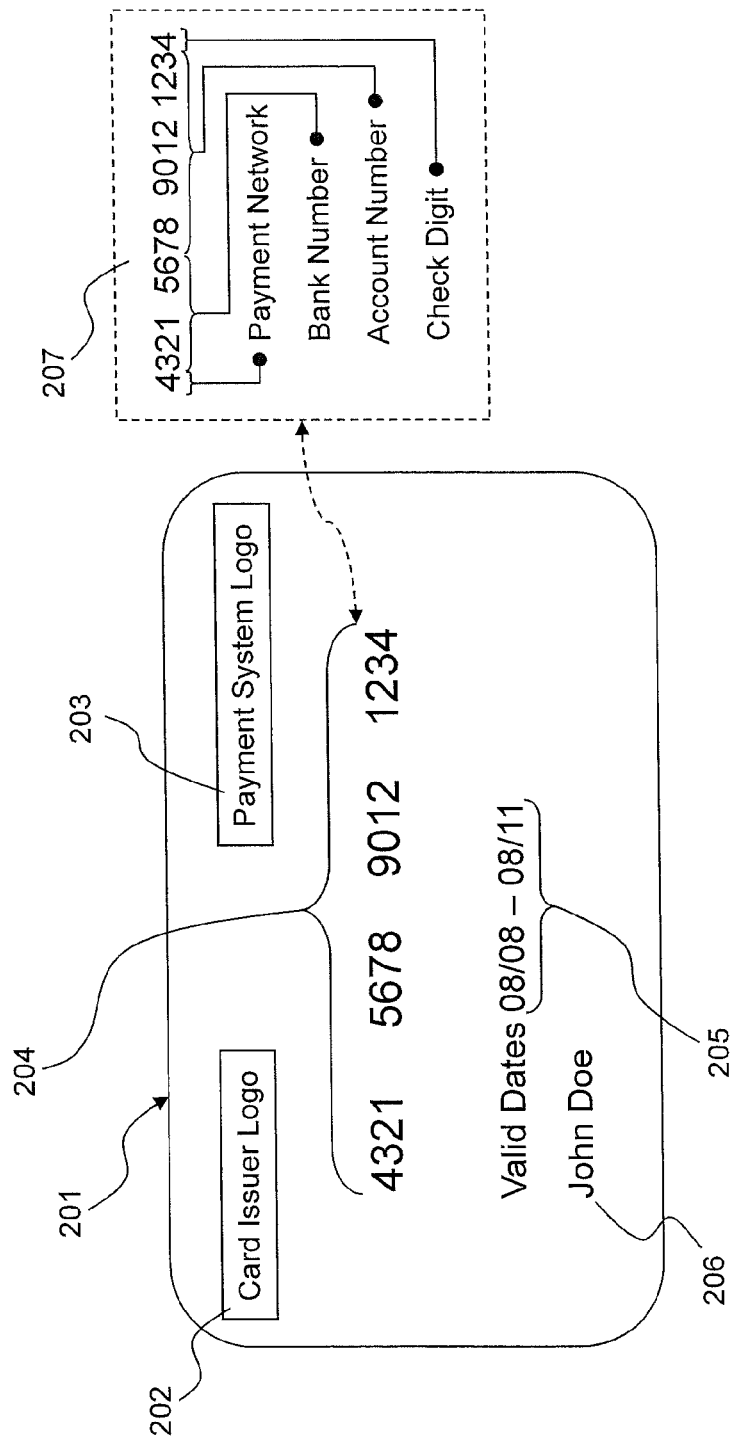
FIG. 2 is a schematic diagram of an example embodiment of one side of a funding credit card.
Figure 3:
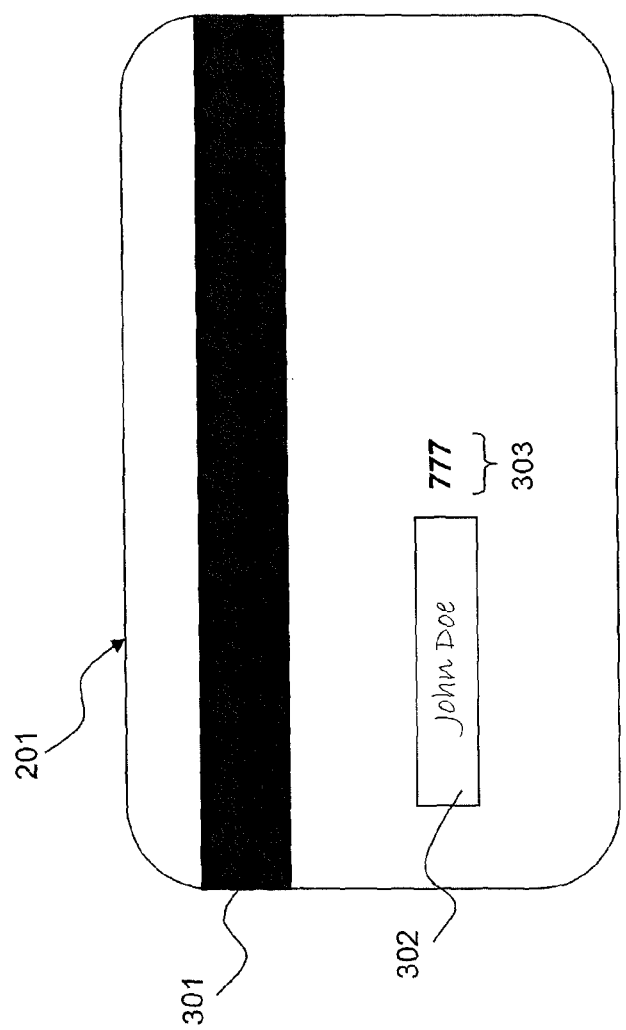
FIG. 3 is a schematic diagram of the other side of the funding credit card in FIG. 2.

By way of background, an example embodiment of a credit card 201 is shown in FIG. 2 and FIG. 3. One side of the credit card, as per FIG. 2, shows a logo 202 or mark identifying the card issuer. Typically, the card issuer is a bank. A logo 203 or mark is also shown to identify the payment network. The card 201 also shows the credit card number 204. The credit card number 204 is sometimes referred to as a primary account number (PAN). The length and format of the credit card number 204 varies depending on the card issuer and the payment network. Generally, the first digit in the credit card number 204 identified the payment network. The last digit of the credit card number 204 is a check digit. A check digit is a form of redundancy check used for error detection. The intermediary numbers can signify a bank number (e.g. associated with the card issuer) and an account number (e.g. of the bank).

In the example shown in FIG. 2, as per block 207, the first digit "4" identifies that Visa is the payment network. Digits two through six are the issuing bank identification number. Digits seven through fifteen are the account number. Digit sixteen is the check digit.

The credit card 201 also includes a range of dates 205 that the credit card is valid. The range of dates includes an expiry date of the credit card. The name 206 of the cardholder is also shown.

In FIG. 3, on the other side of the credit card 201, there is a magnetic strip 301, the signature 302 of the cardholder's name, and a static security code 303. The static security code is printed on the credit card 201.

The magnetic stripe 301, also sometimes referred to as a magstripe, is typically made up of tiny iron-based magnetic particles in a plastic-like film. The stripe 301 has information that is written on it.

Often there are two or three tracks on data encoded on the stripe 301. In an example embodiment, each track is about one-tenth of an inch wide. The ISO/IEC standard 7811, which is used by banks, specifies that track one is 210 bits per inch (bpi), and holds 79 6-bit plus parity bit read-only characters; track two is 75 bpi, and holds 40 4-bit plus parity bit characters; and track three is 210 bpi, and holds 107 4-bit plus parity bit characters. Other data formats may apply.

In an example embodiment, the format for Track Two, developed by the banking industry, is as follows (maximum of 40 characters):

Start sentinel—one character (generally ';')
Primary account number—up to 19 digits
Separator—one character (generally '=')
Expiration date—four digits in the form of the last two digits of the year, and the two digits representing the month (e.g. YYMM)
Service Code—three digits. The first digit specified the interchange rules, the second specifies authorisation processing and the third specifies the range of service
Discretionary data—balance of available space to fill the length of the Track Two (ex 10 digits if the PAN is 19 digits long)
End sentinel—one character (generally '?')
Longitudinal Redundancy Check (LRC)—one character The above data is herein generally referred to as Track Two data.

It is recognized, that in addition to the typical plastic card form factor, as shown in FIG. 2 and FIG. 3, there are a growing numbers of other form factors that can be used for payment. Non-limiting examples include a mini card, fob, mobile device, etc. It is also appreciated that other types of funding cards, in addition to credit cards, include similar information (e.g. PAN, expiry date, Track Two data, etc.).

The way the card data itself is stored on a funding card and shared with a payment terminal has many variants, such as storing the card data on a magnetic stripe and reading the data using a magnetic card reader, or storing the card data using chip technology and using a chip-reader compatible reader to interact with the card. For example, although not shown in FIG. 2 and FIG. 3, the credit card can include an integrated circuit or logic chip capable of performing computations. Various examples of chip-based card technology includes contactless magnetic stripe emulation, EMV contact, EMV contactless, etc. EMV stands for Europay, MasterCard and VISA, a global standard for inter-operation of integrated circuit cards (IC cards or "chip cards") and IC card reader. In addition to facilitate the exchange of information via the contact interface of the card, information can also be exchanged using the contactless capabilities of capable card. Such contactless cards are sometimes referred to as PayPass, payWave, and ExpressPay.

It is recognized that contactless payment is well suited for a mobile device. For example, some mobile devices have a near-field communication (NFC) system that allows data to be transferred wirelessly, using the ISO/IEC 18092 standard or other compatible standards, over a relatively short distance. A NFC-enabled mobile device can establish radio communication with another contactless-enabled device by touching them together or keeping them into close proximity. The term "mobile device" and "mobile phone" are interchangeably used herein.

An NFC-enabled mobile device can be equipped with a "software payment card" (e.g. a software implementation of a contactless payment card) application running inside the mobile device. The software payment card uses the compatible contactless communication capabilities of the device to interact with contactless-enabled POS terminal to facilitate payment transactions.

In many cases, the software payment card is stored on the secure element to protect the sensitive payment data such as the one used to generate the dynamic data necessary to complete a typical contactless payment transaction. It is recognized that secure elements are limited in their storage capabilities. They are typically available in the form of an embedded chip, such as in a universal integrated circuit card (UICC), or in a subscriber identity module (SIM) card.

In part to maintain the security of the various applications running inside the secure element, the secure element is typically managed by a mobile phone carrier distributing the secure element with the mobile device. Part of the managed service includes delivering applications into the secure element directly, or giving permission to a third party organization to deploy their application on a particular secure element. The managed service is typically delivered using what the industry referred to as a trusted service manager (TSM).

All applications stored and running inside the secure element, such as the individual "software payment card", need their own space. Payment cards are issued to consumers by the card issuer. Deploying software payment cards on mobile phones requires a high level of coordination between the mobile phone carrier and the card issuer where the mobile phone carrier provides access to individual secure elements, one at a time, to the issuer. Only cards from funding card issuers that have the infrastructure and the agreement with the mobile phone carrier can be used on the mobile phone for contactless payment. This is limiting for both the card issuers and for cardholders.

In the United States, for example, there are thousands of issuing banks and tens of mobile phone carriers. The mobile phone carriers use the TSM, in part, to issue and manage payment credentials into mobile phone. The TSM enables mobile phone carriers (also called service providers) or other entities controlling the secure element on mobile phones to distribute and manage remotely the secure applications running inside the secure element by securing access to the secure element in mobile-enabled devices. An example of secure application is a software payment card. The issuing banks also interact with the mobile phone carriers through a service (in an example embodiment, called ISIS) to manage payment credentials issued to NFC-enabled devices. As a non-limiting example, in Canada, Rogers Communication is a mobile carrier that is in partnership with the Canadian Imperial Bank of Commerce (CIBC), an issuing bank, to issue software payment card to CIBC cardholder's phone on the Rogers network. Establishing systems and methods to manage the secure issuance and management of software payment cards between the issuing banks, the mobile phone carriers, and the mobile device is costly and complex. It involves pre-arranged agreements between the parties as well as some customizations of the software and computing systems to meet the needs of all the entities participating. This can make it difficult for smaller-sized card issuers to adopt NFC technology for facilitate payments. It also means that the issuing bank will likely require numerous point-topoint connections with the various mobile operators it wants to supports, which requires further hardware capabilities and software to support and organize data communications between different mobile operators. The systems and methods described herein attempt to address at least one of these issues.

It is also recognized that from the user's perspective, the process of associating their mobile device with their funding card to be used for contactless payment is very much dependent on pre-arranged relationships between the mobile phone carrier and the card issuers. Therefore, a user has limited options or no options when determining if their current funding card can be associated with their mobile phone for contactless payments. For example, a user has a funding card from Funding Card Issuer A. The user also has a NFC-enabled mobile phone from Mobile Phone Carrier B. However, Mobile Phone Carrier B only has a pre-arranged agreement and infrastructure to facilitate contactless payments with Funding Card Issuer B. Therefore, even if the user wanted to use their mobile phone to make a contactless payment, the user would not be able to because there is no pre-arranged agreement and computer network infrastructure between Mobile Phone Carrier B and Funding Card Issuer A to issue a software payment card into the user's phone. This limitation of the computer network infrastructure limits the user's ability to make NFC-type payments with their mobile device.

In a typical example embodiment of making a payment using an NFC-enabled mobile device, a user first requests to its issuer to load a funding card on their mobile device. When this process is completed, a software funding card has been delivered and installed securely on the secure element on the user's mobile device. The user can now use the funding card on the mobile device's to facilitate contactless payment transactions at merchant locations that are equipped to accept such type of payment transaction. Once the user attempts to pay with their mobile device at a merchant, the payment details are sent and are verified by the funding card issuing server in a similar manner to other payment transaction.

When a contactless funding card credential is used to facilitate a payment transaction, the transaction most often includes dynamic data from the card to securely authenticate the payment credential. The dynamic data changes values every time the credential is used. If the dynamic data received on the funding card issuing server matches the expected value computed by the server for the card, the authentication of the payment credentials is deemed successful and the payment authorisation can continue. It can be appreciated that there are various ways in which the mobile device and the funding card issuing server can compute the dynamic data used to authenticate the payment credential.

In an example embodiment for credit cards, the dynamic data is a rotating card verification value (CVV, also referred sometime to dynamic CVV or dCVV). This rotating CVV is computable based on changing information provided by the integrated circuit inside the card. In another example embodiment, the dynamic data is dynamic EMV data which is computed using random data from the funding card, or random data from a merchant's point of sale terminal, or both. A common implementation of dynamic data uses an Application Transaction Counter (ATC) on the card so that every transaction produces a different data stream. This is achieved as the ATC is incremented by '1' for every transaction performed. When a user taps, touches or positions their mobile device near a contactless-enabled point of sale (POS) terminal, the funding card data (card number, dynamic data, expiry date, etc.), hereafter referred to as the card's Track Two data, is sent from the mobile device to the POS terminal. This information then makes it way to the funding card issuing server for verification. The funding card issuer will perform numerous checks to validate the transaction, including comparing the dynamic data of the mobile device with the value generated by the server. If the dynamic data is matching, and all the other checks and controls performed by the funding card issuer are successful, the funding card issuer will respond with a positive payment authorisation response.

It is also recognized that a card application specific to a given funding card can be installed on the mobile device and used to interact with POS terminal as described above. It is also recognized that the card application is typically installed on the mobile device's secure element. Typically, each funding card has its own corresponding card application that resides on the mobile device's secure element. It can be appreciated that as each card application takes up storage space on the secure element, and that the secure element typically has very limited storage space, having multiple card applications on the secure element is some cases is not possible due to insufficient storage space. By way of background, the secure element can have a native operating systems that be programmed to perform various tasks and activities, including for example, a card application that emulates the magnetic strip data of a funding card or a card application that emulates the data used in an EMV contactless payment. Also by way of background, and by way of example, a typical secure element has memory of 256 kB, and each card application can consume memory of 40-80 kB. It can therefore be appreciated that associating multiple funding cards (and each of their card applications) with a mobile device for NFC payments can be limiting.

Therefore, it is desirable to reduce the amount of storage space that card applications require on the secure element so as to not limit the number of software payment cards a user can load into a secure element. Along the same lines, it is desirable for mobile phone carriers to reduce the amount of data used by "card application" on the secure element so that other types of applications can be loaded thereon. It is also desirable to reduce costs incurred by the funding card issuer to issue and operate software payment cards into secure elements. By way of background, a mobile phone carrier typically charges application providers, such as funding card issuers, for the amount of storage space used on the secure element. It is also desirable to reduce the amount of infrastructure required by the funding card issuer to issue a software payment card for the mobile phone. It is also desirable to reduce the amount of coordination required between the funding card issuer and the mobile phone carrier to issue a software payment card on particular mobile phone. It is also desirable to enable the user (e.g. the cardholder) to load any, and as many, funding cards they want into their NFC-enabled mobile phone, independently of the funding card issuer having the infrastructure or a commercial relationship or agreement with a particular mobile phone carrier.

The systems and methods described herein attempt to address the above issues.

It will be appreciated that different features of the example embodiments of the proposed systems and methods, as described in this document, may be combined with each other in different ways. In other words, a feature described with respect to one embodiment of a mobile payment system or method can be applied to another embodiment of the mobile payment system or method, although not specifically stated.

In general, the systems and methods described herein allow a cloud-based wallet payment gateway server to synchronize with a NFC-enabled mobile device and application to facilitate contactless payment transactions at a merchant store accepting contactless payment. A pre-arranged agreement or additional infrastructure between the funding card issuer and the mobile phone carrier is not required. A user selects a funding card for making the contactless payment, through their mobile device. A second card, herein referred to as a virtual card, is generated along with all required card data (e.g. PAN, expiry date, dynamic data, discretionary data, etc.) to complete the payment transaction. The virtual card is associated with the funding card on the payment gateway server. In an example embodiment, the association between the virtual card and funding card is limited to some period of time.

In an example embodiment, the data required to compute virtual card data set is sent to the mobile device, typically every time that the user wants to make a payment. For example, a new virtual card is created for each and every payment transaction. In another example, a new virtual card is created based on time limits, or based on certain events, or both, and has a much shorter usage period compared to a standard funding card which can be used typically over several years. Where the virtual card can be used with the funding card for several transactions, a data for computing a new virtual card does not need to be sent to the mobile device each time the user makes a payment.

When a payment is initiated, the virtual card data is sent through the NFC system on the mobile device to a contactless-enabled POS terminal. This information is sent from the POS terminal to the merchant system; from the merchant system to the merchant acquiring bank; and from the acquiring bank to the cloud-based wallet payment gateway server (also referred to the "payment gateway server") via the payment network. The cloud-based wallet payment gateway server acts as the virtual card issuer server and verifies the virtual card. If successfully verified, the funding card details associated with the virtual card are retrieved and sent to the funding card issuer server via the payment network to complete the payment authorisation transaction. The funding card issuer server verifies the funding card and sends back an authorization code to the payment gateway server. The payment gateway server sends back a corresponding authorization code to the merchant system.

The payment can be settled when the merchant system initiates a settlement request, typically, though not necessarily, at the end of every business day. To complete the settlement, the merchant system sends all the virtual card numbers and the corresponding authorization codes received during the period to the virtual card issuer, via the merchant acquiring bank. The virtual card issuer verifies the virtual card numbers and authorisation codes. For all the matching records, the virtual card issuer retrieves the associated funding card numbers and authorisation codes and sends the data to the funding card issuer for settlement via the virtual card issuer acquiring bank. The funding card issuer verifies the funding card numbers and authorization codes, and if successfully verified, sends the money via a standard method to the payment transaction originator, in this case the virtual card issuer. At that point, the virtual card issuer sends the money to the merchant acquiring bank also using a standard method. In an example embodiment, the virtual card issuer is the payment gateway server, or a module within the payment gateway server.

In an example embodiment, the systems and methods described herein allow a cloud-based wallet (e.g. associated with a funding card) to be synchronized with a NFC-enabled mobile device (e.g. associated with a virtual card). In another example embodiment, the systems and methods described herein provide real time rotation of a primary account number (PAN) and dynamic data used to facilitate contactless payment transactions. In another example embodiment, the systems and methods described herein use virtual payment credentials to complete a brick-and-mortar contactless purchase transaction without disclosing the user's funding card details.

Figure 4:
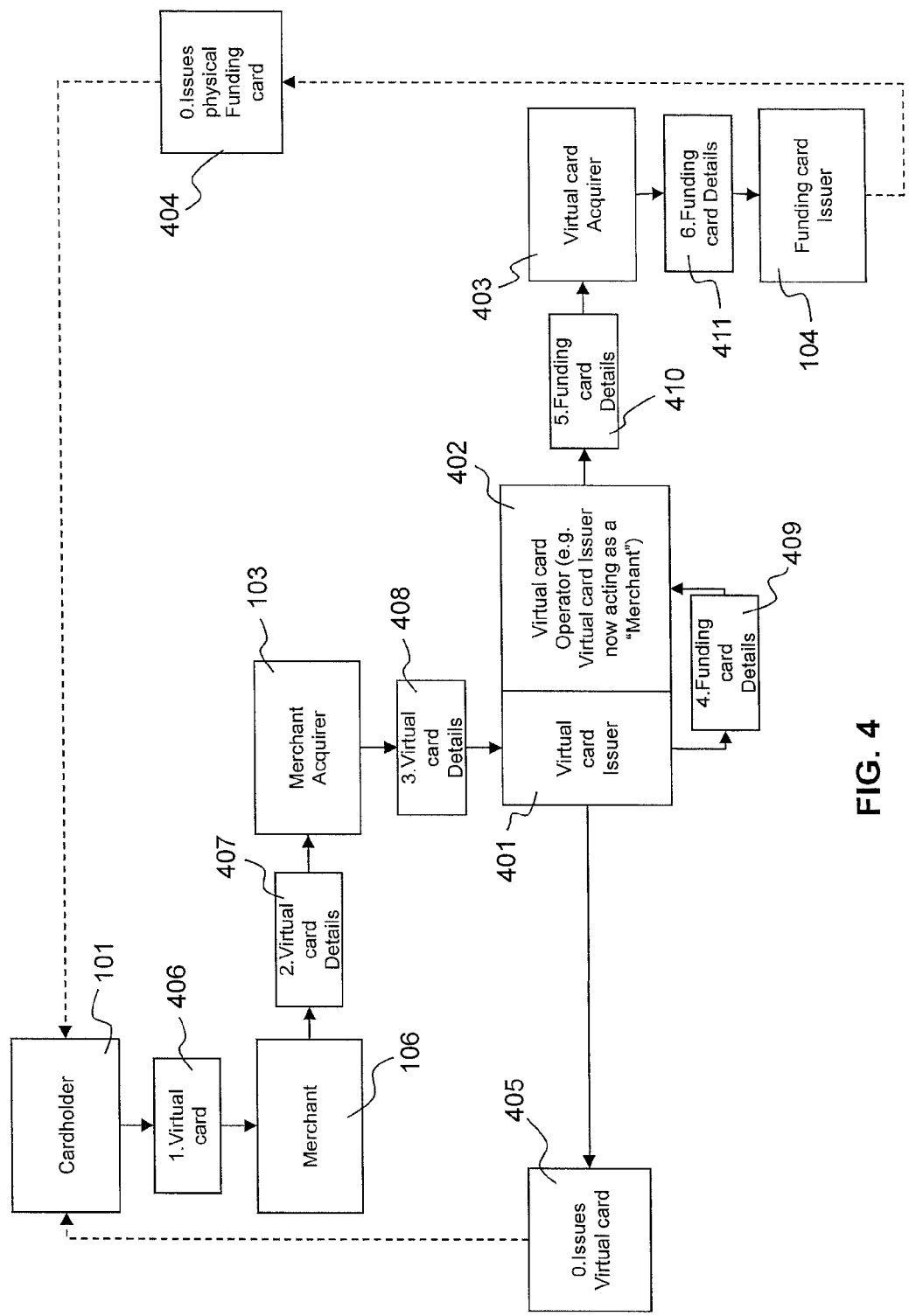
FIG. 4 is a schematic diagram of an example embodiment of a payment system showing the flow of data when using a virtual card to facilitate a payment.

Turning to FIG. 4, an example embodiment showing the flow of payment data using a virtual card is provided. A card issuer, also called the funding card issuer 104, issues a standard card account, most often if the form of a plastic card, to the user 101 (block 404). The standard card is the funding card, and the user becomes the cardholder.

Although not shown, the cardholder 101 registers one or many funding cards and their mobile device with a virtual card issuer 401. It can be appreciated that any funding card can be registered, and is not limited or dependent on the mobile phone carrier having an agreement with the funding card issuer. In other words, even if the funding card and the mobile phone carrier do not have any agreement or connecting computer infrastructure, according to the proposed systems and methods, the user's one or many funding cards and the user's mobile device can be registered with the virtual card issuer 401. It can also be appreciated that any number of funding cards can be registered in association with the mobile device. The cardholder's mobile device includes a payment application that can interact with the virtual card issuer 401.

In an example embodiment of the registration, for each funding card the user wishes to register, the user enters in (e.g. types in) card details into the mobile device (e.g. card details include the name printed on the funding card, the PAN printed on the funding card, the expiry date printed on the funding card, and the static security code printed on the funding card). The mobile device sends this data, plus a user provided PIN and the mobile device ID to the payment gateway server. For each funding card, the payment gateway server computes a funding card identifier which identifies the given funding card. The payment gateway server stores the funding card identifier in association with the funding card details, mobile device ID and PIN, and it sends the funding card identifier to the mobile device for storage. In an example embodiment, the funding card identifier is a value that is different from the PAN, expiry date or static security code of the funding card. For example, the funding card identifier is a random value so that, if intercepted by an adversary, would not be able to recognize any funding card details. In an example embodiment, the mobile device does not store any funding card details but only stores limited funding card details (e.g. the name funding card issuer and the last 4 digits of the PAN). The mobile device stores the funding card identifier, which it sends to the payment gateway server to indicate a specific funding card. It can be appreciated that there are other methods to capture the funding card details (e.g. besides the user typing in the data), which can be used with the principles described herein.

It can be appreciated that a single payment application is required on the mobile device, which can manage multiple funding cards. If multiple funding cards are registered, each of the associated funding card identifiers are stored on the mobile device, within the single payment application. The details of each individual funding card are stored on the payment gateway server. In this way, the payment gateway server acts as a cloud-based server that stores the details of multiple funding cards. Additional details of a funding card registration process are described below with respect to FIG. 10.

Continuing with FIG. 4, when the registered cardholder 101 wishes to make a contactless payment using their mobile device, the user selects the funding card. The selected funding card is conveyed to the virtual card issuer 401, and the virtual card issuer 401 issues a virtual card to the cardholder 101, and more specifically to the payment application running on the mobile device (block 405). The cardholder touches their mobile device on the merchant system and the virtual card details are delivered to the merchant 106, via a NFC-enabled POS terminal (block 406). The merchant sends the virtual card details to the merchant acquirer 103 (block 407). Based on some of the virtual card details, the merchant acquirer 103 sends the virtual card details to the virtual card issuer 401 (block 408) via the payment network. The virtual card issuer 401 uses the virtual card details to determine the corresponding funding card (block 409). The virtual card operator 402 (e.g. the virtual card issuer now acting as a "merchant") sends the corresponding funding card details, including the original transaction amount, to its acquirer 403 (block 410). This parallels the typical process of a merchant 106 sending the funding card details to the merchant acquirer 103. The virtual card acquirer 403 sends the funding card details to the funding card issuer 104 (block 411) via the payment network for a standard payment authorisation.

The funding card issuer 104 then can authorise, or not, the payment request and responds back with an authorisation code to the virtual card issuer's acquirer, via the payment network, which in turn notify the virtual card issuer. The virtual card issuer notifies the merchant acquirer using a corresponding authorization code for the merchant system via the payment network.

To settle the funds (not shown), the merchant will initiate, or the merchant acquirer will initiate on behalf of the merchant, a settlement request to the payment network via the merchant acquirer. The payment network will forward the corresponding virtual card transactions to settle to the virtual card issuer. When the virtual card issuer receives the transactions, the virtual card issuer will send a settlement request for the corresponding funding card transactions to its own acquirer. The settlement request will be sent to the appropriate funding card issuer by the payment network. The funding card issuer receives the transactions settlement request, and will send the funds associated with all matching transactions to the payment transaction originator, in this case the virtual card issuer. When the virtual card issuer receives the funds, the virtual card issuer will send the corresponding funds to the merchant.

In an example embodiment, the virtual card issuer 401, the virtual card operator 402, and the virtual card acquirer 403 are represented by the same entity, referred herein as the payment gateway server. The payment gateway server itself can include one or more servers. For example, each of the entities 401, 402, 403 can be individual servers that, combined, form the payment gateway server.

Figure 5:
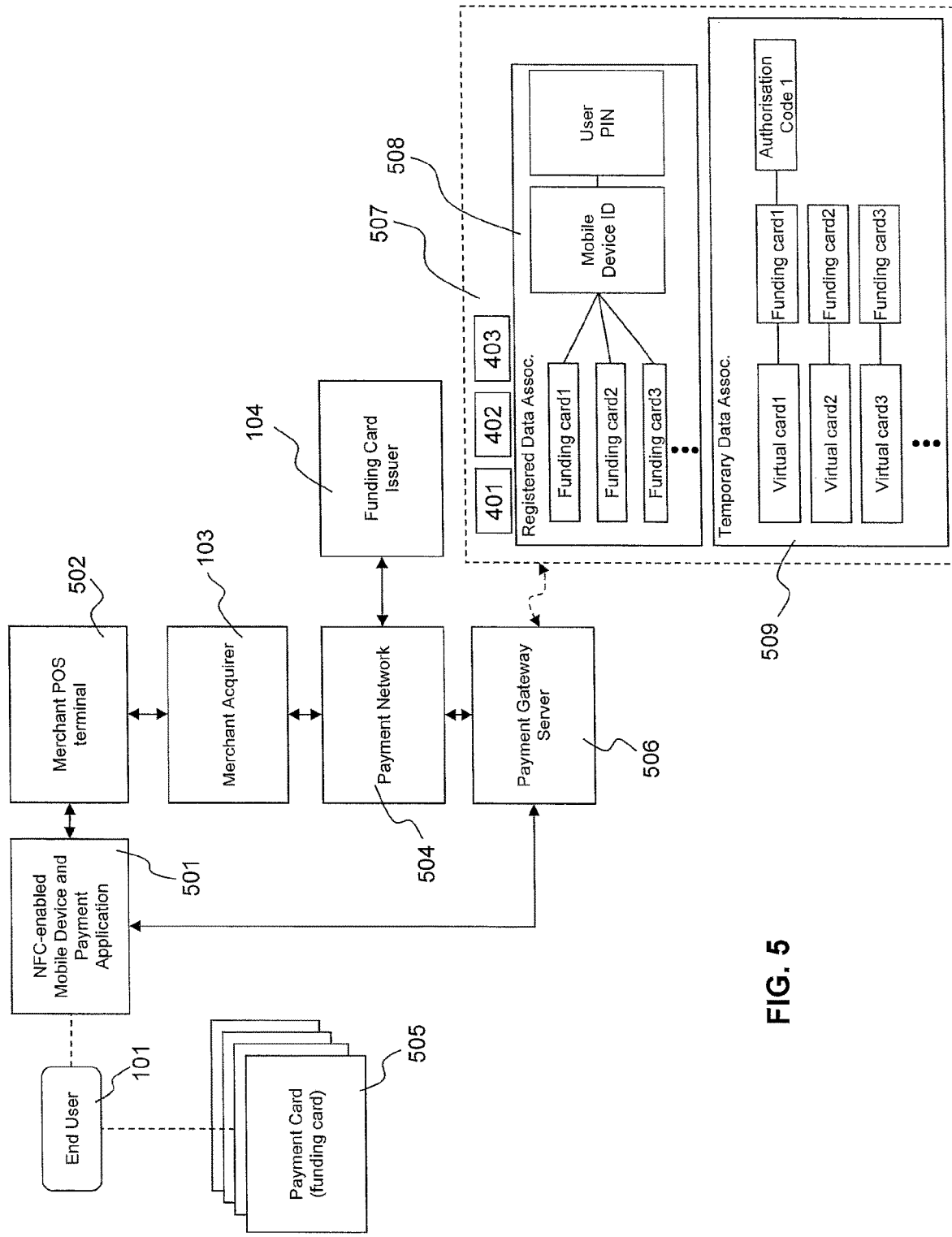
FIG. 5 is another schematic diagram view of the entities involved in an example embodiment of a payment transaction using a virtual card to facilitate a payment.

Turning to FIG. 5, example embodiment components of a system for facilitating payment using the virtual card is shown. The user 101 has one or more funding cards 505 pre-registered into its cloud-wallet (process not shown). For example, the user has multiple funding cards. The user 101 also owns an NFC-enabled mobile device 501, which includes a payment application. The mobile device 501 is configured to interact, via NFC, with a merchant POS terminal device 502. The merchant POS terminal device 502 is in data communication via the merchant payment system with the merchant acquirer 103 (e.g. a server). The merchant acquirer and the payment gateway server 506 are in communication with a payment network (e.g. Visa, MasterCard, Discover, etc.), which is configured to send data related to payments and transactions to relevant parties, including the payment gateway server 506 and the funding card issuer 104 (e.g. a server). The communication between the merchant POS terminal device 502, the merchant acquirer 103, the payment network 504, the payment gateway server 505 and the funding card issuer 104 can occur over wired or wireless communication networks, or both.

The payment gateway server 506 is also in communication with the mobile device 501 through a wireless network. For example, the wireless network is provided by a mobile phone carrier.

Example components of the payment gateway server 506 are shown in block 507. The server 506 can include the virtual card issuer 401, the virtual card operator 402 and the virtual card acquirer 403. During a registration process conducted by the user 101, the payment gateway server 506 stores the user selected personal identification number (PIN), funding card data in association with the user's mobile device ID (e.g. in database 508). For example, the user PIN, funding card1 and funding card2 (and other funding cards) are stored in association with the mobile device ID of mobile device 501. Also, in database 509, the temporary data associations between a given funding card, a virtual card and authorisation code when applicable are stored. For example, virtual card1, funding card1 and authorisation code 1 are all stored in association with each other's. Another example is virtual card2 and funding card2 are also associated but have no authorisation code issued yet for the card pair. In an example embodiment, there is no authorisation code issued yet because the user has not yet tapped the mobile device using funding card2 (e.g. really virtual card2), or because the merchant payment authorisation was interrupted such that the payment gateway server never received the authorisation code.

Figure 6:
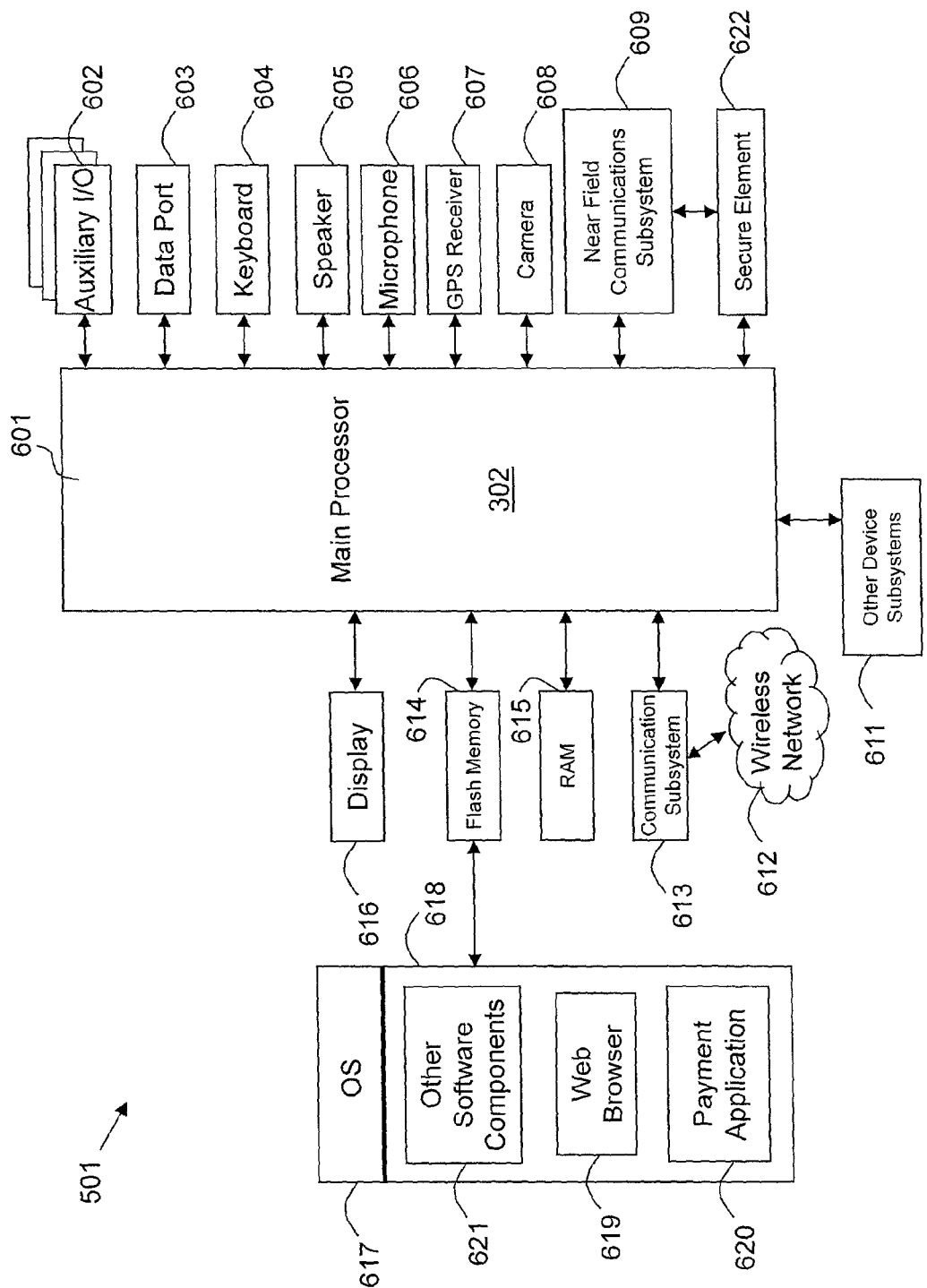
FIG. 6 is a block diagram of an example embodiment of a mobile device.

Turning to FIG. 6, example components of the mobile device 501 are shown. The mobile device 501 includes a main processor 601 which interacts with a number of components including, among other things, auxiliary inputs/outputs 302, a data port 603, a keyboard 604, a speaker 605 (e.g. an audio speaker), a microphone 606, a GPS receiver 607 and a camera 608. The mobile device 501 also includes an NFC subsystem 609, a secure element 622 which may or may not also have direct connectivity to the NFC subsystems 609, and other device subsystems 611.

The mobile device 501 uses a communication system 613 to interact with a wireless network 612. Memory types include flash memory 614 and random access memory (RAM) 615. The mobile device's display 616 can be a touch-screen type display or another type of display.

An operating system 617 may be used to manage and run software components 618. Software components or applications include a web browser or internet browser 619 and payment application 620. Other software components 621 are included.

The secure element 622 can be used for storing information such as application and data elements, for example a payment application and a mobile identifier. In an example embodiment, the secure element in inside a subscriber identity module (SIM) card. Non-limiting examples of mobile devices include cell phones, smart phones, PDAs, tablets, netbooks, and laptops.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer or processor readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the any one of the servers 103, 504, 104, 506, 401, 402, 403, the mobile device 501, the POS terminal 502, etc. or accessible or connectable thereto. Any application or module herein described may be implemented using computer or processor readable/executable instructions or operations that may be stored or otherwise held by such computer readable media.

Figure 7:
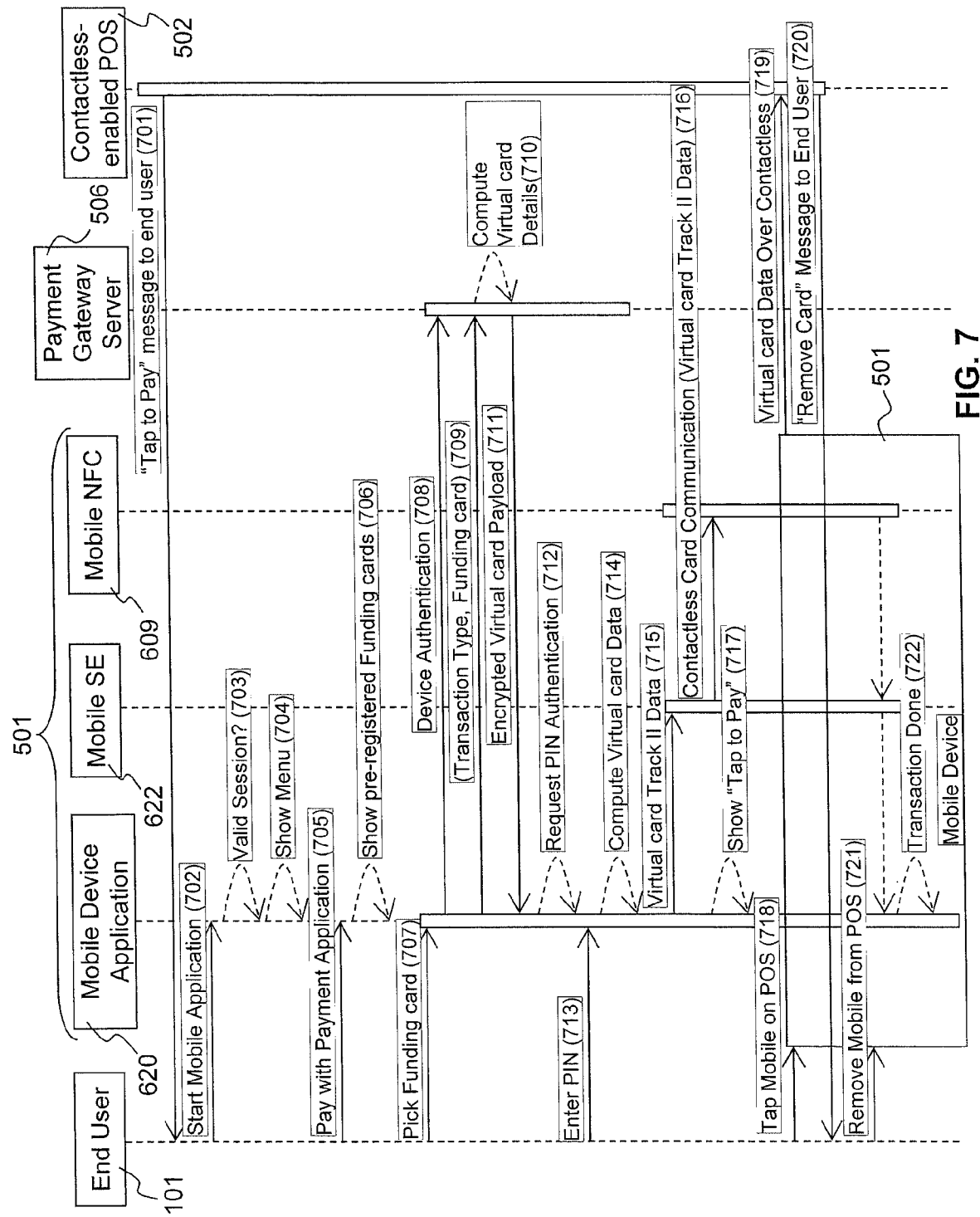
FIG. 7 is a flow diagram of an example embodiment of computer executable or processor implemented instructions for generating and using a virtual card in a payment transaction according to a user's perspective, the instructions performed by at least a mobile device, a point of sale terminal and a payment gateway server.

Turning to FIG. 7, example computer executable or processor implemented instructions are provided for facilitating a transaction between a mobile device 501 and a POS terminal device 502.

Is assumed that the end-user has a compatible NFC-mobile device 501. It is assumed that payment application 620 has been installed on the mobile device 501. It is assumed that the end user has registered for the service.

Following the merchant capturing the purchase transaction details into its point of sale system, the NFC-enabled POS terminal device 502 displays a message to the end user to "tap" to pay (block 701). For example, the user can tap their mobile device 501 or a contactless funding card. The examples described herein relate to tapping the mobile device 501.

The end user 101 sees the message from the POS terminal device 502 and starts the payment application 620 on the mobile device 501 (block 702). For example, the user selects an icon for the payment application 620 on a home screen of the mobile device 501, thereby launching the payment application 620. The payment application 620 determines if the user has successfully registered to the service (block 703), and if so, shows a menu (block 704) of supported actions by the application. If the user has not registered, the menu offers the user to register with the service (e.g. register one or more funding cards, provide a PIN, link a mobile device identifier to the registration record).

A graphical user interface (GUI) on the menu is able to receive an input from the user to initiate a payment with a virtual card with the payment application (block 705). Example of other menu item includes "add a funding card", "delete a funding card", etc.

The mobile device 501 then displays the funding cards that have been pre-registered by the user (block 706). A user input is provided to select one of the funding cards (block 707). In an example embodiment, the displayed funding card information is loaded after the end user successfully registers to the service and has registered at least one funding card. The list is updated when the user adds an additional funding card into the payment application or when a funding card is deleted. For each registered funding card, there is a corresponding record stored on the payment application 620 and on the payment gateway server database 508 which includes an identifier for the payment network associated with the funding card, a funding card identifier, etc.

The payment application 620 sends the mobile device identifier to the payment gateway server 506 (block 708). The payment application 620 also sends the transaction type (selected action in the application menu, in this case, "Pay with a virtual card") and the identifier for the selected funding card to the payment gateway server 506 (block 709). Based on the information received by mobile device 501, the payment gateway server 506 creates and computes the details regarding the virtual card (block 710). In particular, the payment gateway server 506 computes a virtual PAN, an expiry date of the virtual card and all or some of the data elements that form the Track Two data. It is noted that Track Two data includes, among other things: the PAN, a service code, an expiry date, discretionary data and a LRC. In an example embodiment, the payment gateway server 506 at this time does not compute the discretionary data, which is dynamic in nature (e.g. the discretionary data is dynamic data). In an example embodiment, the expiry date of the virtual card is identical to the expiry date of the funding card, so that from the perspective of the merchant and the user the virtual card is identical to the funding card. In fact, based on certain similarities between the funding card and the virtual card, the merchant and the user will be unaware that a virtual card is being generated and used and will instead believe that the funding card is being used in the payment. The virtual card details may further include an internal expiry date that is known only to the payment gateway server, and has a short timeline of about a few days from the date that the virtual card is created. The internal expiry date is different from the virtual card's expiry date, and the function of the internal expiry date is to provide an additional indicator to the payment gateway to determine whether or not a virtual card has expired. The payment gateway server 506 encrypts the virtual card data, which does not include the internal expiry date, and sends the encrypted virtual card payload to the mobile device's payment application 620 (block 711).

As an alternate example embodiment, instead of the payment gateway server 506 sending the virtual card PAN as part of the encrypted virtual card payload to the mobile device, the payment gateway server 506 instead sends a key value (called Kpan) that the mobile device can use to generate an identical virtual card PAN as computed by the payment gateway server 506.

In an example embodiment, the last four digits of the virtual card PAN are the same as the last four digits of the funding card PAN. The last four digits of the virtual card PAN are identical to the funding card PAN so that, after PAN truncation, it appears as if the PAN of the virtual card is identical to the PAN of the funding card. In other words, the user cannot detect that a virtual card is being used in place of a funding card. By way of background, PAN truncation is enforced by the payment industry as part of the merchant certification process for accepting card payment. A truncated PAN means that the card number, when printed on a customer receipt, is replaced with a printout of only the last four digits, and the remainder of the other PAN digits are replaced usually by asterisks. An example embodiment of a truncated PAN is * * * * * * * * * * * * 7777. This hides the card number from anyone who obtains the receipt when discarded, or by other means, while still allowing a cardholder with multiple cards to identify which was used, and thus record the transaction.

In an example embodiment, the first portion of digits of the PAN of the virtual card is static and refers to the payment gateway server 506. For example, the first six digits point to the payment gateway server 506; the merchant acquirer 103 and associated payment network uses this information to send the transaction and payment details to the payment gateway server 506.

In an example embodiment, the PAN of the virtual card is nineteen digits long and compliant to the algorithm LUHN-10. The algorithm, also known as the "modulus 10" or "mod 10" algorithm, is a checksum formula used to validate a variety of identification numbers, such as card numbers. As described above, the first six digits are used to identify the payment gateway server and the last four digits are identical to the last four digits of the funding card PAN. The remaining digits can be computed in a number of ways. In an example embodiment, the remaining digits of the virtual card PAN are randomly generated. In another example embodiment, the remaining digits are computed using the Kpan value; further details in this regard are described in FIG. 11. Other methods can be used to compute the virtual card PAN.

The mobile device 501 receives the encrypted virtual card payload, decrypts the encrypted communication and extracts the virtual card details (e.g. the virtual card PAN and other card details).

In another example embodiment, if the virtual card payload includes a Kpan (e.g. a key value) instead of a virtual card PAN, the mobile device 501 uses the Kpan to compute the virtual card PAN.

The payment application 620 on the mobile device 501 displays a GUI requesting the user 101 to input their PIN (e.g. which should be the same PIN provided when the user registered for the service) (block 712). The application 620 receives the PIN from the user 101 (e.g. the user enters in the PIN) (block 713). The application 620 uses the PIN to compute the discretionary data of the virtual card (block 714). With the discretionary data computed, the Track Two data set is complete. The virtual card data set (e.g. the Track Two data) is delivered to the mobile device's secure element 622 (block 715). In an example embodiment, data to be sent over the NFC subsystem 609 needs to be provided by the secure element 622 (block 716). In another example embodiment, though not shown, the operating system of the mobile device 501 can directly transfer information to the NFC subsystem 609 without the use of the secure element. The virtual card data set includes the virtual card PAN, the expiry date, the discretionary data and all other elements in a Track Two data set to complete a standard contactless payment transaction. The mobile's payment application 620 displays a message to the user to "Tap to pay" (block 717).

At this stage, the user 101 touches or positions the mobile device 501 in close proximity to the POS terminal device 502 (block 718). When the mobile device 501 becomes in communication range to the POS terminal device 502, the mobile device 501 sends the virtual card data to the POS terminal device 502, using the mobile device's NFC subsystem 609 (block 719) following the payment network standard for such contactless payment transaction. The transfer of data occur using radio communication means. In an example embodiment, the POS terminal device 502 displays a message to the user 101 to "Remove card" (block 720) once the terminal as received all the card data it needed. The user positions the mobile device 501 away from the POS terminal device (block 721). Other computations and processes can occur within the mobile device 501 which completes the mobile device's participation in the transaction process (block 722).

Although not shown in FIG. 7, the POS terminal device 502 will send the virtual card details to the merchant acquirer, along with other transaction data (e.g. cost for transaction, merchant ID, etc.). This information is eventually routed to the payment gateway server 506, as identified by the first portion of digits of the virtual card's PAN. See FIG. 8 for more details.

In an example embodiment, one PIN can be used for all the funding cards associated with the mobile device. In another example embodiment, the registration process can request a specific PIN for each funding card. In other words, if a user selects a different funding card, the user will need to enter in a different PIN.

In a preferred example embodiment, the mobile device's payment application 620 does not verify the PIN. Instead, the PIN is indirectly or implicitly verified by the payment gateway server 506 when verifying the virtual card data set. In other words, the payment gateway server 506 uses the PIN that was stored at registration time to compute the virtual card data set. If an incorrect PIN was provided by the user or an adversary during the transaction, it will cause the computed virtual data to result in a different, incorrect, value compared to the virtual card data computed by the payment gateway server. Once the received virtual card data set is compared with the expected value by the server, an invalid PIN entry can be detected. When the payment gateway server receives and verifies the virtual card data set and detect an un-expected virtual card data set (e.g. due to the incorrect PIN), then the payment authorization can be declined.

Figure 8:
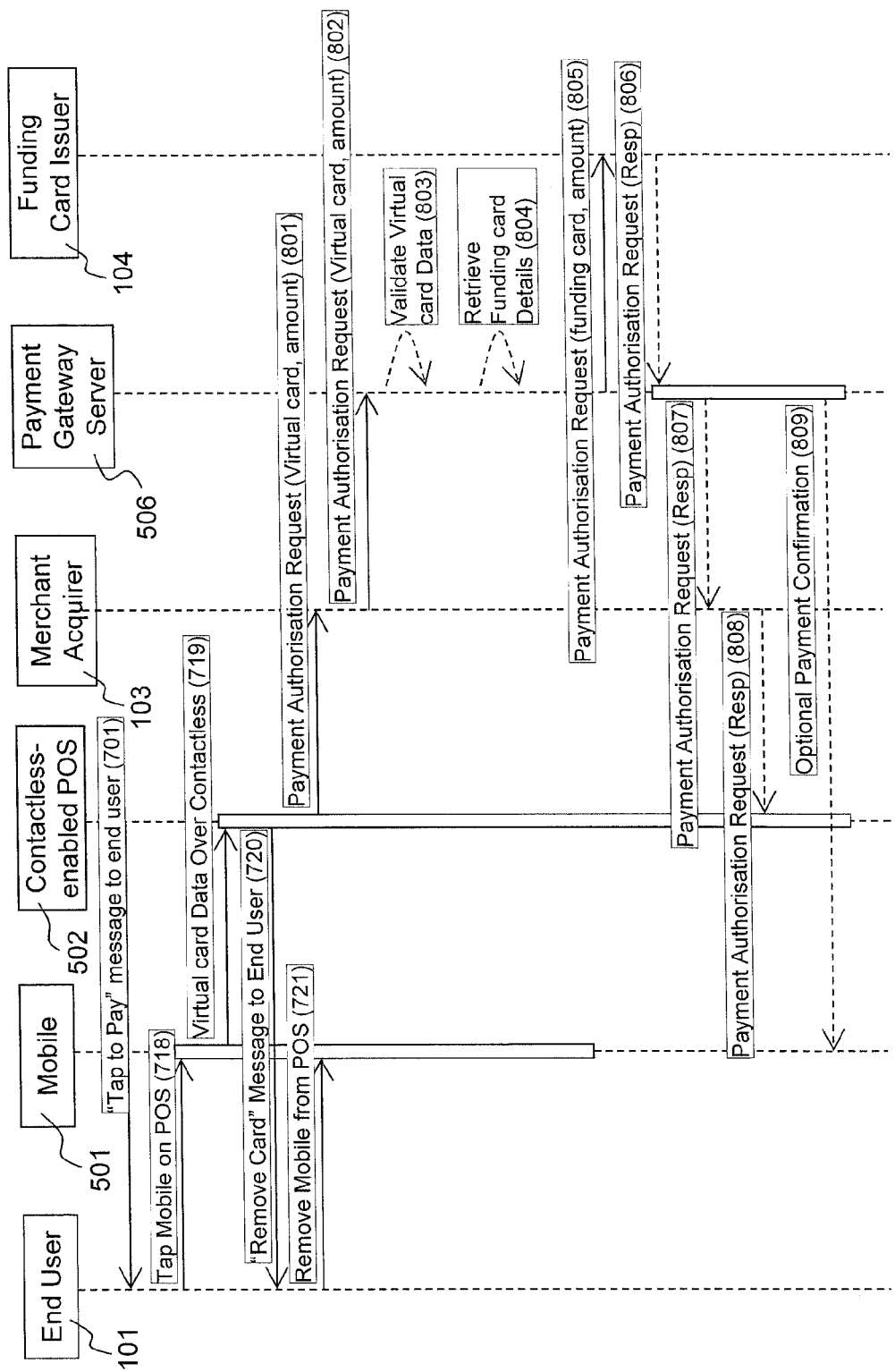
FIG. 8 is a flow diagram of an example embodiment of computer executable or processor implemented instructions for facilitating payment transaction using a virtual card, the instructions showing the interaction between at least a merchant and a payment gateway server.

Turning to FIG. 8, example computer executable or processor implemented instructions are provided for facilitating a transaction between a mobile device 501 and a POS terminal device 502, including further details regarding the processing of data by the merchant acquirer 103, payment gateway server 506 and funding card issuer server 104.

Blocks 701, 718, 719, 720, and 721 shown again to provide context for the process. After the POS terminal device 502 receives the virtual card data from the mobile device 501 (block 719), the POS terminal device 502 sends the virtual card data, the transaction information (e.g. amount of payment), and other information (e.g. merchant ID) to the merchant acquirer 103 (block 801). In an example embodiment, the data sent by the POS terminal device 502 is in a standard payment authorization request format.

The merchant acquirer 103 sends the payment authorization request, which includes at least the virtual card data (e.g. virtual card's Track Two data) and the payment amount, to the payment gateway server 506 (block 802) via the payment network. The acquirer 103 and the payment network are able to identify the payment gateway server 506 by the first portion of digits in the PAN of the virtual card. It can be appreciated the PAN is part of the Track Two data.

The payment gateway server 506 validates the virtual card data (block 803). To validate the virtual card data received from the mobile device (via the merchant acquirer 103), the payment gateway server computes the Track Two data set on its own. The Track Two data computation includes the payment gateway server computing the discretionary data using the PIN originally received and stored during registration by the user. In an example embodiment, some of the Track Two data portions (like the PAN and expiry date) were pre-computed and stored; these pre-computed data portions can be compared against the received Track Two data. If the virtual card data is successfully validated (received card Track Two data set matches computed card Track Two data set by the payment gateway server), then the payment gateway server retrieves the funding card data that is associated with the virtual card data card (block 804).

The validation of the virtual card data in block 803 can also include verifying if the internal expiry date associated with the virtual card has passed or not. If the present date of the validation is occurring before or on the internal expiry date, then the virtual card can be considered validated and the transaction processing can continue. Otherwise, the virtual card is deemed invalid and the payment authorisation request is denied.

If the virtual card is validated, the payment gateway server 506, playing a role that is similar to a merchant at that point, sends a payment authorisation request to its own acquirer, where the payment authorisation includes at least the funding card data and the same payment amount received in block 802, to the funding card issuer server 104 (block 805) via the payment network. The funding card issuer 104 then receives the payment authorisation request and process the transaction as standard. Once the transaction is processed, the funding card issuer 104 sends a payment authorisation code to the payment gateway server (block 806) via the payment network. The authorisation code response includes whether the payment authorisation has been accepted or denied, a transaction identification number, etc.

The payment gateway server 506 then sends a corresponding payment authorisation response to the merchant acquirer 103 (block 807) via the payment network, and the acquirer 103 sends the payment authorisation response to the POS terminal device 502 (block 808) also via the payment network. Although not shown, the payment gateway server stores the payment authorisation code into the database 509. Although not shown as well, the POS terminal device 502 may display a message to the end user that the payment has been accepted or denied, according to the response.

In an example embodiment, the payment gateway server 506 may also send a confirmation to the mobile device 501 that indicates whether or not the payment was accepted or denied (block 809). The indication can be sent as data specific to the payment application 620 on the mobile device, or as an email. After receiving such indication, the mobile device 501 can display a message to the user according to the indication.

In an example embodiment, after the payment gateway server 506 receives a response that the payment has been processed (block 806), the payment gateway server 506 marks the virtual card as being used. In this way, if the same virtual card is used again in a future transaction, the payment gateway server will decline the transaction. This is because the virtual card is meant to be used only once.

In other example embodiment, the same virtual card can be used for more than one transaction.

Figure 9A:
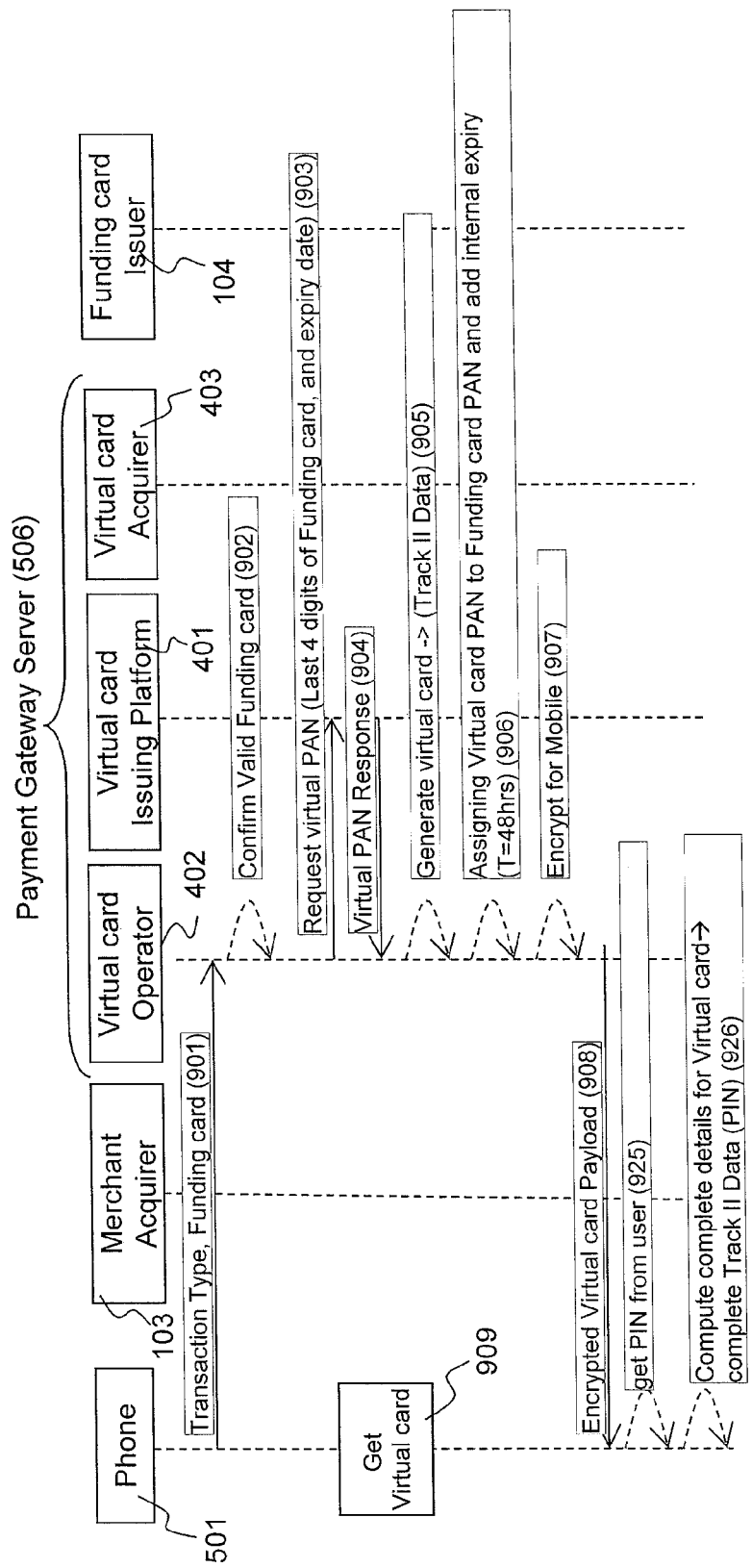
FIG. 9a is a flow diagram of an example embodiment of computer executable or processor implemented instructions for computing virtual card details by the payment gateway server, the instructions implemented as part of the transaction process of FIG. 7.

Turning to FIG. 9a, an example embodiment of computer executable or processor implemented instructions is provided for facilitating a transaction using a virtual card. In an example embodiment, the instructions of FIG. 9a are an example detailed implementation of blocks 710 and 711. In the example embodiment, the virtual card number (also called the PAN of the virtual card), the expiry date of the virtual card and the other data are all computed by the payment gateway server 506. Details explaining the flow of data between the virtual card issuer server 401, the virtual card operator 402 and the virtual card acquirer 403 are also provided. The entities 401, 402, 403 can be part of the payment gateway server 506. In another example embodiment, the entities 401, 402, 403 are separate entities.

The operations in blocks 901 through 908 are part of the overall process for the mobile device getting a virtual card (block 909).

The process in FIG. 9a assumes that the mobile device 501 has the payment application 620 installed, and that the mobile device and the funding cards have been registered with the payment gateway server 506. It also assumes that a transaction with the merchant has already been initiated. For example, the POS terminal device 502 has displayed the message "Tap to pay", and the user has already selected a funding card through the payment application 620. These conditions are achieved using, for example, blocks 701, 702, 703, 704, 705, 706 and 707.

After receiving a user input to select a funding card, the mobile device 501 sends the transaction type (selected action in the application menu, in this case, "Pay with a virtual card") and a funding card identifier. In a preferred example embodiment, the funding card identifier is determined at the time of registration.

The virtual card operator 402 confirms that the selected funding card is valid (block 902) by ensuring for example that the funding card identifier is linked with the registered user and that the selected funding card has not expired since its registration.

The virtual card operator 402 sends a request to create a virtual card PAN to the virtual card issuing server 401 (block 903). The request for the virtual card PAN includes the last four digits of the funding card PAN and the expiry date of the funding card. The virtual card issuing server creates a virtual card PAN which has the last four digits identical to the last four digits of the funding card PAN. The virtual card also has the same expiry date and the funding card. The virtual PAN is created by using the first 6 digits assigned to the virtual card issuer, a unique, never used before, 8 digits long random number (to prevent collision), and the check mod10 digit.

After the virtual card PAN is computed, the virtual card issuing server 401 sends this information, in a response, to the virtual card operator 402 (block 904). The virtual card operator will generate portions of the Track Two data such as the PAN, the card expiry, service code, etc (block 905). In an example embodiment, the discretionary data (which is part of the Track Two data) is not computed by the payment gateway server 506 at this time. The virtual card operator 402 associates the virtual card PAN with the funding card PAN (block 906) and stores it in the database 509 (not shown). It also adds an internal expiry date to the virtual card records in the database. In an example embodiment, the internal expiry date is computed to be some predetermined time period after the time that the virtual card is created. For example, the internal expiry date is 48 hours from the date and time that the virtual card is created. The virtual card operator 402 then encrypts and sends the virtual card data (e.g. virtual card PAN, external expiry date, etc.) required by the mobile application to generate the final virtual card data set card (block 907). The result forms an encrypted virtual card payload that is sent to the mobile device 501 (block 908).

The mobile device 501 receives the PIN from the user (block 925). The mobile device 501 then uses the PIN to compute the discretionary data (which is a portion of the virtual card's Track Two data). The computation of the discretionary data can involve a dynamic value which changes over time, or with each transaction, thereby making the discretionary data the dynamic data. The data received from the virtual card payload (e.g. PAN, expiry date, and other data) and the discretionary data form the complete Track Two data set of the virtual card (block 926).

Figure 9B:
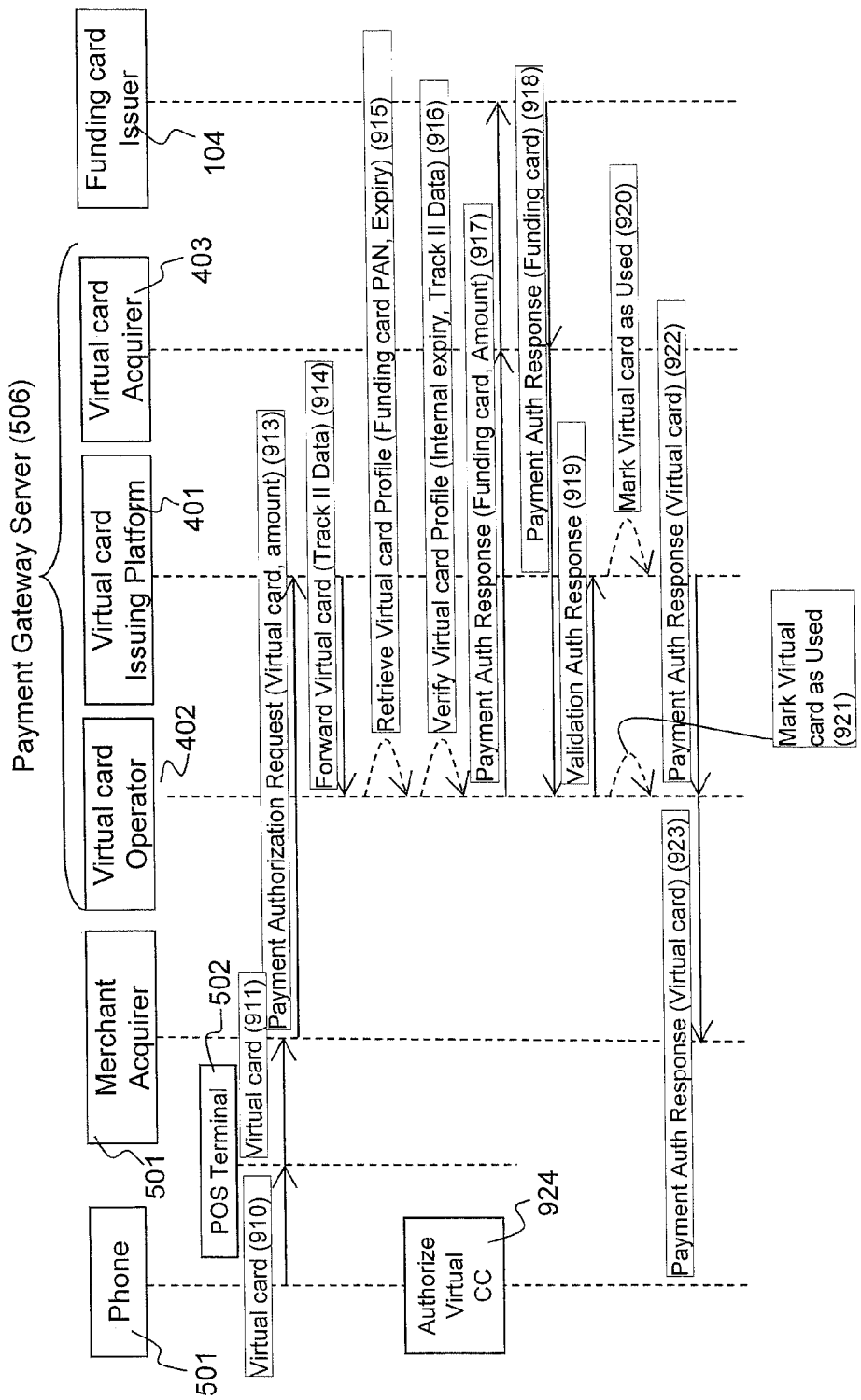
FIG. 9b is a flow diagram of an example embodiment of computer executable or processor implemented instructions for authorising virtual card details by the payment gateway server, the instructions implemented as part of the transaction process of FIG. 8.

Turning to FIG. 9*b*, an example embodiment of computer executable or processor implemented instructions is provided for validating and authorizing a transaction using a virtual card. The process in FIG. 9*b* assumes that a virtual card was already created (e.g. as per FIG. 9*a*) and focuses on the processing for verifying the virtual card. In an example embodiment, the instructions of FIG. 9*b* are an example detailed implementation of blocks 802 to 807. The entities 401, 402, 403 can be part of the payment gateway server 506. In another example embodiment, the entities 401, 402, 403 are separate entities.

The processes described with respect to blocks 910 through 923 are part of the overall authorization process of the virtual card (block 924).

The flow starts after the mobile device 501 has received the encrypted virtual card payload, decrypted the virtual card payload, captured via the GUI the user's PIN, and computed the complete virtual card data set (e.g. the complete Track Two data set). At that point, the mobile application can send the virtual card data set to the POS terminal device 502 via the NFC subsystem 609 (block 910). The POS terminal device 502 sends the virtual card data, along with transaction data, to the merchant acquirer 103 (block 911). The merchant acquirer 103 sends a payment authorisation request, which includes the virtual card data and the amount of payment, to the virtual card issuing server 401 (block 913) via the payment network.

The virtual card issuing server 401 sends the virtual card data to the virtual card operator 402 (block 914). The virtual card operator 402 uses the virtual card data, such as the virtual card PAN, to retrieve the associated user profile and funding card data (e.g. PAN and expiry date) (block 915). The virtual card operator 402 then verifies the received virtual card data, for example, by comparing data with the server computed version of the expected card data. The validation process is similar to operation of block 803.

If the virtual card data is successfully verified, then the virtual card operator 402 uses the funding card details associated with the virtual card transaction and send a payment authorisation request, which includes the funding card data and the corresponding payment amount, to the virtual card acquirer 403. The virtual card acquirer 403 forwards the details to the funding card issuing server 104 (block 917) via the payment network.

The funding card issuing server 104 receives and verifies the funding card data. If the funding card data is successfully verified, the funding card issuing server sends a payment authorisation code response to the virtual card acquirer 403, which forwards the same to the virtual card operator 402 (block 918), all via the payment network. The payment authorisation code response indicates whether the funding card data is accepted or denied, and a transaction identification number, etc.

The virtual card operator 402 sends a corresponding validation authorisation code response to the virtual card issuing server 401 (block 919). The virtual card operator 402 and the virtual card issuing server 401 marks the virtual card as being used (block 920 and block 921). In this way, if the same virtual card is used again at a later time, the virtual card operator 402 or the virtual card issuing server 401 will be able to detect a possible fraud.

The virtual card issuing server 401 sends the payment authorisation code response for the virtual card to the virtual card operator 402 (block 922). This payment authorisation code response for the virtual card is then forwarded to the merchant acquirer 103 (block 923) via the payment network.

As described earlier, in other example embodiments, the virtual card is not computed for every transaction. For example, after the virtual card is computed according to blocks 708, 709, 710, 711, 712, 713, and 714, for one or more subsequent transactions, the same virtual card can be used for the transaction. In other words, blocks 708, 709, 710, 711, 712, 713, and 714 are not performed for the one or more subsequent transactions. This saves on processing power and reduces the computation time when making a transaction. This may also be advantageous when the mobile device 501 is not able to communicate with the payment gateway server 506. In other words, even if the mobile device 501 is not able to communicate with the payment gateway server 506, the mobile device can use the already computed virtual card to perform the transaction.

In an example embodiment where the same virtual card is used for subsequent transactions, certain events, or time periods, or both may trigger a new virtual card to be computed and loaded on the mobile device 501. In an example embodiment, a new virtual card is computed when a given number of transactions have been performed using the previous virtual card, and when the mobile device 501 is able to communicate with the payment gateway server 506. The given number of transactions is, for example, a randomly generated number that is generated each time a new virtual card is issued to the mobile device 501. In another example embodiment, a new virtual card is computed for a transaction when a given number of days has passed since the previous virtual card was computed, and when the mobile device 501 is able to communicate with the payment gateway server 506. The given number of days is, for example, a randomly generated number that is generated each time a new virtual card is issued to the mobile device 501. It can be appreciated that randomly generated numbers prevent attackers from predicting when the next new virtual card will be computed for the mobile device.

Figure 10:
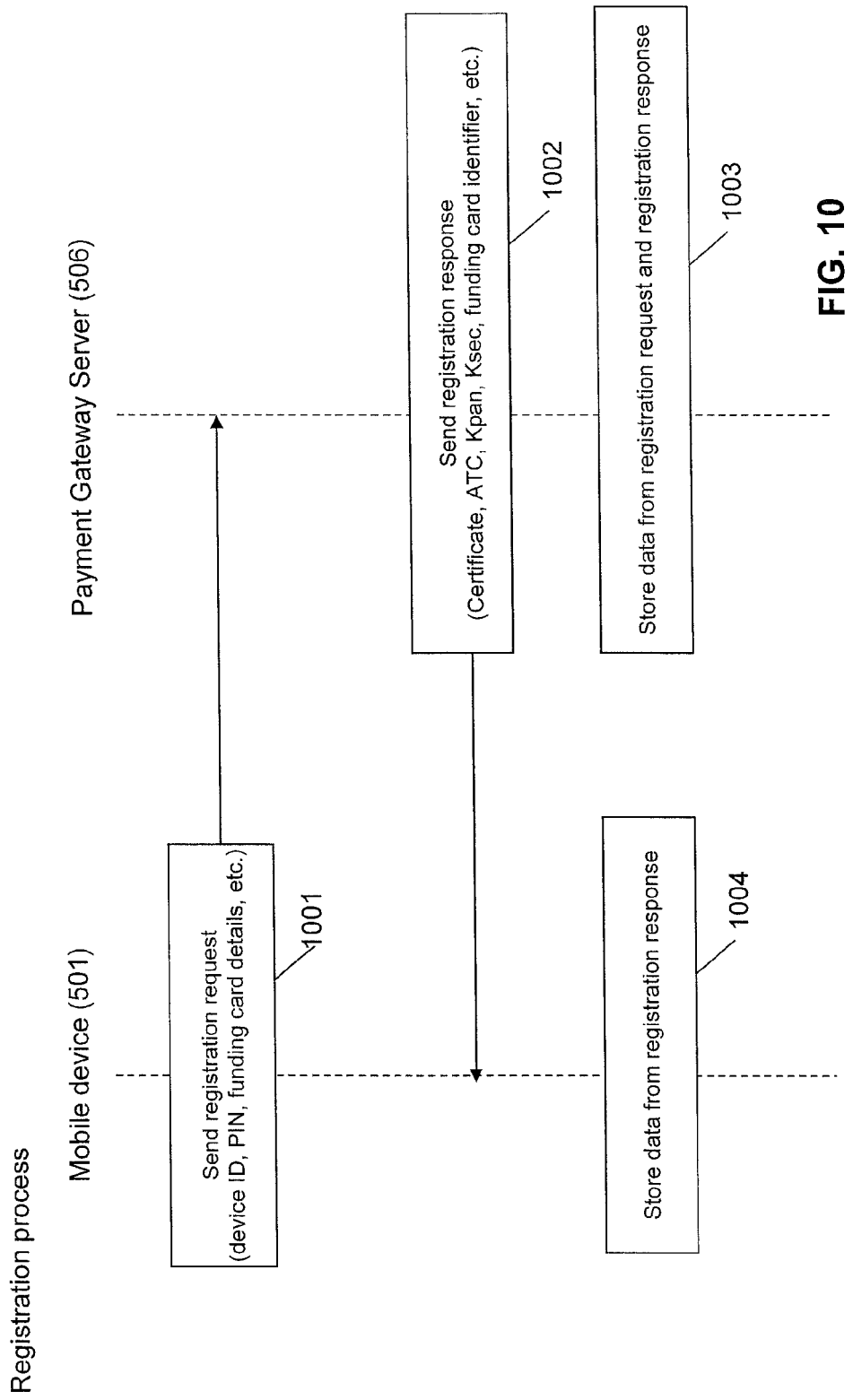
FIG. 10 is a flow diagram of an example embodiment of computer executable or processor implemented instructions for a registration process between a mobile device and a payment gateway server.

Turning to FIG. 10, an example embodiment of computer executable or processor implemented instructions are provided for registering a funding card and mobile device with payment gateway server. Such an embodiment can be used in combination with the principles described above. The mobile device 501 sends a registration request to the payment gateway server 506 (block 1001). The request includes the mobile device's device ID, a user provided PIN, and funding card details. After receiving the request, the payment gateway server sends a registration response to the mobile device (block 1002). The response include a certificate, an Application Transaction Counter (ATC), a key value (called Kpan) for generating a PAN, a secure element key value (called Ksec), and a funding card identifier that identifies each registered funding card(s). The certificate is a client certificate for the mobile device 501 and, in an example embodiment, it is configured to according to the RSA algorithm and has a 2048 bit length. The ATC is a counter that is initially set to a random value between "0" or "1000" and increments with each transaction. The initialized ATC value is a random value to prevent adversaries from predicting the ATC values. Copies of the ATC are stored and synchronise on both the payment gateway server and the mobile device. In an example embodiment, the ATC is a 10 digit value. In an example embodiment, the Kpan is 128 bits long, and the Ksec is 128 bits long.

The payment gateway server 506 stores the data from the registration request and the registration response in association with each other (block 1003). The mobile device 501 also stores the data from the registration response (block 1004).

Figure 11:
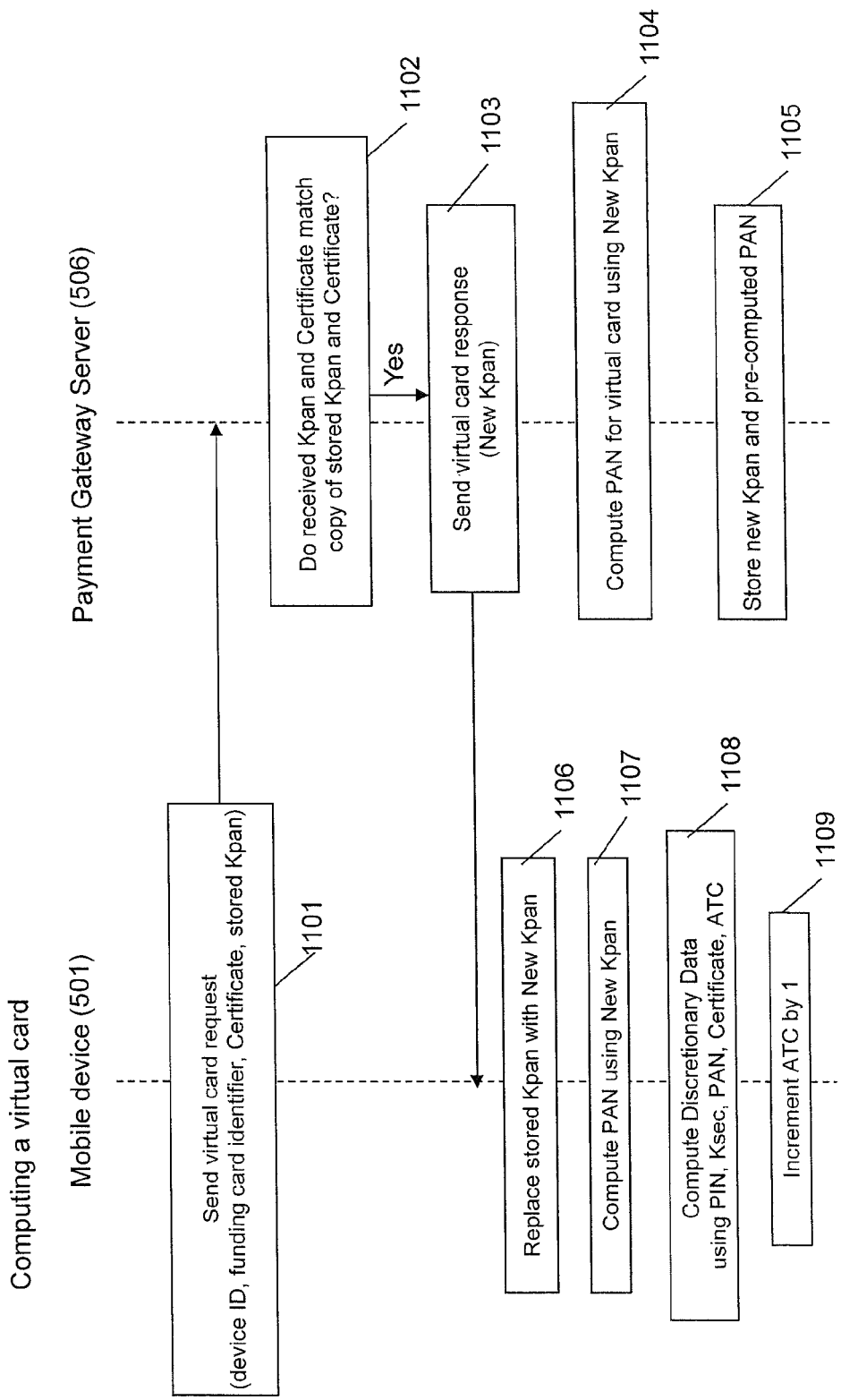
FIG. 11 is a flow diagram of an example embodiment of computer executable or processor implemented instructions for computing virtual card details including a primary account number and discretionary data, using the data exchanged during the registration process of FIG. 10.

Turning to FIG. 11, an example embodiment of computer executable or processor implemented instructions are provided for computing virtual card data. Such an embodiment can be used in combination with the principles described above for computing virtual card data. The mobile device 501 sends a virtual card request to the payment gateway server 506 (block 1101). This is similar to block 901 in FIG. 9a. The request includes the device ID, the identifier of the selected funding card, the Certificate and the stored Kpan. The stored Kpan can be from registration or from the previous transaction.

The payment gateway server 506 determines if the received Kpan and Certificate match the Kpan and Certificate stored on the payment gateway server (block 1102) associated with the DeviceID stored in the payment gateway server database. If so, then the payment gateway server 506 sends a virtual card response to the mobile device 501 that includes a new Kpan (block 1103). A new Kpan is used to generate a different PAN from the previous transaction, and to also prevent against replay attacks. The payment gateway server 506 computes the PAN for the virtual card using the new Kpan (block 1104). This new Kpan and the pre-computed PAN are stored by the payment gateway server 506 for later use (block 1105).

After the mobile device receives the new Kpan, it replaces the stored Kpan with the new Kpan (block 1106). It uses the new Kpan to compute a PAN for the virtual card, in the same way the payment gateway server computed the PAN (block 1107). If the conditions and data are correct, although the mobile device computes the PAN independently of the payment gateway server, the PAN computed by the mobile device should be identical to the PAN computed by the payment gateway server.

The mobile device then computes the discretionary data (which is part of the Track Two data) using the PIN, the Ksec, the PAN, the Certificate, and the ATC (block 1108). The ATC and the PAN keep changing with each transaction, which causes the discretionary data to be dynamic data.

The mobile device increments the ATC by 1 (block 1109).

In particular, the PAN is computed by the mobile device and the payment gateway server according to the following:

$$PAN=BIN(6)+SHA256[Kpan](8)+Luhn(1)+Reserved \quad (4)$$

wherein
BIN(6) is a 6-digit binary number to identify the payment gateway server;
SHA256[Kpan](8) is an 8-digit number generated by taking the sha256 of the Kpan value, further including converting the sha256 value to decimal and truncating to eight digits from the hash value;
Luhn(1) is a single digit used to ensure the virtual card always passes LUHN algorithm; and
Reserved(4) is a 4-digit number that is the same as the last 4 digits of the funding card PAN.

The above values are concatenated together to form the PAN. The symbol "+" in the above computation refers to the concatenation operation.

In an example embodiment of computing the PAN, the other values may be known or computed first, and the LUHN value is computed lasted. For example, an intermediate form to the PAN is 66666612345678X1111, whereby X represents Luhn(1). In other words, the BIN(6)=666666; SHA256[Kpan](8)=12345678; and Reserved(4)=1111.

Different LUHN algorithms can be used to solve for X, so as to ensure the PAN satisfies the LUHN algorithm. For example, an example embodiment algorithm includes (step 1) doubling the value of every other digit, starting from the right-most digit; (step 2) summing the all the individual digits including the digit X from step 1; and (step 3) solving the expression mod10(sum total from step 2)=0 for the digit X. In this example embodiment, the solution to the equation is X=9. Other LUHN algorithms can be used.

In an example embodiment, any digit before the last 4 digits of the PAN that satisfies the LUHN criteria can be used.

The discretionary data is computed using the following:

$$\text{Discretionary data}=HMAC\_SHA256[Ksec+PIN,M] \quad (10)$$

where M=concatenation of (PAN, Certificate ID, ATC)

Truncation is performed by encoding the SHA results in decimal, then taking the left most digits. It can be appreciated that SHA256 is a known cryptographic hash function, and HMAC is a hash based message authentication code involving a cryptographic hash function in combination with a secret cryptographic key. The secret cryptographic key of the HMAC function is the concatenated values of Ksec and PIN. The message M is the concatenated values of PAN, Certificate ID and ATC. The Certificate ID is from the Certificate.

Figure 12:
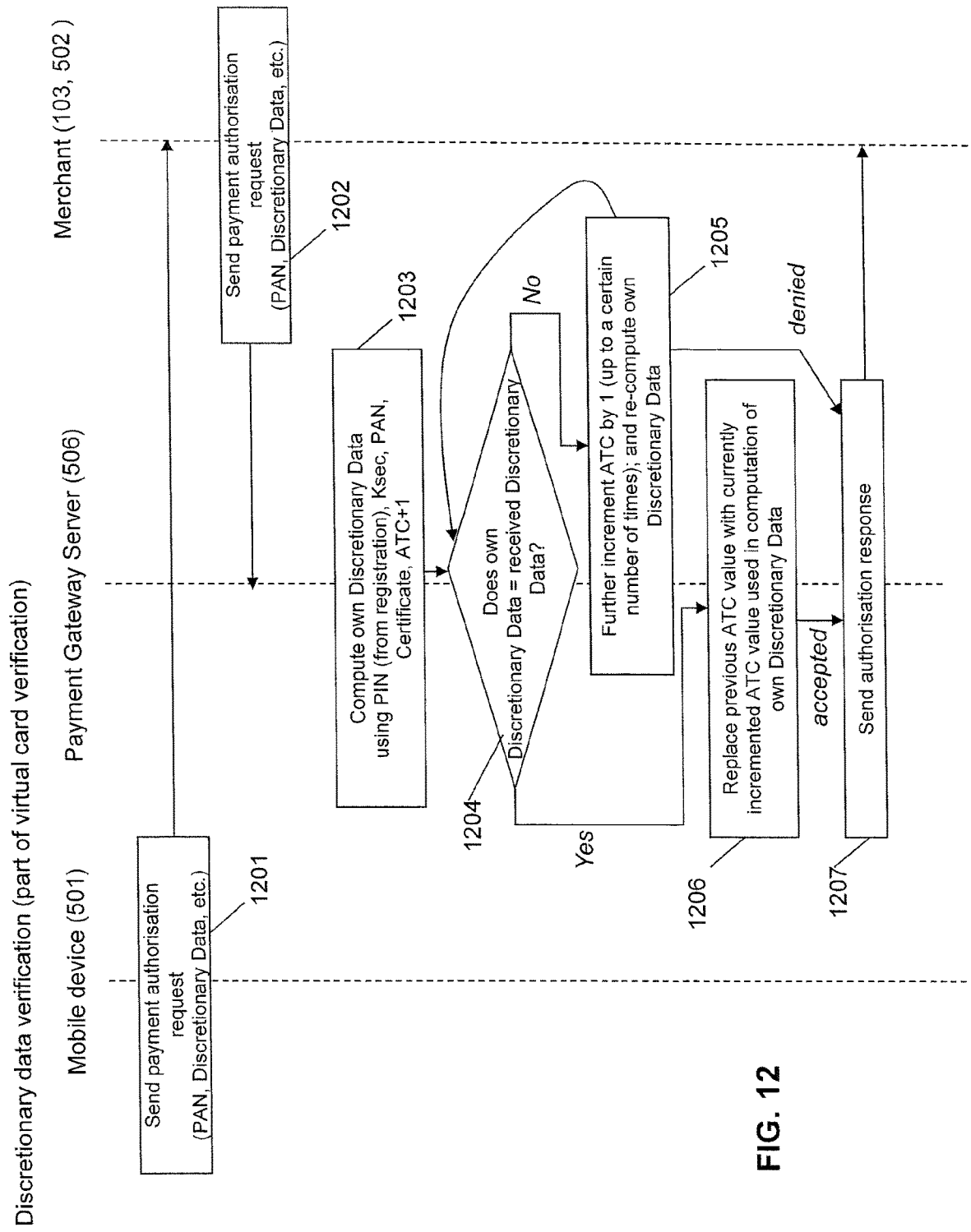
FIG. 12 is a flow diagram of an example embodiment of computer executable or processor implemented instructions for verifying the discretionary data of FIG. 11.

Turning to FIG. 12, an example embodiment of computer executable or processor implemented instructions are provided for verifying virtual card data, and in particular the verification by the payment gateway server of the discretionary data (e.g. the dynamic data). Such an embodiment can be used in combination with the principles described above for verifying the virtual card data. This can be a continuation of the process described in FIG. 11.

The mobile device 501 sends a virtual card to the merchant POS terminal 502, which then creates and sends a payment authorisation request to the merchant acquirer 103 (block 1201). The payment authorisation request is eventually received by the payment gateway server 506 (block 1202). The payment authorisation request includes, among other things, the PAN and the discretionary data of the virtual card, as computed by the mobile device 501.

After receiving the request, the payment gateway server 506 uses the PAN to find the relevant stored associated data (e.g. Kpan, Certificate, Ksec, funding card identifier, device ID, and other user data). The relevant stored associated data is identified by the precomputed PAN, which acts as an index to search into the server database. In other words, the received PAN is compared with a number of precomputed PANs, and if a match is found with a given precomputed PAN, then the stored data associated with that given precomputed PAN is considered the relevant stored associated data.

The payment gateway server 506 uses the relevant stored associated data to computes its own discretionary data. This can include using the PIN (received during the user registration process), the stored Ksec, the Certificate ID from the stored Certificate, and an incremented value of the ATC (block 1203).

The computation of the payment gateway's own discretionary data uses the following:

$$\text{Discretionary data}=HMAC\_SHA256[Ksec+PIN,M] \quad (10)$$

where M=concatenation of (PAN, Certificate ID, (ATC+1))
The ATC+1 represents the incremented ATC value.

The payment gateway server 506 determines if its own discretionary data is equal to the received discretionary data (block 1204). If they are not equal, the payment gateway server further increments ATC by "1" and re-computes its own discretionary data (block 1205). The process returns to block 1204 to check if the discretionary data sets are equal. The process involving block 1205 can be repeated, such so that each time the ATC value is further incremented by 1. This can be done up to a certain number of times (e.g. 10 times), after which the transaction process will be stopped.

If the range of ATC values (e.g. between ATC+1 and ATC+10) does not generate an identical discretionary data set, then the verification is unsuccessful. The range is to account for the possibility that the mobile device's ATC counter may have incremented without the payment gateway server's knowledge. Therefore, a buffer or range or ATC values is used.

If the payment gateway server's own discretionary data is the same as the received discretionary data, then the payment gateway server replaces the previous ATC value with the currently incremented ATC value that is used in the computation of its own discretionary data. In this way, the ATC value stored on the payment gateway server should now be equal to the ATC value stored on the mobile device.

It is noted that if the PIN used by the mobile device to compute the discretionary data is incorrectly entered by the user (e.g. is not the same as the PIN provided at registration), then the discretionary data from the mobile device will not equal the payment gateway server's own discretionary data. This is because its own discretionary data is computed using the PIN provided at registration. In this way, the PIN provided by the user into the mobile device during each transaction is implicitly verified by the payment gateway server.

Continuing with FIG. 12, after the data is successfully verified or not, the payment gateway server eventually respond to the merchant by sending an authorisation response to the merchant (103, 502) (block 1207). To further clarify, if the discretionary data verification was not successful (as per block 1205 after a certain of iterations has been reached), then a negative payment authorisation response is sent to the merchant (block 1207).

The methods and systems described herein do not rely on having a software payment card stored on the secure element on the mobile device to facilitate contactless payment transaction. This is because the PAN, and the other card data elements of the funding card are not stored on in the mobile device. Instead the PAN and expiry date of the funding card is stored on a secure server (e.g. the payment gateway server). Furthermore, the virtual card data is created on a secure server, and is encrypted for a particular mobile device. Furthermore, the discretionary data in the Track Two data is a function of the PIN which re-entered with each payment. The virtual card data is only sent at the time of making the payment, and can only be used once. In addition, only the server can validate the virtual card data. In other words, there is nothing for an adversary to access via brute force on the mobile device without being detected.

Furthermore, the virtual card encrypted payload is not reusable. This is because as soon as the card is used once, it cannot be used again by any other party.

It is also noted that, some example embodiments, the one-time virtual card is created just-in-time, ahead of the payment authorization from merchant.

Furthermore, the funding card details are never provided to the merchant, since the virtual card details are provided instead.

The methods and systems described herein are fully compatible with standard 4-party card payment model and systems. There is no system change required by the issuer of the funding card, merchant, acquirer or payment network.

The methods and systems described herein also allow for the use of a "single application" to be used to support one or many virtual cards as well as one or many funding cards. This reduces the required storage on the secure element (and generally storage on the mobile device) so as not to limit the number of cards a customer can load into a secure element.

It can be appreciated that the methods and systems described herein enable the cardholder (e.g. end user) to register any funding card they want into their NFC-enabled mobile device, independently of the card issuer having the infrastructure or a commercial relationship with a particular mobile operator.

The methods and systems described herein can be used with any type of funding card. The funding cards and the mobile device are pre-registered with the payment gateway server 506. This registration is independent of any particular mobile phone carrier and any particular funding card issuer. As a result, no commercial agreement and additional computing infrastructure are required by a mobile phone carrier and a funding card issuer to facilitate contactless payment using a mobile device. This in turn reduces the cost incurred by the funding card issuer to issue software payment cards to mobile devices.

In an example embodiment, a method performed by a server is provided for facilitating payment. The method includes: receiving a message from a mobile device identifying a funding card; searching a database of multiple cards associated with the mobile device for a funding card number associated with the identified funding card; computing data for a virtual card, the data comprising a card number and an expiry date; storing the data for the virtual card number in association with the funding card number; sending the data for the virtual card to the mobile device; computing the card details using the user PIN as input; receiving a first payment authorisation request from a merchant acquirer, the request comprising the data for the virtual card and a requested payment amount; retrieving the funding card number based on the data for the virtual card; sending a second payment authorisation request to a funding card issuer, the request comprising the funding card number and the requested payment amount; receiving a payment authorisation response from the funding card issuer; and sending the payment authorisation response to the merchant acquirer.

E-Commerce and Internet Based Transactions

In another example embodiment of the proposed systems and methods, the above described principles of the virtual card is also applied to e-commerce or Internet-based transactions. In other words, while the above examples include the use of a physical POS terminal device 502 that interacts with the mobile device 501, the e-commerce or Internet-based transactions do not use the POS terminal device 502. A mobile device 501 can instead communicate with the merchant acquirer 103 or the payment gateway server 506 (e.g. via an e-commerce webpage or payment application). In other word, to execute a transaction, the mobile device sends the virtual card data to the merchant acquirer 103 or the payment gateway server 506 (e.g. via an e-commerce webpage or payment application) using Internet connection.

Figure 13:
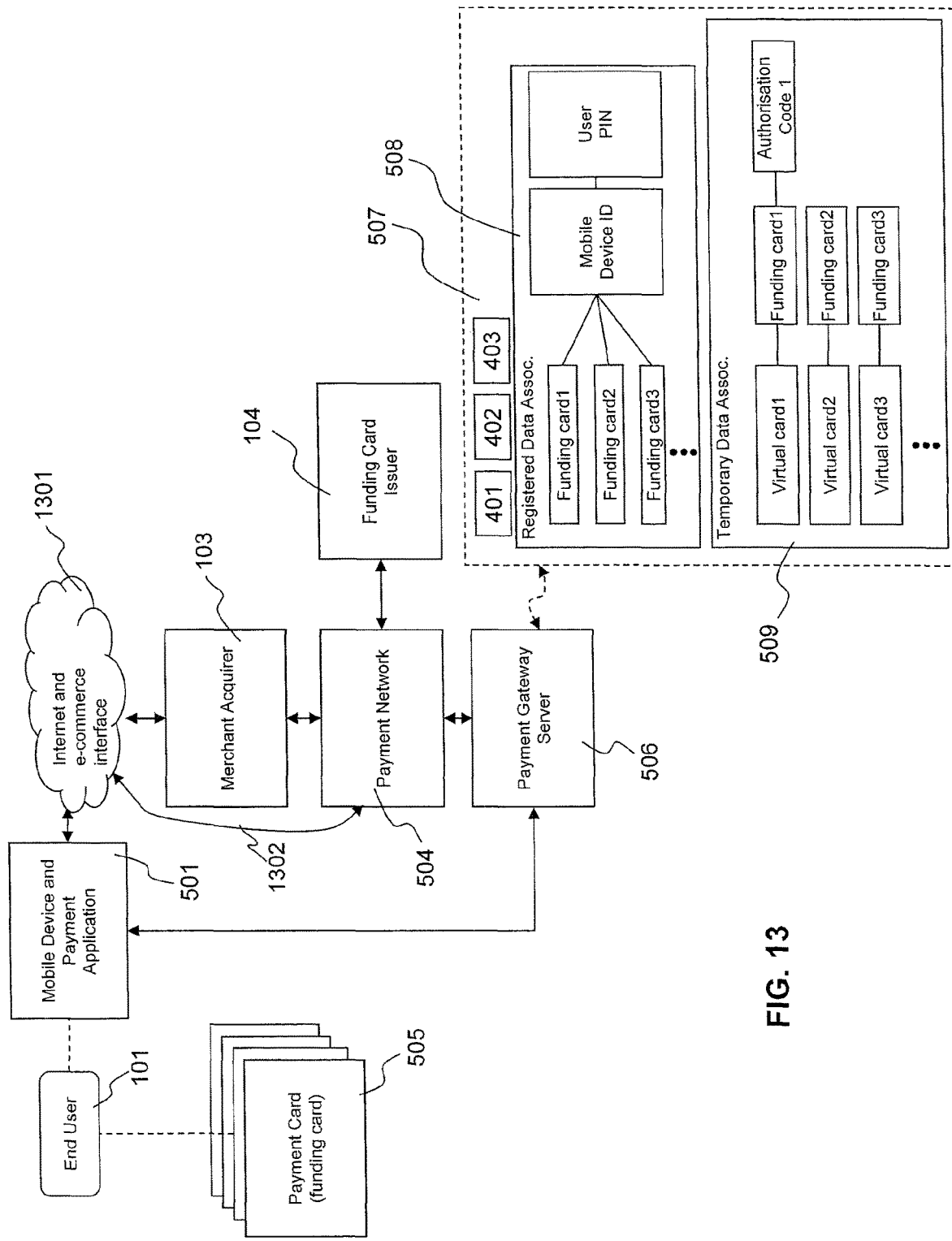
FIG. 13 is a schematic diagram showing example components of a system used to facilitate an e-commerce transaction using a virtual card.

For example, the above operations involving the POS terminal device 502 can be performed, but using an e-commerce webpage or payment application instead of the POS terminal device 502. As shown in FIG. 13, a schematic diagram view of the entities involved in an example embodiment of a payment transaction using a virtual card to facilitate a payment is provided, which is similar to FIG. 5. However, unlike FIG. 5, which shows a POS terminal device 502, in FIG. 13, an Internet and e-commerce interface 1301 is shown interacting with the mobile device 501 and the merchant acquirer 103. In another example embodiment, in addition, or in the alternative, the mobile device 501 interacts with the payment network 504 directly through the Internet and e-commerce interface as shown by connection 1302. It is appreciated that the mobile device 501 does not require an NFC subsystem 609 to perform transactions using the Internet and e-commerce interface 1301. In other words, the mobile device 501 may or may not have the NFC subsystem 609, without affecting the storage and retrieval of information on the secure element 622, and without affecting an Internet or e-commerce transaction. The mobile device connects to the Internet and e-commerce interface 1301 through a webpage that can be viewed through an Internet browser application 619 on the mobile device. In another example embodiment, the mobile device connects to the Internet and e-commerce interface 1301 through a payment application GUI.

In general, the above examples described with respect to FIGS. 7, 8, 9a, 9b, 10, 11 and 12 are also used for e-commerce transactions, but with the POS terminal 502 replaced with the Internet and e-commerce interface 1301 as per FIG. 13.

Figure 14:
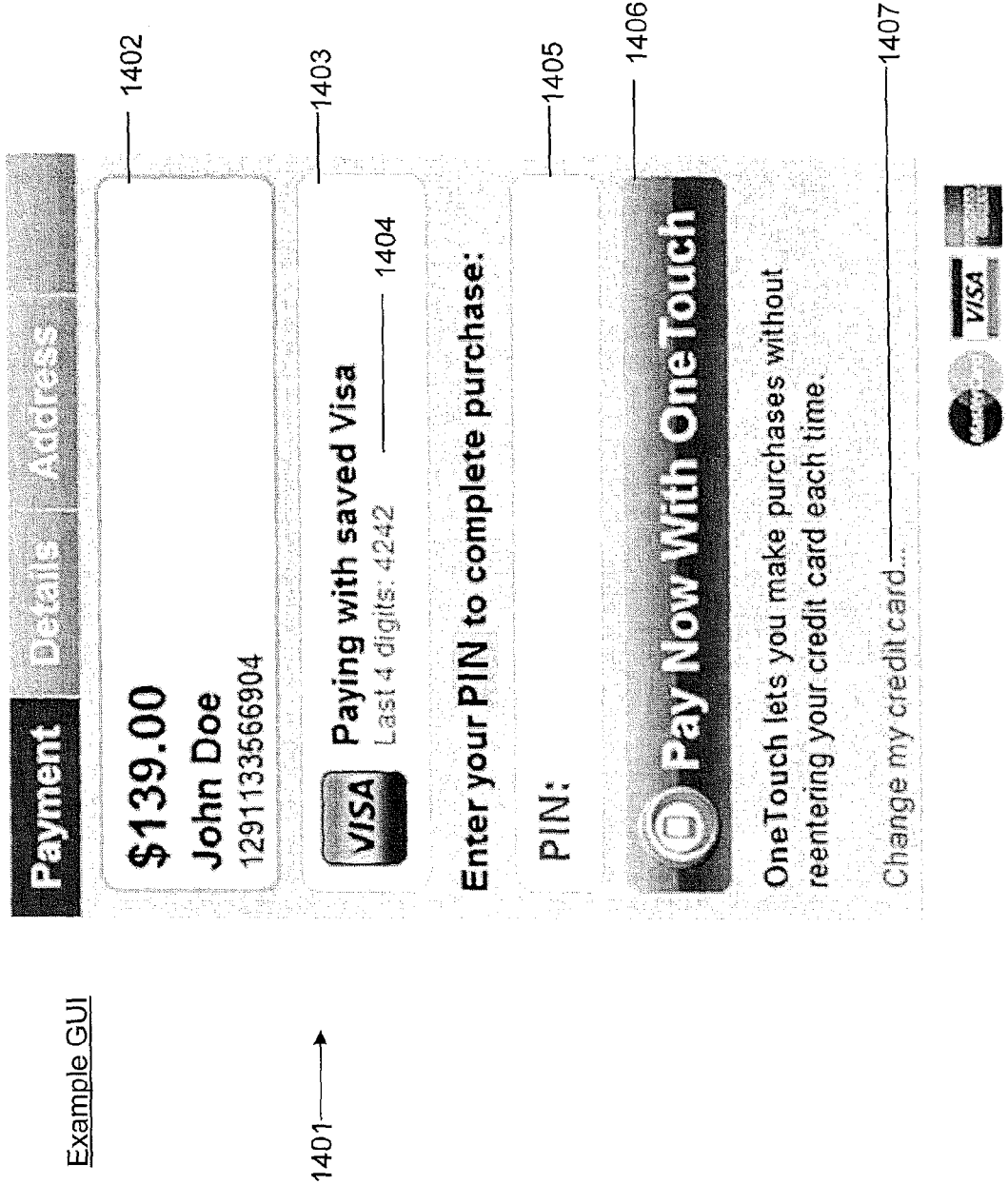
FIG. 14 is a screenshot of an example embodiment of a graphical user interface (GUI) for performing an e-commerce transaction using a virtual card.

An example graphical user interface (GUI) 1401 as displayed by an e-commerce webpage or payment application GUI is shown in FIG. 14. This is displayed by the mobile device 501, for example, when a user has selected a product, an item, or a service to purchase. The transaction details 1402 are shown, which include, for example, the amount to be paid by the user and the name of the user. Other information, for example, the product ID or user ID may be shown. The funding card information 1403 is also shown and, in the case of a credit card, may show the last four digits of the funding card 1404. In an example embodiment, a default funding card is displayed, but a different funding card can be selected using the control 1407. In the example of FIG. 14, the mobile device 501 will make a payment using a virtual card associated with the Visa funding card ending in the digits '4242' (1404). In another example embodiment, the last four digits are not displayed to prevent attackers from viewing this information.

When the GUI 1401 is displayed, to complete the transaction, the user enters in a PIN into the field 1405 and selects the "pay now" button 1406. When the GUI 1401 detects these events, the mobile device 501 sends virtual funding card data to the merchant acquirer 103 or the payment gateway server 506, via the Internet and e-commerce interface 1301.

In another example embodiment GUI (not shown), the "pay now" button 1406 is not displayed. For example, the GUI is able to detect the length of how many characters were entered into the entry field 1405. After the GUI detects that the required number of characters have been entered in the entry field 1405, the PIN is automatically submitted.

In an example embodiment, the PIN is the card verification value (CVV), card security value (CSV), card security code (CSC), card code verification (CCV), card verification code (CVC or CVC2), etc., of the funding card and this value is determined by the funding card issuer 104. In another example embodiment, the PIN is determined by the user. In another example embodiment, the PIN is a password. In another example embodiment, the PIN is a password used by the system "Verified by Visa", which is a supplemental verification.

Figure 15:
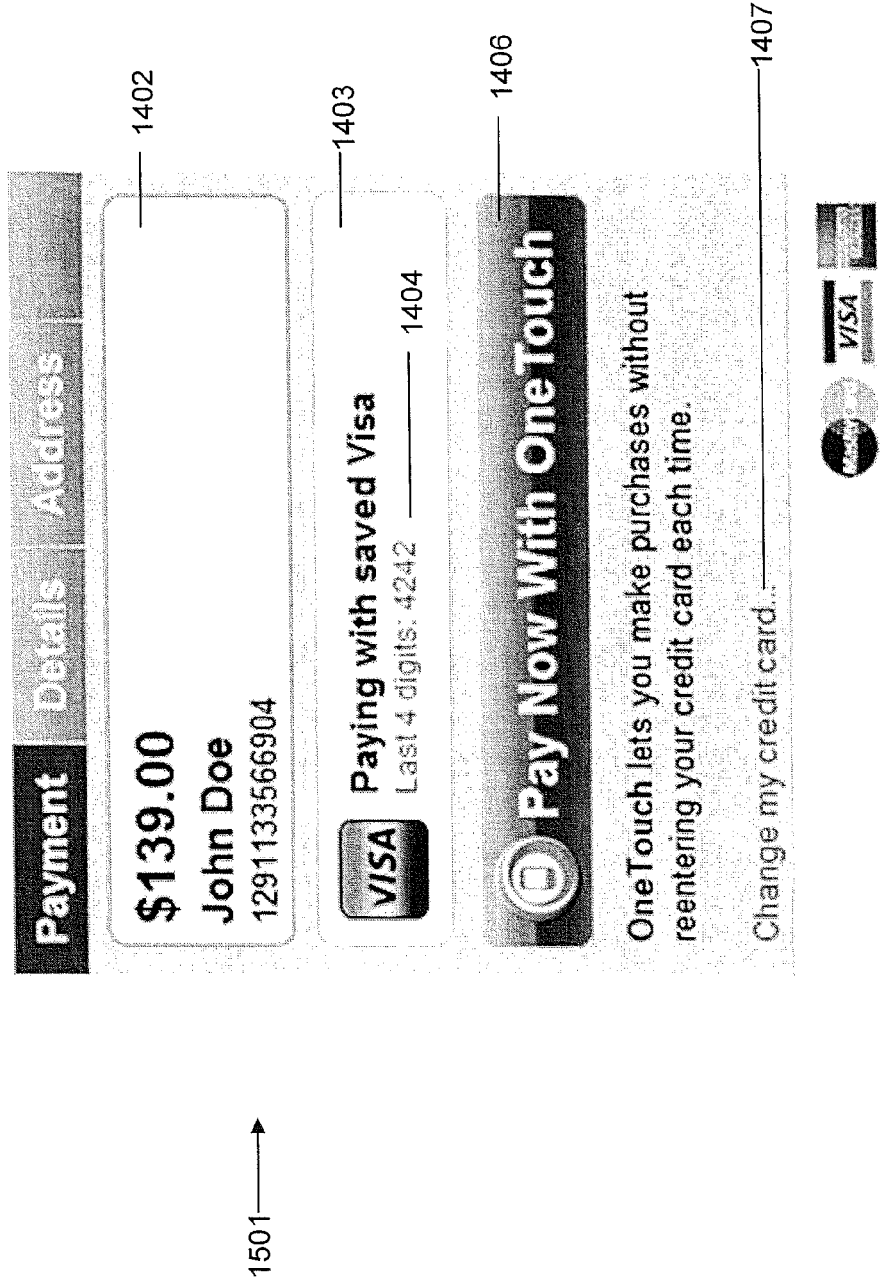
FIG. 15 is a screenshot of another example embodiment of a GUI for performing an e-commerce transaction using a virtual card.

In another example embodiment, as shown in FIG. 15, another example GUI 1501 is provided and it displays transaction details 1402, funding card information 1403, and a "pay now" button 1406. In other words, when the GUI 1501 is displayed, the user only needs to select the "pay now" button 1406 to execute the transaction. This will cause the mobile device 501 to send virtual funding card data to the merchant acquirer 103 or the payment gateway server 506, via the Internet and e-commerce interface 1301. It is appreciated that a PIN is not required using the GUI of FIG. 15.

Figure 16:
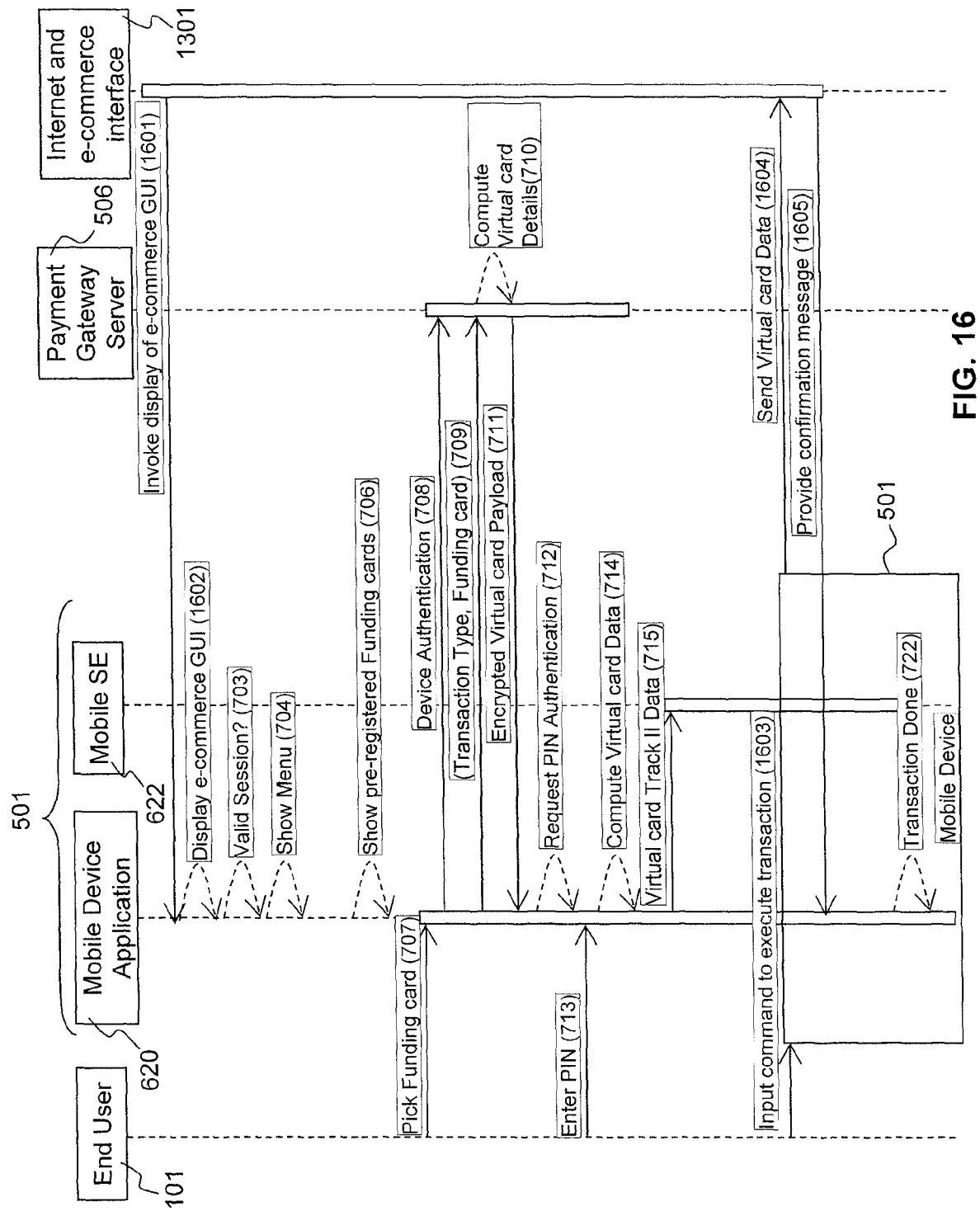
FIG. 16 is a flow diagram of an example embodiment of computer executable or processor implemented instructions for performing an e-commerce transaction using a virtual card, the instructions performed by at least a mobile device, a point of sale terminal and a payment gateway server.

Turning to FIG. 16, an example set of processor implemented instructions are provided for making a payment using an Internet and e-commerce interface 1301. FIG. 16 is similar to FIG. 7, so similar operations are not repeated in detail. At block 1601, the Internet and e-commerce interface invokes the mobile device to display data on an e-commerce GUI (e.g. 1401 and 1501). The mobile device 501 displays the e-commerce GUI at block 1602. Optionally, though not necessarily, blocks 703 and 704 are performed by the mobile device 501. Furthermore, the mobile device, via the e-commerce GUI, optionally shows pre-registered funding cards at block 706, and the user selects a funding card 707. In other embodiments, there is only one funding card, or there is a default funding card that is used, unless changed by the user. The operations at blocks 708, 709, 710, and 711 are performed. As described above, in some example embodiments, a previously computed virtual card can be used and so, a new virtual card does not need to be computed for each and every transaction.

Continuing with FIG. 16, in an example embodiment, the e-commerce GUI requests PIN authentication (block 712) and the user provides the PIN (713). However, in other embodiments, providing the PIN is not required. The operations in blocks 714 and 715 are also performed. However, in other embodiments, if the previously computed virtual card is being used, the blocks 714 and 715 are not performed.

In an example embodiment, the user inputs a command, via the e-commerce GUI, to execute the transaction (block 1603). For example, the user can select the "pay now" button 1406, or provide some other input that is understood to execute the transaction.

Figure 17:
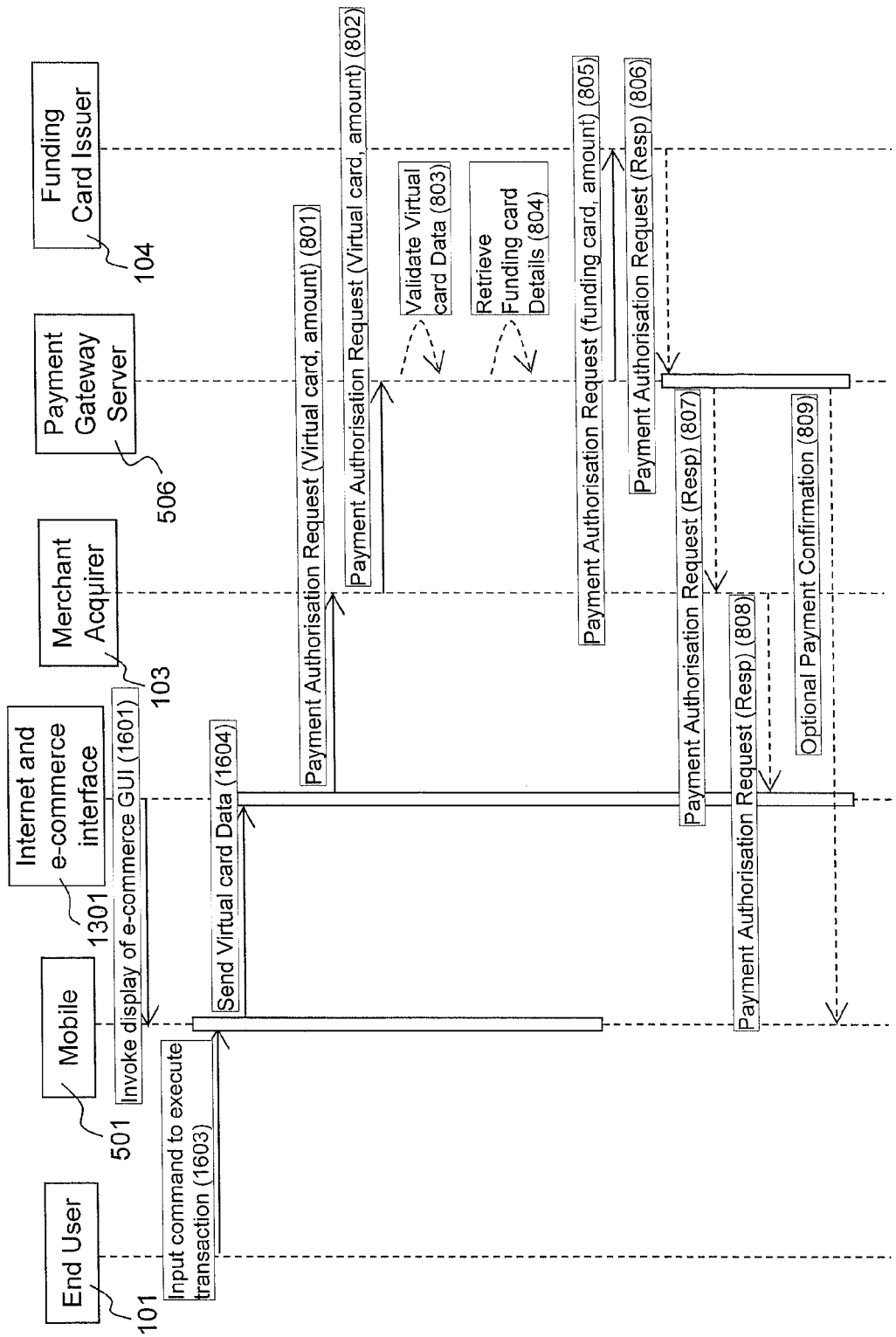
FIG. 17 is a flow diagram of an example embodiment of computer executable or processor implemented instructions for performing an e-commerce transaction using a virtual card, the instructions showing the interaction between at least a merchant and a payment gateway server.

The mobile device sends the virtual card data to the Internet and e-commerce interface (block 1604), and the Internet and e-commerce interface sends the same to the merchant acquirer 103 or payment gateway server 506 (see FIG. 17). When transaction is complete (either accepted or denied), a confirmation message is sent via the Internet and e-commerce interface to the mobile device (block 1605). Block 722 may then be performed.

FIG. 17 shows example processor implemented instructions, which is a continuation from FIG. 16. Blocks 1601, 1603 and 1604 are included to show context, and were implemented in previous FIG. 16. FIG. 17 is similar to FIG. 8, but instead includes the Internet and e-commerce interface 1301. The operations of blocks 801, 802, 803, 804, 805, 806, 807, 808 and 809, apply to FIG. 17 and are not described in detail again, since these blocks were described in detail with respect to FIG. 8.

Party-to-Party Value Transfer

In other example embodiments of the proposed systems and methods, the following relates generally to facilitating a party-to-party value transfer using a virtual card on a mobile device.

Mobile devices can be used to transfer value, for example, between two persons. A mobile device can be equipped with a near field communication (NFC) system which can be used to transfer payment credentials, such as payment card information, to another mobile device that is also equipped with a NFC system.

It is recognized that, it is difficult to transfer money from one person's mobile device to another person's device, or more generally, from one party to another party using mobile devices. In many cases, mobile phone carriers and funding card issuers do not have computing systems to support the transfer of money from one mobile device to another mobile device, or it is cost prohibitive to the parties. It is also recognized that it is difficult to transfer money between mobile devices in a secure manner, while still maintaining convenience.

It is also recognized that there are situations in which a sending user wishes to transfer value to a receiving user, but the sending user does not know or trust the receiving user. For example, a sending user owes money to a receiving user, but does not know or trust the receiving user. Transferring value (e.g. money) using a funding card to the receiving user, without providing any data or information about the funding card, can be difficult. Furthermore, doing so in a quick and convenient way also makes the transfer of value difficult.

It is also recognized that there are situations in which the receiving user does not have a bank account. In other words, the receiving user does not have an established account to receive and store the value (or funds) from the sending user. Therefore, in many cases, the receiving user cannot accept or receive the value (or funds) from the sending user.

Transferring Value Party-to-Party Using a Transfer ID

The methods and systems described herein allows a sender (e.g. a first person) to send value, for example, money, to a receiver (e.g. a second person). In particular, the sender's NFC-enabled mobile device is "tapped" against the receiver's NFC-enabled mobile device, and the transfer of value occurs. The transferred value is stored in association with the receiver's mobile device as a prepaid virtual card. The receiver can then use their NFC-enabled phone to make payments with the prepaid virtual card, either via NFC (e.g. with a merchant's NFC-enabled point of sale terminal) or via the Internet (e.g. m-commerce or e-commerce).

As an alternate example embodiment, instead of sending a virtual card, the payment gateway server 506 sends a transfer ID to the giving user to be shared with the receiving user. The transfer ID is used by the payment gateway server to identify the selected funding card and amount specified by the sending user. In other words, the transfer ID is considered a pointer that points to the information stored on the payment gateway server to identify the selected funding card and amount specified by the sending user. Non-limiting examples of a transfer ID can be numerals, a collection of characters (including numerals), and a URL.

The systems and methods described herein also allow a cloud-based wallet payment gateway server to synchronize with a receiver's NFC-enabled mobile device and application to facilitate contactless transfers of value from a sender's NFC enabled mobile device. A sender user selects a funding card and provides the amount for making the contactless party-to-party value transfer, through their mobile device. A transfer ID is generated by the payment gateway server to complete the party-to-party payment transaction. The transfer ID is used by the payment gateway server to identify the selected funding card and the amount to be transferred by the sending user. On the payment gateway server, the transfer ID is temporarily associated with the funding card and the allowed amount of value to be transferred.

When a party-to-party value transfer is initiated, the data including the transfer ID data is sent through the NFC system on the sender's mobile device to the receiver's NFC-enabled mobile device. This information is sent from the receiver's mobile device to the cloud-based wallet payment gateway server (also referred to the "payment gateway server"). The cloud-based wallet payment gateway server verifies the transfer ID. If successfully verified, the sending user's funding card details associated with the transfer ID are retrieved and sent to the funding card issuer server via the payment gateway server to complete the value transfer authorisation. The funding card issuer server verifies the funding card and sends back an authorization code to the payment gateway server. The payment gateway server then acts as a virtual card issuer server and generates a prepaid virtual card for the receiver user, which can be used by the receiver's mobile device.

The value transfer for the prepaid virtual card can be settled when the payment gateway server initiates a settlement request, typically once at the end of every business day, using the standard method. This includes retrieving all the funding card numbers and the corresponding authorization codes received during the period and sending this information to the funding card issuer for settlement. The funding card issuer verifies the funding card numbers and authorisation codes, and if successfully verified, sends the money back to the bank account associated with the payment gateway server via a standard electronic funds transfer method. The money is stored in association with the prepaid virtual card account. In an example embodiment, the virtual card issuer is the payment gateway server, or a module within the payment gateway server.

In another example embodiment, before the sender's mobile device sends the transfer ID to the receiver's mobile device, the sender's mobile device requests authorisation to the funding card issuer via the payment gateway server. After authorisation is completed a transfer ID is created and then sent to the receiver's mobile device. The receiver's mobile device verifies the transfer ID with the payment gateway server. The payment gateway server then performs a settlement request associated with the authorization request from the transfer ID. The payment gateway server then generates a prepaid virtual card for the receiver user, which can be used by the receiver's mobile device.

In another example embodiment, before the sender's mobile device sends the transfer ID to the receiver's mobile device, both the authorisation and the settlement occur. After the funding card issuer server completes the authorisation, and after the settlement for the value transfer has been performed and a prepaid virtual card has been created, then the transfer ID is transferred to the receiver's mobile device.

In an example embodiment, the systems and methods described herein allow an NFC-enabled device with the party-to-party transfer application to transfer a user-defined amount of value to another NFC-enabled device, also having the party-to-party transfer application, without ever disclosing the sender's funding card details to the receiver. Furthermore, the sender is able to set or determine the value to give to the receiver. A successful transfer results in the receiving user being issued a prepaid virtual card for the same amount of value as sent by the sending user. Therefore, even if the receiving user does not have a bank account to receive the value, the receiving user can still be given a prepaid virtual card which can be used by the receiving user to make payments and transactions.

It can be appreciated that any funding card can be used, and is not limited or dependent on the mobile phone carrier having agreement with the funding card issuer. For a card to be used, it first needs to be registered with the service. It can also be appreciated that any number of funding cards can be registered in association with the mobile device. The cardholder's mobile device includes a payment application (also called value transfer application) that can interact with the payment gateway server.

In an example embodiment of the registration, for each funding card the sending user wishes to register, the user types in card details into the mobile device (e.g. the name printed on the funding card, the PAN printed on the funding card, the expiry date printed on the funding card, and the static security code printed on the funding card). As mentioned above, funding card issuer does not need to have an existing agreement with any mobile phone carrier. The mobile device sends this data and a mobile device ID to the payment gateway server. The payment gateway server computes a funding card identifier which identifies the given funding card. The payment gateway server stores the funding card identifier in association with the funding card details, and it sends the funding card identifier to the mobile device for storage. In another example embodiment, the user simply taps a taps a contactless card on the mobile device so that the mobile application can capture the card details and send it to the payment gateway server for registration. In an example embodiment, the funding card identifier is a value that is different from the PAN, expiry date or static security code of the funding card. For example, the funding card identifier is a random value so that, if intercepted by an adversary, would not be able to recognize any funding card details. In an example embodiment, the mobile device does not store any funding card details or stores limited funding card details (e.g. the name funding card issuer and the last 4 digits of the PAN). The mobile device stores the funding card identifier, which it sends to the payment gateway server to indicate a specific funding card. It can be appreciated that there are other methods to capture the funding credit card details (e.g. besides the user typing in the data), which can be used with the principles described herein.

It can be appreciated that a single payment application is required on the mobile device, which can manage multiple funding cards. If multiple funding cards are registered, each of the associated funding card identifiers are stored on the mobile device, within the single payment application. The details of each individual funding card are stored on the payment gateway server. In this way, the payment gateway server acts as a cloud-based server that stores the details of multiple funding cards.

Figure 18:
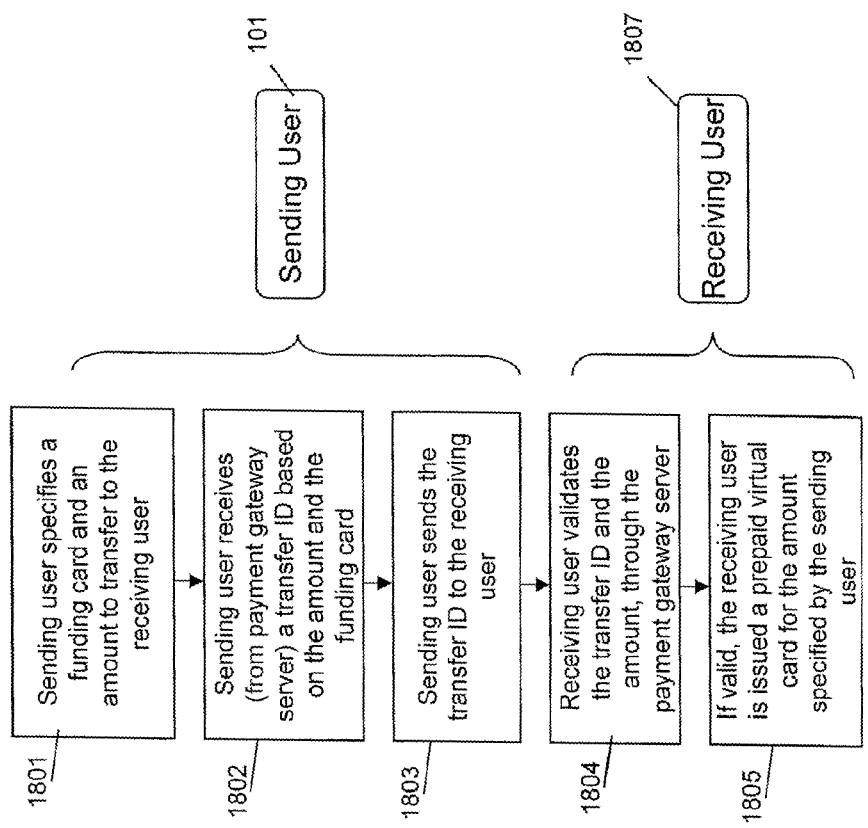
FIG. 18 is a flow diagram showing a party-to-party value transfer.

Turning to FIG. 18, an example of computer executable or processor implemented instructions are provided for facilitating a transfer of value from a sending user 101 to a receiving user 1807. At block 1801, the sending user specifies a funding card and an amount to transfer to the receiving user. At block 1802, the sending user receives, from the payment gateway server, a transfer ID that is based on the amount and the funding card. At block 1803, the sending user sends the transfer ID to the receiving user. At block 1804, the receiving user validates the transfer ID and the amount, for example, through the payment gateway server. At block 1805, if valid, the receiving user is issued a prepaid virtual card for the amount specified by the sending user.

With respect to block 1803, although many of the example embodiments described herein use NFC technology to transmit data between the mobile devices, it can be appreciated that other data transmission methods can be used. For example, the transfer ID can be sent to the receiving user's mobile device via Bluetooth, infrared, and other peer-to-peer (P2P) communication technologies. In other example embodiments, the transfer ID may be transmitted through other means that may not necessarily be P2P, including instant messaging, text messaging, barcodes, 2D barcodes, QR code, email, etc. In an example embodiment, additional data or alternative data is transmitted from the sending user's mobile device to the receiving user's mobile device in order to facilitate the transfer of value, resulting in a prepaid virtual card available for use by the receiving user. In an example embodiment, the transfer ID is securely transmitted, for example, when it is transferred between any of the server, the sending user's mobile device, and the receiver' user's mobile device.

Figure 19:
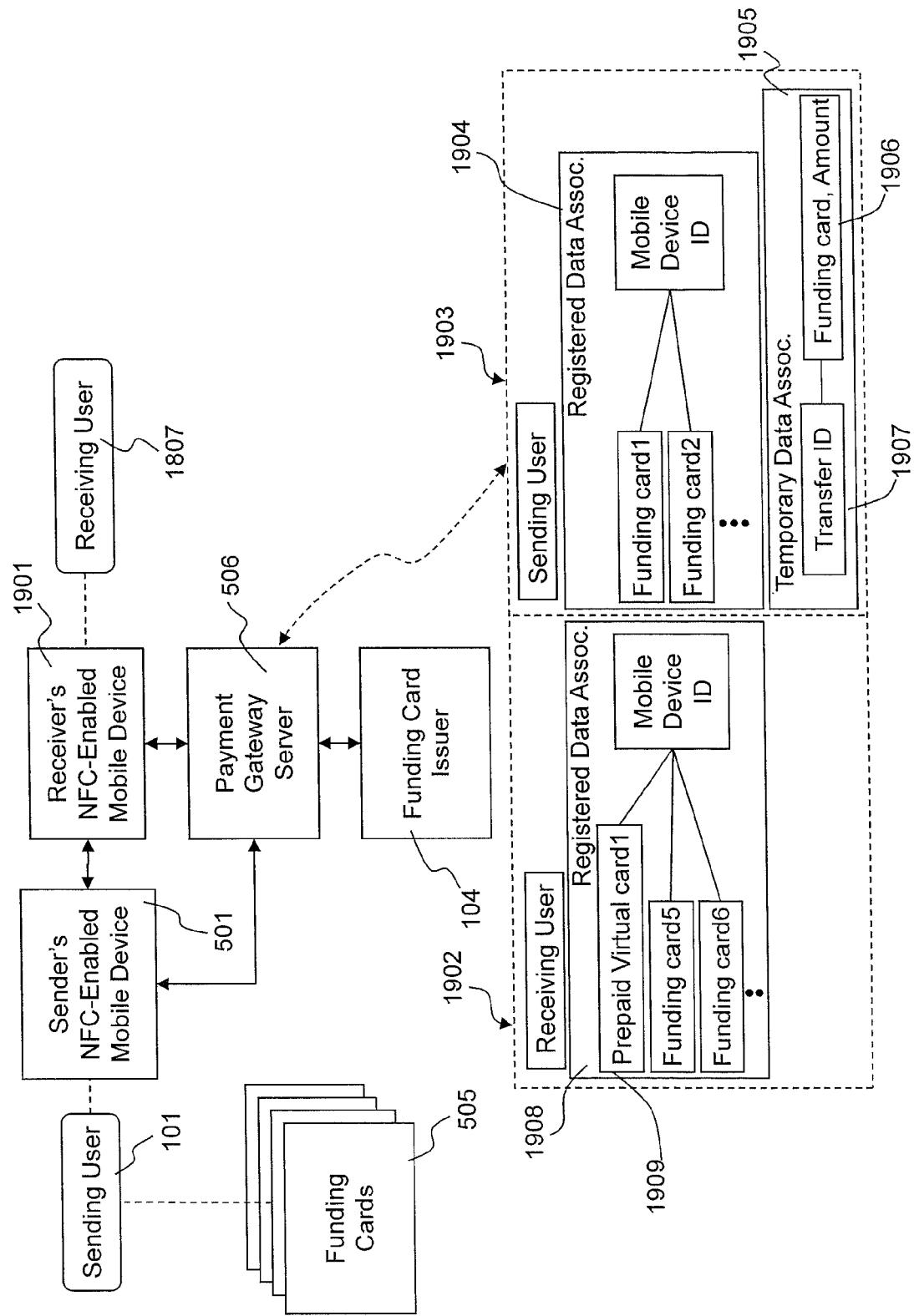
FIG. 19 is a schematic diagram showing example components of a system used to facilitate a party-to-party value transfer using a transfer ID.

Turning to FIG. 19, example embodiment components of a system for facilitating a party-to-party transfer of funds is shown using the transfer ID. The sending user 101 is shown. The user has one or more funding cards 505. For example, the user has multiple funding cards. The user 101 also owns an NFC-enabled mobile device 501, which includes a payment application (also called a value transfer application). The sender's mobile device 1901 is configured to interact, via NFC, with the receiver's NFC-enabled mobile device 1901. It is appreciated that the receiver's mobile device 1901 may have similar hardware and software components to the sender's mobile device, as shown in FIG. 6. Both the sender's mobile device 501 and the receiver's mobile device 1901 interact with the payment gateway sever 506. The payment gateway server 506 is also in data communication with a funding card issuing server 104.

The payment gateway server 506 stores data components specific to the sending user (block 1903) and data components specific to the receiving user (block 1902). For example, data components specific to the sending user (block 1903) include registered data associations 1904 that associate one or more funding cards with the sender's mobile device ID. For example, funding card1 and funding card2 (and other funding cards) are stored in association with the mobile device ID of the sender's mobile device 501. There are also temporary data associations 1905, which includes a transfer ID 1907 being temporarily associated with one of the user's funding cards 1906. The transfer ID 1907 can be used by the sending user 101 to make a party-to-party value transfer.

The data components related to the receiving user (block 1902) include registered data associations 1908 that specify zero or more funding cards are associated with the receiver's mobile device ID. For example, the funding cards associated with the receiver's mobile device ID can include two funding cards and the prepaid virtual card 1909 issued by the payment gateway server 506. It can be appreciated that the prepaid virtual card 1909 for the receiving user 1807 can be used to make a payment to a merchant or to yet another party-to-party value transfer to another user.

The payment gateway server 506 is in communication with the mobile devices 501, 1901 through a wireless network. For example, the wireless network is provided by a mobile phone carrier. The payment gateway server 506 is in data communication with the funding card issuing server 104 through wired or wireless means, or both.

Figure 20:
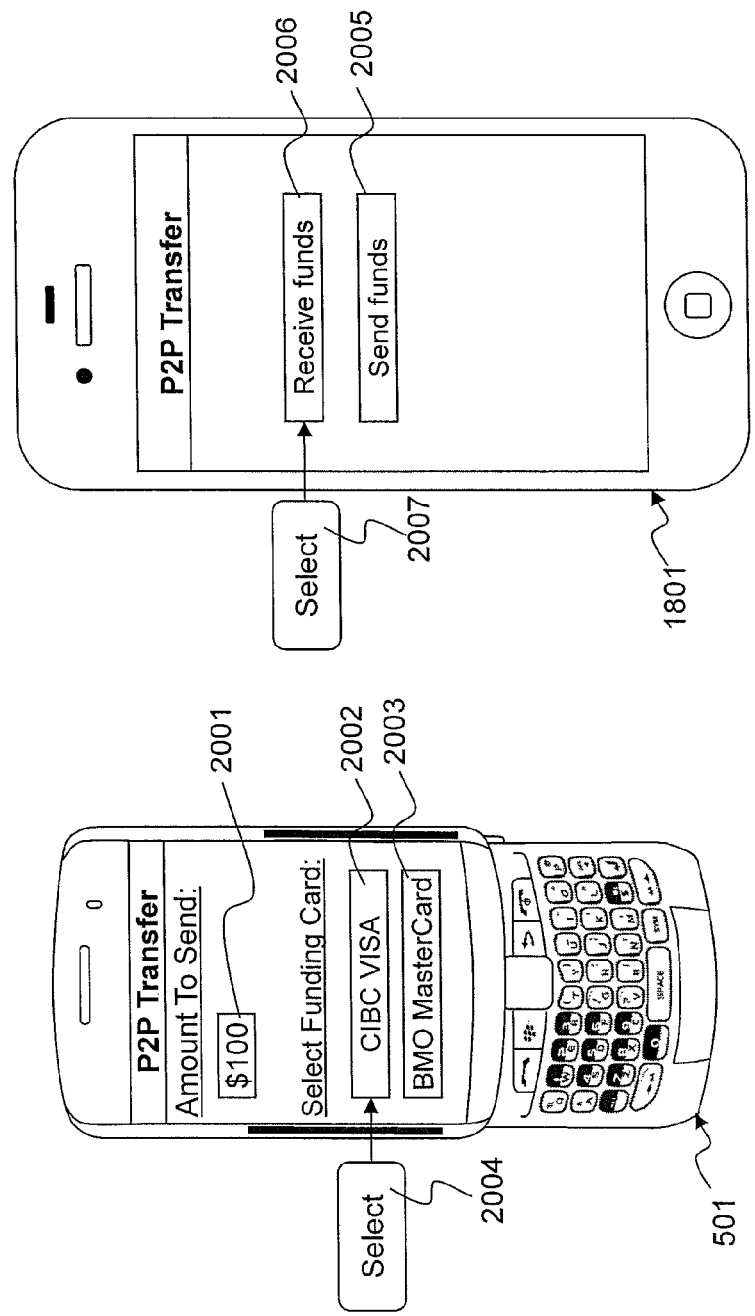
FIG. 20 is an example embodiment illustrating a sender's mobile device and a receiver's mobile device, the sender's mobile device showing a graphical user interface (GUI) for selecting a funding card.
Figure 21:
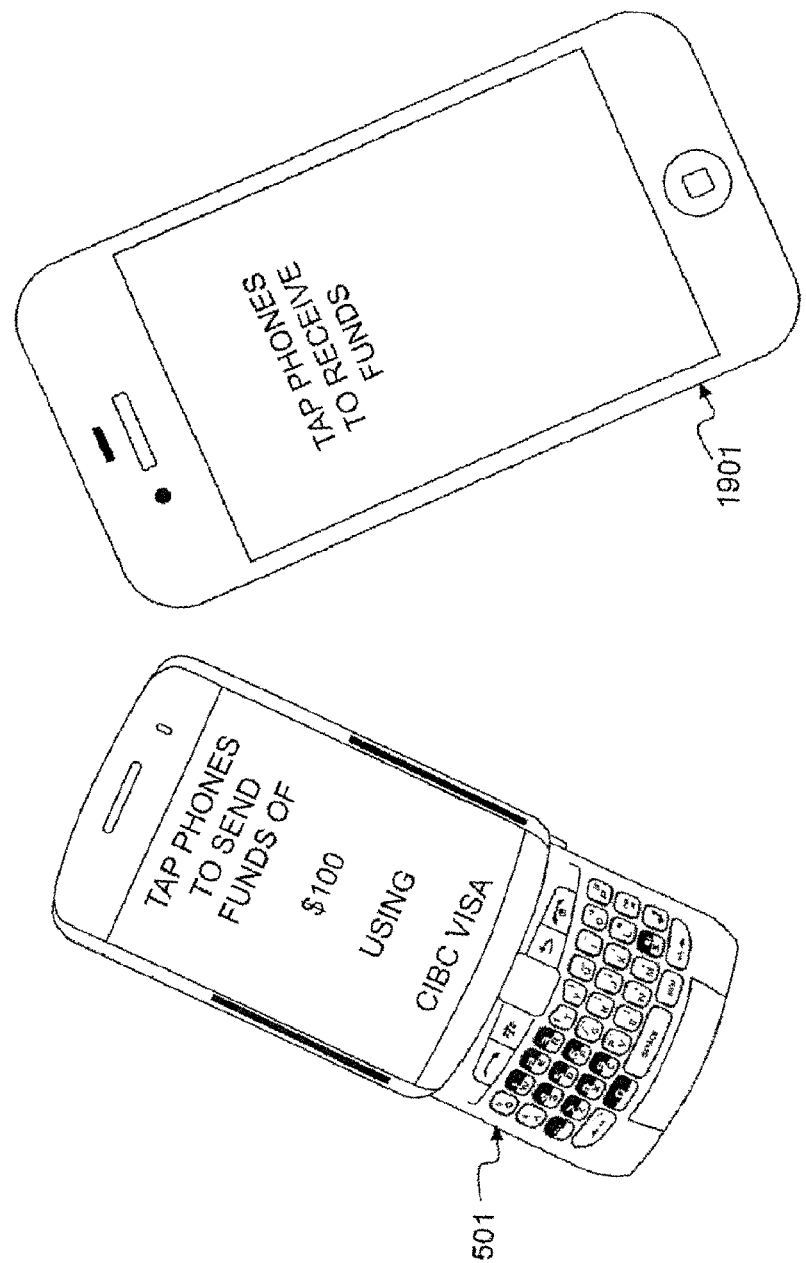
FIG. 21 is an example embodiment illustrating the sender's mobile device and the receiver's mobile device of FIG. 20 prior to being "tapped" together to facilitate a party-to-party value transfer.

Turning to FIGS. 20, 21 and 22, a sending mobile device 501 and a receiving mobile device 1901 are shown interacting with each other when sending funds via NFC.

Turning to FIG. 20, the receiver's mobile device 1901 shows an example embodiment of a graphical user interface (GUI) that allows a user to send or receive funds. Although not shown, the sender's mobile device 501 could have displayed a similar GUI and then, based on a user selection to send funds, the mobile device 501 is placed in a mode to send funds. In "send funds" mode, the sender's mobile device 501 shows a GUI for facilitating the sending of funds. The GUI displayed in FIG. 20 on the sender's mobile device 501 is an example embodiment of such a GUI for facilitating the sending of funds.

Continuing with FIG. 20, the GUI on the sender's mobile device 501 includes an input field 2001 that allows the sender to specify how much money to send in a party-to-party transfer. For example, $100 can be specified. It also includes a menu of funding cards that can be selected to make the party-to-party transfer. There is an option, for example, to use the Visa credit card from CIBC (e.g. a name of a first issuing bank) 2002; there is another option to use the Mastercard credit card from the Bank of Montreal or BMO (e.g. a name of a second issuing bank) 2003. The user selects 2004 the Visa credit card 2002 as the funding card.

The receiver's mobile device 1901 also has a payment application that displays a GUI with a control to receive funds 2006 and a control to send funds 2005. The receiving user provides a selection input 2007, by selecting the control 2006, which places the mobile device 1091 in a mode to receive funds.

Turning to FIG. 21, after the required information has been entered into the payment applications of the respective mobile devices 501, 1901, the funds are ready to be transferred. The sender's mobile device 501 displays a message to "Tap phones to send funds of $100 using CIBC Visa". The receiver's mobile device 1901 displays a message to "Tap phones to receive funds". At this stage, the two mobile devices 501, 1901 are placed close enough together (e.g. tapped) to allow the successful transfer of data via NFC.

Turning to FIG. 22, after the money has transferred from the sender to the receiver, the sender's mobile device 501 displays a message that "You have sent $100 to Bob (647-667-1234)". The message, for example, includes the amount transferred, the name of the receiving user, and a phone number of the receiver's mobile device. The receiver's mobile device 1901 displays a message that "You have received a pre-paid virtual card of $100 from Alice (416-333-4321)". The message, for example, includes the amount received, the name of the sending user, and a phone number of the sender's mobile device.

Figure 23:
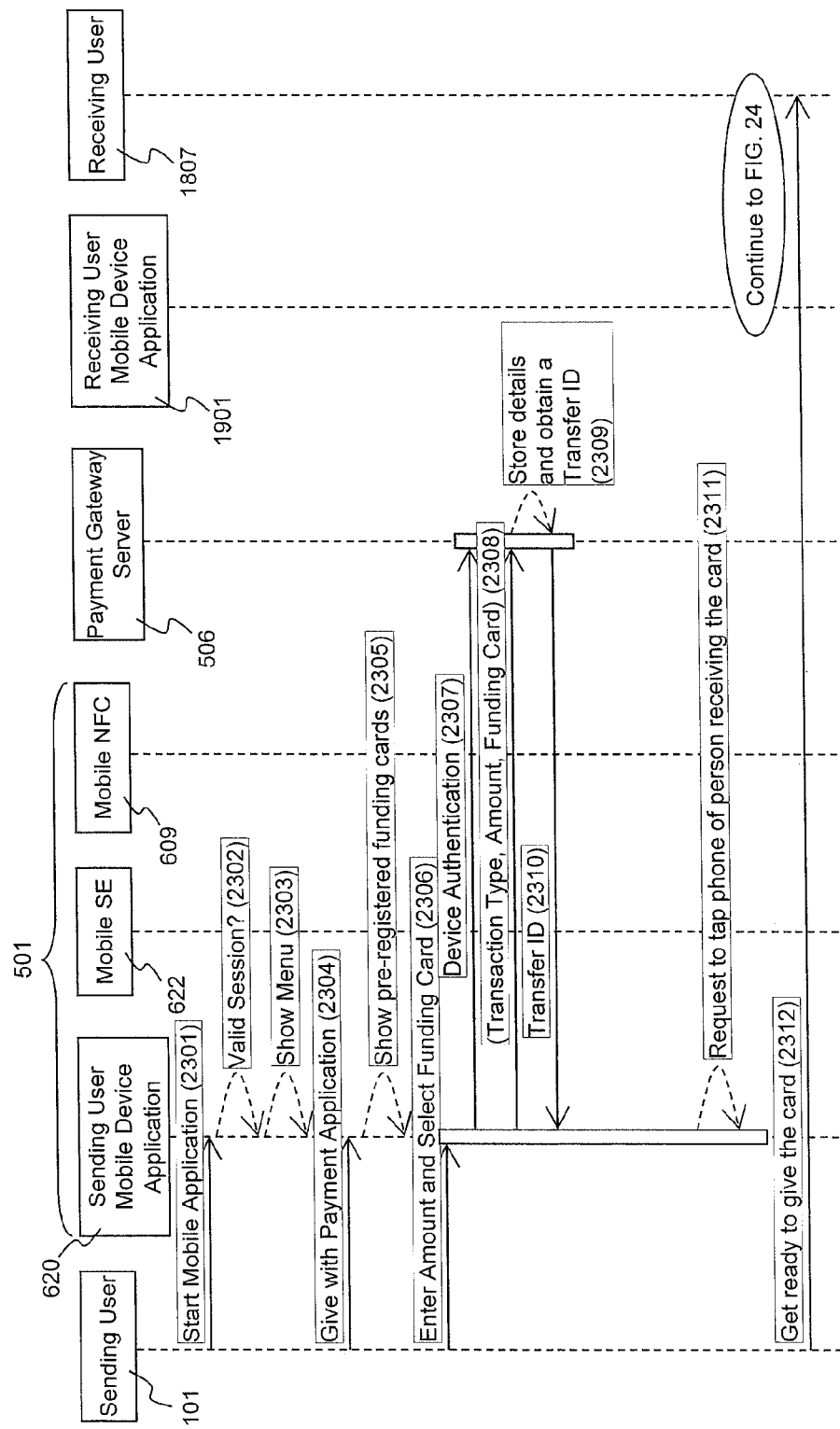
FIG. 23 is a flow diagram of an example embodiment of computer executable or processor implemented instructions for computing a transfer ID by the payment gateway server and the mobile device, such that the transfer ID is used facilitate the transfer of value.

Turning to FIG. 23, example computer executable or processor implemented instructions are provided for facilitating a party-to-party transfer of funds between a sending user and a receiving user.

In an example embodiment, it is assumed that both the sending and the receiving users each have a NFC-enabled device. It is also assumed that both mobile devices have installed a payment application. It is also assumed that both users have registered their mobile devices with a payment gateway server. It is also assumed that the sending user has also pre-registered one or more funding cards with the payment gateway server, which are each identified by a funding card identifier. In other words, the payment gateway server has funding card details stored in association with the sender's mobile device ID.

The sending user 101 starts the payment application 620 on their mobile device 501 (block 2301). The payment application 620 determines if the user has successfully registered to the service (block 2302), and if so, an application menu is shown, and displays the option to give using the payment application (block 2303). The user 101 selects the option to give money using the payment application. It is noted that various user experiences can be used with the principles described herein.

For example, a GUI on the menu is able to receive an input from the user to initiate a party-to-party transfer of funds with a virtual card with the payment application. Examples of other menu items include "add a funding card", "delete a funding card", etc.

The mobile device 501 then displays the funding cards that have been pre-registered by the user (block 2305). A user input is received to specify an amount to be transferred (e.g. given) and an input is received to select one of the funding cards (block 2306). In an example embodiment, the displayed funding card information is loaded after the end user successfully registers to the service and has registered at least one funding card. The list is updated when the user adds an additional funding card into the payment application or when a funding card is deleted. For each registered funding card, there is a corresponding record stored on the payment application 620 and on the payment gateway server database 506 which includes an identifier for the payment network associated with the funding card, a funding card identifier, etc.

The payment application 620 sends the mobile device identifier to the payment gateway server 506 for device authentication (block 2307). The payment application 620 also sends the transaction type (selected action in the application menu, in this case, "Make a party-to-party transfer"), the amount to be transferred (e.g. given) and the funding card identifier for the selected funding card to the payment gateway server 506 (block 2308). The payment gateway server 506 stores the information sent by mobile device 501, and it also computes the details regarding a transfer ID (block 2309). The transfer ID is associated with the funding card and the specified amount. An expiry date may also be associated with the transfer ID, such that the transfer ID is no longer valid after a certain period of time. For example, after a few minutes, or a few hours, or a day, or some other time period starting from the creation of the transfer ID, the transfer ID is no longer valid. In other words, if the sending user is to transfer value to the receiving user, it is to be done before the time period expires. The payment gateway server 506 sends the transfer ID to the sending user's mobile device 501 (block 2310). In an example embodiment, the transfer ID is encrypted and is able to be decrypted by the sending user's mobile device application 620.

As an alternate example embodiment, instead of the payment gateway server 506 sending the transfer ID to the mobile device, the payment gateway server 506 instead sends a key value that the mobile device can use to generate an identical transfer ID as generated by the payment gateway server 506. Sending a key value may be safer, should an attacker intercept the key value. It is appreciated that the mobile device 501 eventually obtains the transfer ID.

The mobile's payment application 620 then displays a message requesting the user to the tap the sender's mobile device 501 with the receiver's mobile device 1901 (block 2311). The sending user 101 tells the receiving user 1807 to get ready to receive the funds, for example, by "tapping" mobile devices together (block 2312). In other example embodiments, in addition to or in the alternative, the sending user sends the transfer ID to the receiving user through other communication means, including Bluetooth, infrared, email, instant messaging, text messaging, and other wireless and wired means.

In an example embodiment, before transferring the transfer ID to the payment application 620 on the mobile device 501 displays a GUI requesting the sending user to input their PIN (e.g. which should be the same PIN provided when the sending user registered for the service). In an example embodiment, the PIN is verified first. In another example embodiment, the payment gateway server 506 instead sends a key value to generate a transfer ID, the PIN provided again by the sending user is used with the key value to generate a transfer ID. If the PIN provided by the sending user is correct, then the transfer ID generated by the mobile device 501 should be identical to the transfer ID generated by the payment gateway server 506.

Figure 24:
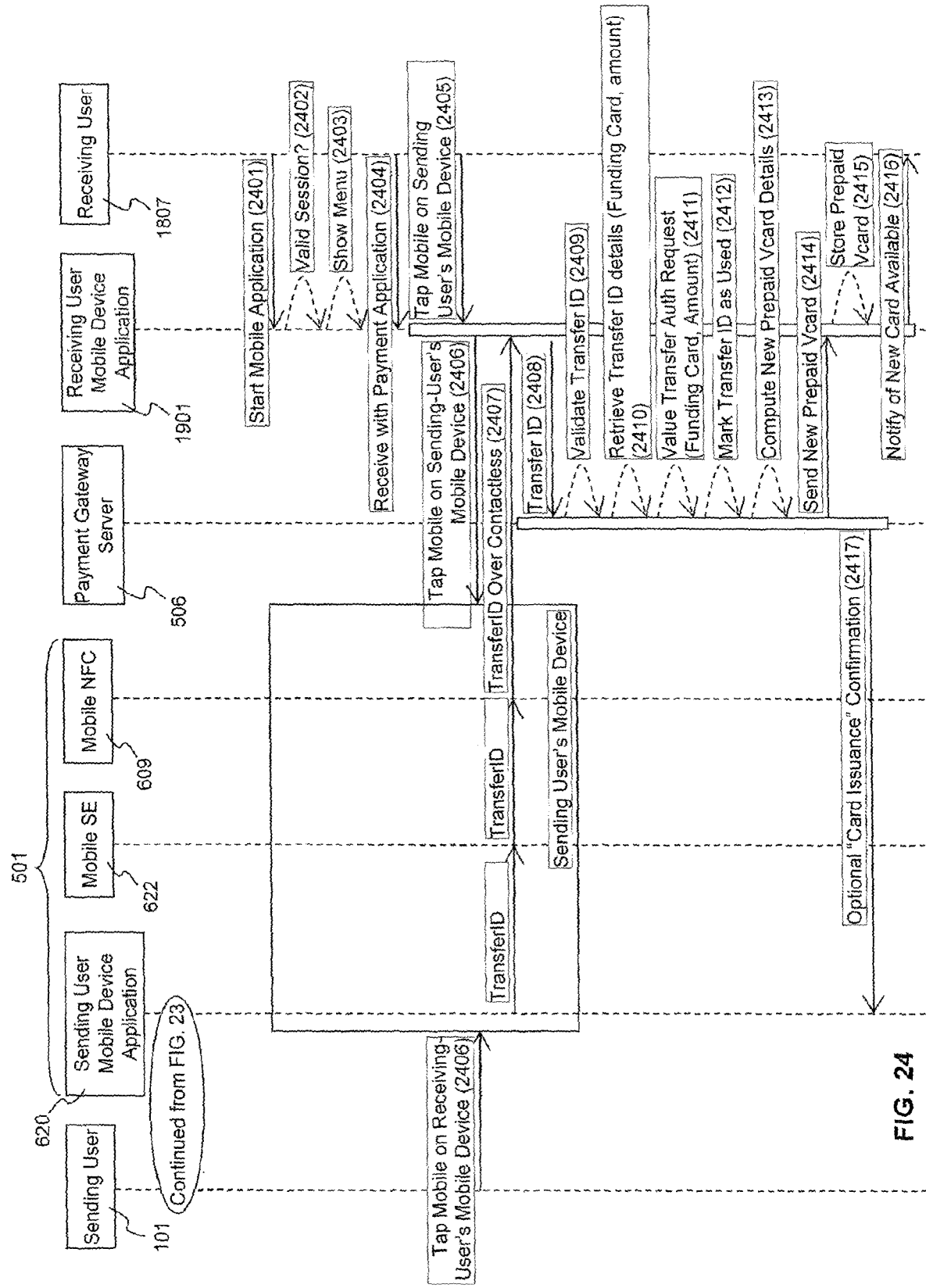
FIG. 24 is a flow diagram of an example embodiment of computer executable or processor implemented instructions for validating the transfer ID and issuing a prepaid virtual card to the receiver, thereby completing the party-to-party value transfer, the instructions implemented as a continuation of process of FIG. 23.

Turning to FIG. 24, after the sending user tells the receiving user to get ready, the receiving user starts the payment application on the receiver's mobile device 1901 (block 2401). The receiver's mobile device 1901 determines if the user has successfully registered to the service (block 2402), and if so, shows a menu (block 2403). The receiving user provides an input to initiate the party-to-party receipt of funds using the payment application (block 2404). Then both the receiving user 1807 and the sending user 101 tap their mobile devices 501, 1901 together (blocks 2405 and 2406).

This tapping (or more specifically the close proximity of the mobile devices) triggers the sender's mobile device 501 to send the transfer ID, via NFC (block 2407). In another example embodiment, the transfer ID is transferred to the receiver's mobile device 1901 though other ways (e.g. barcodes, 2D barcodes, QR code, messaging, email, etc.). In an example embodiment, the transfer ID is sent from the mobile device's secure element 622. In another example embodiment, the sending of the transfer ID does not involve the mobile device's secure element 622.

Continuing with FIG. 24, after the receiver's mobile device 1901 receives the transfer ID from the sender's mobile device 501, the mobile device 1901 sends the same to the payment gateway server 506 (block 2408). The payment gateway 506 validates the transfer ID (block 2409), and if the transfer ID is successfully validated, then the payment gateway server 506 retrieves the sending user's funding card details and the specified amount associated with the transfer ID (block 2410).

To validate the transfer ID, the payment gateway server may confirm if the transfer ID itself is correct (e.g. it matches a transfer ID stored on the payment gateway server). It may also check to see if the transfer ID has expired, and if so, will decline the transfer. It may also check to see if the transfer ID has been previously used, and if so, will decline the transfer.

The payment gateway server 506 then generates a value transfer payment authorisation request, which includes the funding card details and the amount to be transferred to the receiving user 1807 (block 2411). Although not shown, the payment gateway server 506 then sends this standard payment authorisation request to the funding card issuing server 104. The funding card issuing server 104 verifies the payment authorisation request (e.g. verifies enough funds are available, verifies funding card data, etc.) and provides a payment authorisation response to the payment gateway server 506. The response indicates if the value transfer is accepted or denied.

Assuming the payment using the funding card is accepted, the payment gateway server 506 marks the transfer ID as used (block 2412). It is noted that the transfer ID is a one-time use. In other words, when the sender wishes to make another party-to-party transfer, a new (e.g. different) transfer ID will be created for the other party-to-party transfer, even if the same funding card and amount are being used. In this way, there is increased security, and the receiving user will never obtain the details of the sending user's funding card.

The payment gateway server 506 computes a prepaid virtual card to be issued to the receiving user, and the details associated therewith (block 2413). The prepaid virtual card is stored in association with the receiver's mobile device ID. The transferred amount of money (from the sending user) is the amount of money associated (e.g. available) on the prepaid virtual card. The payment gateway server 506 then sends details about the prepaid virtual card (e.g. a prepaid virtual card identifier) to the receiver's mobile device (block 2414).

In particular, the payment gateway server computes a prepaid virtual card identifier which identifies the prepaid virtual card account. The payment gateway server stores the prepaid virtual card identifier in association with the prepaid virtual card details, and it sends the prepaid virtual card identifier to the receiving user's mobile device for storage. In an example embodiment, the prepaid virtual card identifier is a value that is different from the PAN, expiry date or static security code of the prepaid virtual card. For example, the prepaid virtual card identifier is a random value so that, if intercepted by an adversary, would not be able to recognize any prepaid virtual card details. In an example embodiment, the receiving user's mobile device does not store any prepaid virtual card details or stores limited prepaid virtual card details (e.g. the name of the prepaid virtual card issuer and the last 4 digits of the PAN). In an example embodiment, the receiving user's mobile device stores at least the prepaid virtual card identifier, which it sends to the payment gateway server to indicate the associated prepaid virtual card.

After receipt of the prepaid virtual card identifier, the receiver's mobile device stores this information (block 2415) and displays a message to the receiving user that the new prepaid virtual card is available (block 2416).

The payment gateway server 506 may also send a confirmation message to the sender's mobile device 501 indicating that the new prepaid virtual card has been issued to the receiver (block 2417).

After the receiver 1807 has the prepaid virtual card, the receiver can use the prepaid virtual card to make a purchase with a merchant.

Transferring Value Party-to-Party Using a Virtual Card

In another example embodiment, instead of using a transfer ID, a virtual card is sent, instead of the transfer ID, to facilitate the transfer of value from the sending user to the receiving user. The virtual card is associated with the funding card. When using the virtual card, the receiving user is not able to obtain information about the sending user's funding card. This increases the security. The results of the transfer is that the receiving user has a prepaid virtual card that can be used for payment or another party-to-party transfer. The virtual card is sometimes referred to in the Figures as "Vcard".

By way of background, the secure element is typically managed by a mobile phone carrier distributing the secure element with the mobile device. It is used in part to maintain the security of the various applications running inside the secure element. Part of the managed service includes delivering applications into the secure element directly, or giving permission to a third party organization to deploy their application on a particular secure element. The managed service is typically delivered using what the industry referred to as a trusted service manager (TSM).

All applications stored and running inside the secure element, such as the individual "software payment card", need their storage own space. Payment cards are issued to consumers by the card issuer. Deploying software payment cards on mobile phones requires a high level of coordination between the mobile phone carrier and the card issuer where the mobile phone carrier provides access to individual secure elements, one at a time, to the issuer. Only cards from funding card issuers that have the infrastructure and the agreement with the mobile phone carrier can be delivered and used on the mobile phone for contactless payment. This is limiting for both the card issuers and for cardholders.

It is also recognized that from the user's perspective, the process of associating their mobile device with their funding card to be used for contactless payment is very much dependent on pre-arranged relationships between the mobile phone carrier and the card issuers. Therefore, a user has limited options or no options when determining if their current funding card can be associated with their mobile phone for contactless payments. For example, a user has a funding card from Funding Card Issuer A. The user also has a NFC-enabled mobile phone from Mobile Phone Carrier B. However, Mobile Phone Carrier B only has a pre-arranged agreement and infrastructure to facilitate contactless payments with Funding Card Issuer B. Therefore, even if the user wanted to use their mobile phone to make a contactless payment, the user would not be able to because there is no pre-arranged agreement and infrastructure between Mobile Phone Carrier B and Funding Card Issuer A to issue a software payment card into the user's phone. This limits the user's ability to make NFC-type payments with their mobile device.

In another example embodiment, the payment card dynamic data is a rotating card verification value (CVV, also referred sometime to dynamic CVV or dCVV). This rotating CVV is computable based on changing information provided by the integrated circuit inside the card. In another example embodiment, the dynamic data is dynamic EMV data which is computed using random data from the funding card, or random data from a merchant's point of sale terminal, or both. A common implementation of dynamic data uses an Application Transaction Counter (ATC) on the card so that every transaction produces a different data stream. This is achieved as the ATC is incremented by 1 for every transaction performed.

It is also recognized that a card application specific to a given funding card can be installed on the mobile device and used to interact with POS terminal as described above. It is also recognized that the card application is typically installed on the mobile device's secure element. Typically, each funding card has its own corresponding card application that resides on the mobile device's secure element. It can be appreciated that as each card application takes up storage space on the secure element, and that the secure element typically has very limited storage space, having multiple card applications on the secure element is some cases is not possible due to insufficient storage space. By way of background, the secure element can have a native operating system that is programmed to perform various tasks and activities, including for example, a card application that emulates the magnetic strip data of a funding card or a card application that emulates the data used in an EMV contactless payment. Also by way of background, and by way of example, a typical secure element has memory of 256 kB, and each card application can consume memory of 40-80 kB. It can therefore be appreciated that associating multiple funding cards (and each of their card applications) with a mobile device for NFC payments can be limiting.

Therefore, it is desirable to reduce the amount of required storage space card applications need on the secure element so as to not limit the number of software payment cards a user can load into a secure element. Along the same lines, it is desirable for mobile phone carriers to reduce the amount of data used by "card application" on the secure element so that other types of applications can be loaded thereon. It is also desirable to reduce costs incurred by the funding card issuer to issue and operate software payment cards into secure elements. By way of background, a mobile phone carrier typically charges application providers, such as funding card issuers, for the amount of storage space used on the secure element. It is also desirable to reduce the amount of infrastructure required by the funding card issuer to issue a software payment card for the mobile phone. It is also desirable to reduce the amount of coordination required between the funding card issuer and the mobile phone carrier to issue a software payment card on particular mobile phone. It is also desirable to enable the user (e.g. the cardholder) to load any, and as many, funding cards they want into their NFC-enabled mobile phone, independently of the funding card issuer having the infrastructure or a commercial relationship or agreement with a particular mobile phone carrier. It is also desirable to enable the user (e.g. the cardholder) to load any, and as many, funding cards they want into their NFC-enabled mobile phone, independently of the funding card issuer having the infrastructure or a commercial relationship or agreement with a particular mobile phone carrier. It is also desirable to facilitate the transfer of money between two users in a party-to-party manner using their NFC-enabled mobile devices.

The systems and methods described herein also allow a cloud-based wallet payment gateway server to synchronize with a receiver's NFC-enabled mobile device and application to facilitate contactless transfers of value from a sender's NFC enabled mobile device. A sender user selects a funding card and provides the amount for making the contactless party-to-party value transfer, through their mobile device. A second card, herein referred to as a virtual card, is generated along with all required card data (e.g. PAN, expiry date, dynamic data, discretionary data, etc) to facilitate the party-to-party payment transaction. On the payment gateway server, the virtual card is temporarily associated with the funding card and the allowed amount of value to be transferred. The sending user sends the virtual card data and the amount to be transferred to the receiving user (e.g. via NFC or other communication means). The receiving user sends this data to the payment gateway server, and validates the virtual card data. If validated, the payment gateway server retrieves the funding card details and uses the same to transfer the specified amount from the funding card to a new prepaid virtual card. The prepaid virtual card can be used by the receiving user to make payments, transactions, party-to-party transfers, etc.

Figure 25:
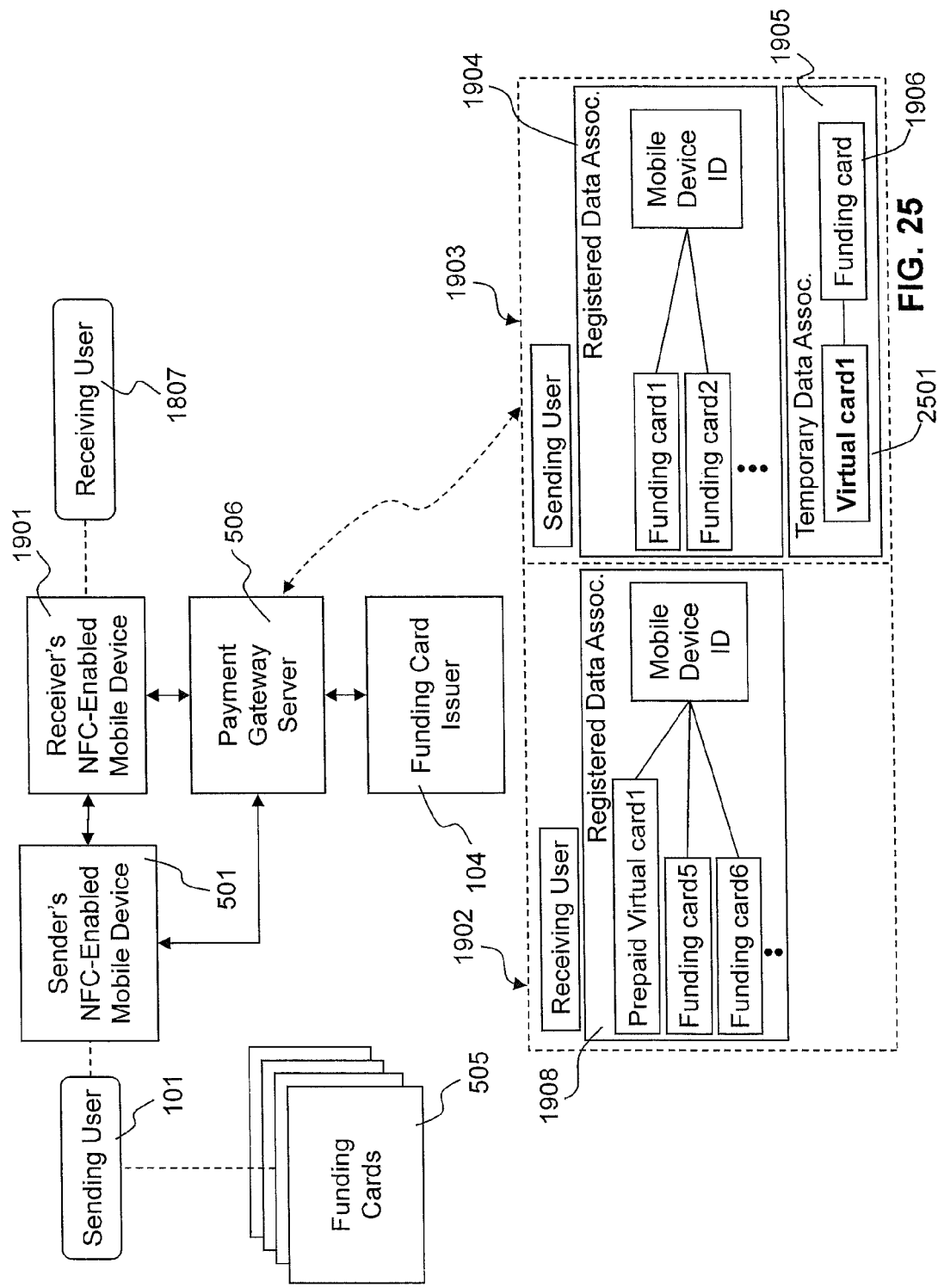
FIG. 25 is a schematic diagram showing example components of a system used to facilitate a party-to-party value transfer using a virtual card.

Turning to FIG. 25, example embodiment components of a system for facilitating a party-to-party transfer of funds is shown using the virtual card. FIG. 25 is similar to FIG. 19, however it differs in that the temporary data associations 1905 includes a virtual card (e.g. virtual card1) 2501 being temporarily associated with one of the user's funding cards 505. The virtual card 1101 can be used by the sending user 101 to make a party-to-party value transfer.

Figure 26:
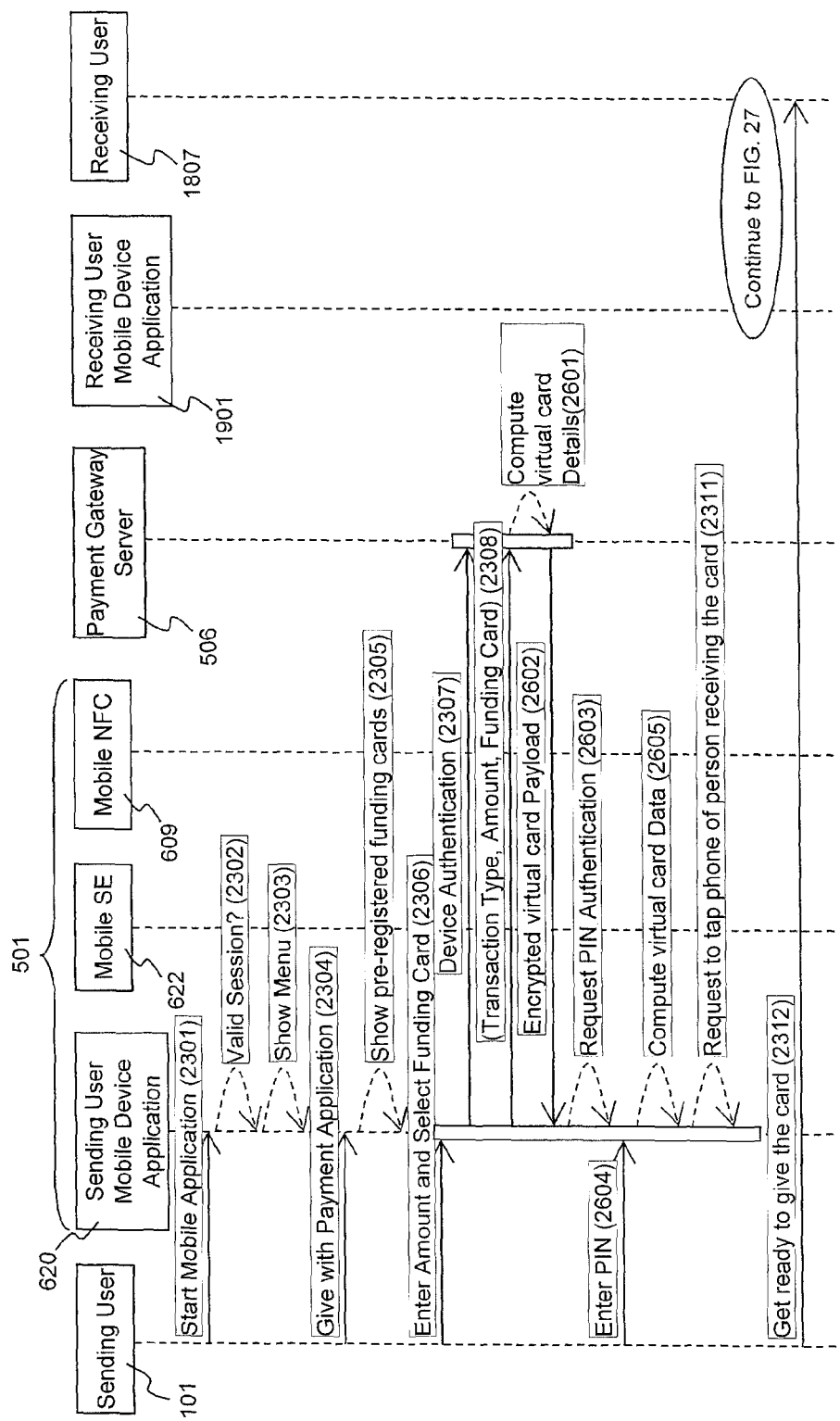
FIG. 26 is a flow diagram of an example embodiment of computer executable or processor implemented instructions for computing virtual card details by the payment gateway server and the mobile device.
Figure 27:
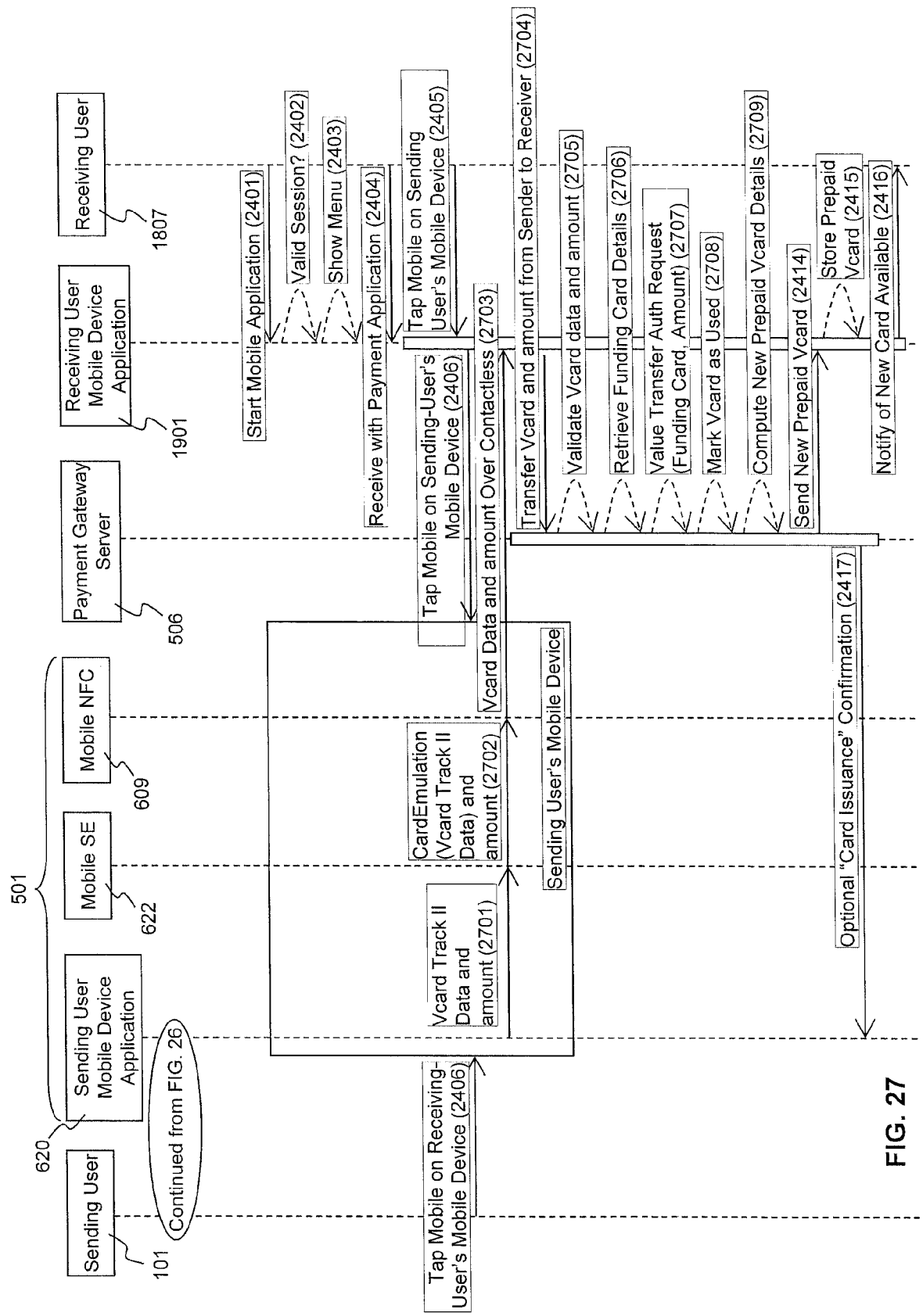
FIG. 27 is a flow diagram of an example embodiment of computer executable or processor implemented instructions for authorising virtual card details and completing the party-to-party value transfer, the instructions implemented as a continuation of process of FIG. 26.

Turning to FIGS. 26 and 27, example computer executable or processor implemented instructions are provided for facilitating a party-to-party transfer of funds between a sending user and a receiving user. The examples of FIGS. 26 and 27 are similar to FIGS. 23 and 24, but use a virtual card instead of a transfer ID. Therefore, similar elements or steps are not repeated in the discussion of FIGS. 26 and 27.

It is assumed that the sender's mobile device has undergone a registration process, which includes providing PIN. An example of such a process is described later with respect to FIG. 28.

Turning to FIG. 26, blocks 2301 to 2308 are performed. After receiving request 2308, based on the information sent by mobile device 501, the payment gateway server 404 creates and computes the details regarding the virtual card (block 2601). In particular, the payment gateway server 506 computes a virtual PAN, an expiry date of the virtual card and other data that forms the Track Two data. It is noted that Track Two data includes, among other things: the PAN, a service code, an expiry date, discretionary data and a LRC. In an example embodiment, the payment gateway server 506 at this time does not compute the discretionary data, which is dynamic in nature (e.g. the discretionary data is dynamic data). The virtual card details may further include an internal expiry date that is known only to the payment gateway server, and has a short timeline of about a few days from the date that the virtual card is created. The internal expiry date is different from the virtual card's expiry date, and the function of the internal expiry date is to provide an additional indicator to the payment gateway to determine whether or not a virtual card has expired. The payment gateway server 506 encrypts the virtual card data, which does not include the internal expiry date, and sends the encrypted virtual card payload to the mobile device's payment application 620 (block 2602).

As an alternate example embodiment, instead of the payment gateway server 506 sending the virtual card PAN as part of the encrypted virtual card payload to the mobile device, the payment gateway server 506 instead sends a key value (called Kpan) that the mobile device can use to generate an identical virtual card PAN as computed by the payment gateway server 506. This example is described in FIG. 29.

In an example embodiment, the first portion of digits of the PAN of the virtual card is static and refers to the payment gateway server 506. For example, the first six digits point to the payment gateway server 506; a merchant or payment network, or any other entity, can use this information to send the transaction and payment details to the payment gateway server 506.

In an example embodiment, the PAN of the virtual card is nineteen digits long and compliant to the algorithm LUHN-10. The algorithm, also known as the "modulus 10" or "mod 10" algorithm, is a checksum formula used to validate a variety of identification numbers, such as card numbers. As described above, the first six digits are used to identify the payment gateway server. The remaining digits can be computed in a number of ways. In an example embodiment, the remaining digits of the virtual card PAN are randomly generated. In another example embodiment, the remaining digits are computed using the Kpan value; further details in this regard are described with respect to FIG. 29. Other methods can be used to compute the virtual card PAN. The mobile device 501 receives the encrypted virtual card payload, it decrypts the encrypted communication and extracts the virtual card details (e.g. the virtual card PAN and other card details).

In another example embodiment, if the virtual card payload includes a Kpan (e.g. a key value) instead of a virtual card PAN, the mobile device 501 uses the Kpan to compute the virtual card PAN.

Continuing with FIG. 26, the payment application 620 on the mobile device 501 displays a GUI requesting the sending user to input their PIN (e.g. which should be the same PIN provided when the sending user registered for the service) (block 2603). The application 620 receives the PIN from the sending user (e.g. the sending user enters in the PIN) (block 2604). The application 620 uses the PIN to compute the discretionary data of the virtual card (block 2605). An example embodiment of computing the discretionary data is described below with respect to FIG. 30. With the discretionary data computed, the Track Two data set is complete. The mobile's payment application 620 then displays a message requesting the user to the tap the sender's mobile device 402 with the receiver's mobile device 1901 (block 2311). The sending user 101 tells the receiving user 1807 to get ready to receive the funds (block 2312).

In an example embodiment, one PIN can be used for all the funding cards associated with the mobile device. In another example embodiment, the registration process can request a specific PIN for each funding card. In other words, if a user selects a different funding card, the user will need to enter in a different PIN.

In an example embodiment, the mobile device's payment application 620 does not verify the PIN. Instead, the PIN is indirectly or implicitly verified by the payment gateway server 506 when verifying the virtual card data set. In other words, the payment gateway server 506 uses the PIN that was stored at registration time to compute the virtual card data set, and if an incorrect PIN was provided by the user or an adversary during the transaction, it will cause the computed virtual data to result in a different, incorrect, value compared to the virtual card data computed by the payment gateway server. Once the received virtual card data set is compared with the expected value by the payment gateway server, an invalid PIN entry can be detected. When the payment gateway server receives and verifies the virtual card data set and detects an un-expected virtual card data set (e.g. due to the incorrect PIN), then the value transfer authorization can be declined.

Turning to FIG. 27, after the sending user tells the receiving user to get ready, the receiving user starts the payment application on the receiver's mobile device 1901 (block 2401). Blocks 2401 to 2406 are performed, leading to the mobile devices of both users tapping their phone together to transfer data via NFC.

This tapping (or more specifically the close proximity of the mobile devices) triggers the sender's mobile device 501 to send the authorised amount and Track Two data for the virtual card on the mobile device's secure element 622 (block 2701). The mobile device 501 configures the Track Two data to emulate a virtual card, and this emulated virtual card data and authorised amount is provided to the mobile device's NFC subsystem 609 (block 2702). The emulated virtual card data includes the complete Track Two data set. The amount to be transferred and the virtual card data is then transferred, via NFC, to the receiving user's mobile device 1901 (block 2703). In another example embodiment, though not shown, the operating system of the mobile device 501 can directly transfer information to the NFC subsystem 609 without the use of the secure element. The virtual card data set includes the virtual card PAN, the expiry date, the discretionary data and all other elements in a Track Two data set to complete a standard contactless value transfer.

Continuing with FIG. 27, after the receiver's mobile device 1901 receives the virtual card data and authorised amount from the sender's mobile device 501, the mobile device 1901 sends the same to the payment gateway server 506 (block 2704). The payment gateway 506 validates the virtual card data and authorised amount (block 2705), and if the data is successfully validated, then the payment gateway server 506 retrieves the funding card details association with the sender's virtual card (block 2706).

To validate the virtual card data received from the sender's mobile device, the payment gateway server computes the Track Two data set on its own. The Track Two data computation includes the payment gateway server computing the discretionary data using the PIN originally received and stored during registration by the sending user. In an example embodiment, some of the Track Two data portions (like the PAN and expiry date) were pre-computed and stored; these pre-computed data portions can be compared against the received Track Two data. If the virtual card data is successfully validated (received card Track Two data set matches computed card Track Two data set by the payment gateway server), then the payment gateway server retrieves the funding card data that is associated with the virtual card data.

The validation of the virtual card data in block 2705 can also include verifying if the internal expiry date associated with the virtual card has passed or not. If the present date of the validation is occurring before or on the internal expiry date, then the virtual card can be considered validated and the transaction processing can continue. If validated, the payment gateway server 506 retrieves funding card details 2706. Otherwise, the virtual card is deemed invalid and the value transfer authorisation request is denied.

When validated, the payment gateway server 506 then generates a value transfer authorisation payment request, which includes the funding card details and the amount to be transferred to the receiving user 1807 (block 2707). Although not shown, the payment gateway server 506 then sends this standard payment authorisation request to the funding card issuing server 104. The funding card issuing server 104 verifies the payment authorisation request (e.g. verifies enough funds are available, verifies funding card data, etc.) and provides a payment authorisation response to the payment gateway server 506. The response indicates if the value transfer is accepted or denied.

Assuming the payment using the funding card is accepted, the payment gateway server 506 marks the sender's virtual card as being used (block 2708). It is noted that the virtual card is a one-time use. In other words, when the sender wishes to make another party-to-party transfer, a new (e.g. different) virtual card will be created for the other party-to-party transfer, even if the same funding card and amount are being used. In this way, there is increased security, and the receiving user will never obtain the details of the sending user's funding card.

The payment gateway server 506 computes a prepaid virtual card to be issued to the receiving user, and the details associated therewith (block 2709).

After generating the prepaid virtual card, block 2414, 2415, 2416 and 2417 are performed. These were previously described with respect to FIG. 24.

Figure 28:
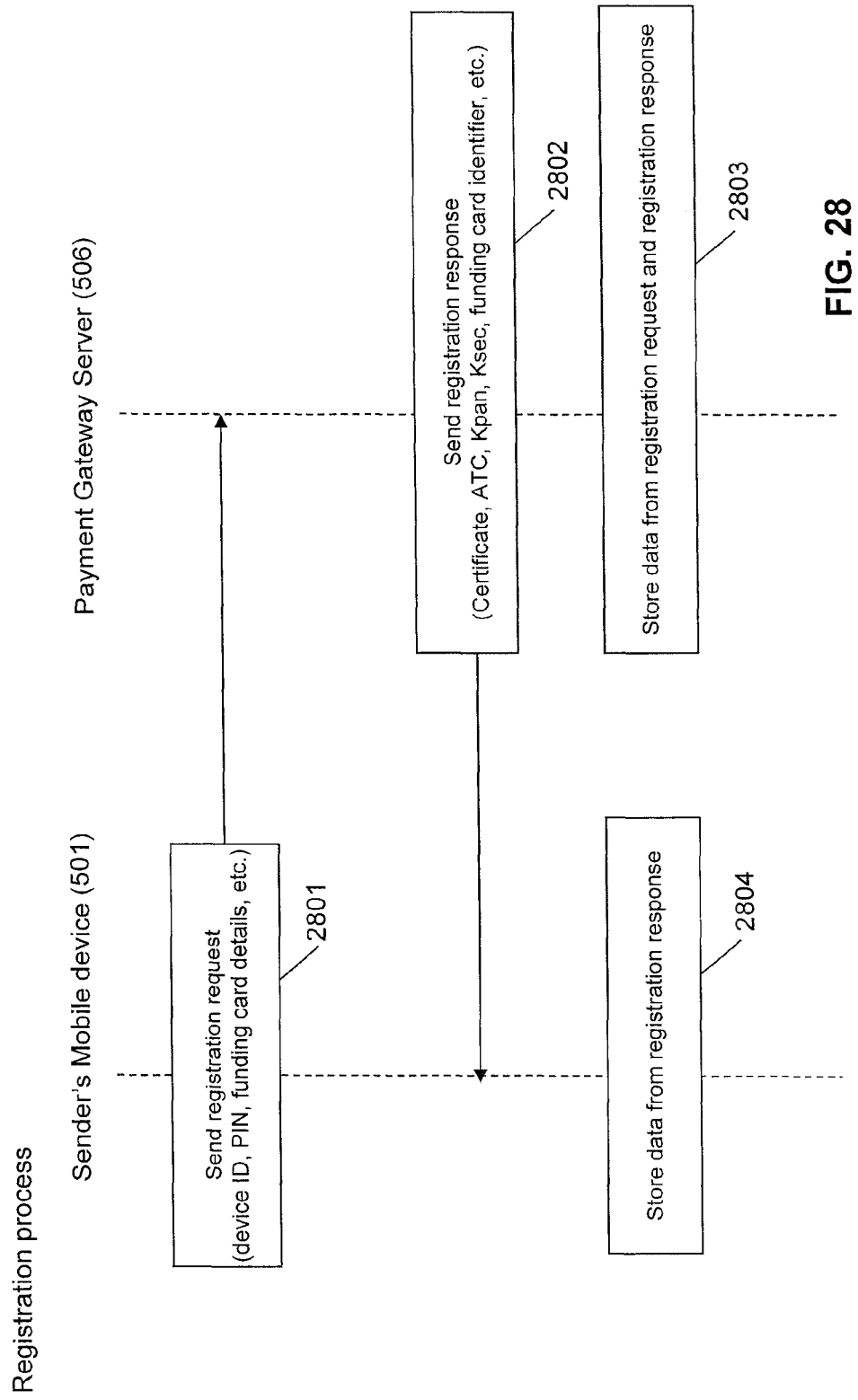
FIG. 28 is a flow diagram of an example embodiment of computer executable or processor implemented instructions for a registration process between the sender's mobile device and a payment gateway server.

Turning to FIG. 28, an example embodiment of computer executable or processor implemented instructions are provided for registering a funding card and mobile device with payment gateway server. Such an embodiment can be used in combination with the principles described above. The sender's mobile device sends a registration request to the payment gateway server (block 2801). The request includes the mobile device's device ID, a user provided PIN, and funding card details. After receiving the request, the payment gateway server sends a registration response to the sender's mobile device (block 2802). The response include a certificate, an Application Transaction Counter (ATC), a key value (called Kpan) for generating a PAN, a secure element key value (called Ksec), and a funding card identifier that identifies the funding card. The certificate is a client certificate for the sender's mobile device and, in an example embodiment, it is configured to according to the RSA algorithm and has a 2048 bit length. The ATC is a counter that is initially set to a random value between "0" or "1000" and increments with each transaction. The initialized ATC value is a random value to prevent adversaries from predicting the ATC values. Copies of the ATC are stored and synchronise on both the payment gateway server and the mobile device. In an example embodiment, the ATC is a 10 digit value. In an example embodiment, the Kpan is 128 bits long, and the Ksec is 128 bits long.

The payment gateway server 404 stores the data from the registration request and the registration response in association with each other (block 2803). The sender's mobile device 402 also stores the data from the registration response (block 2804).

Figure 29:
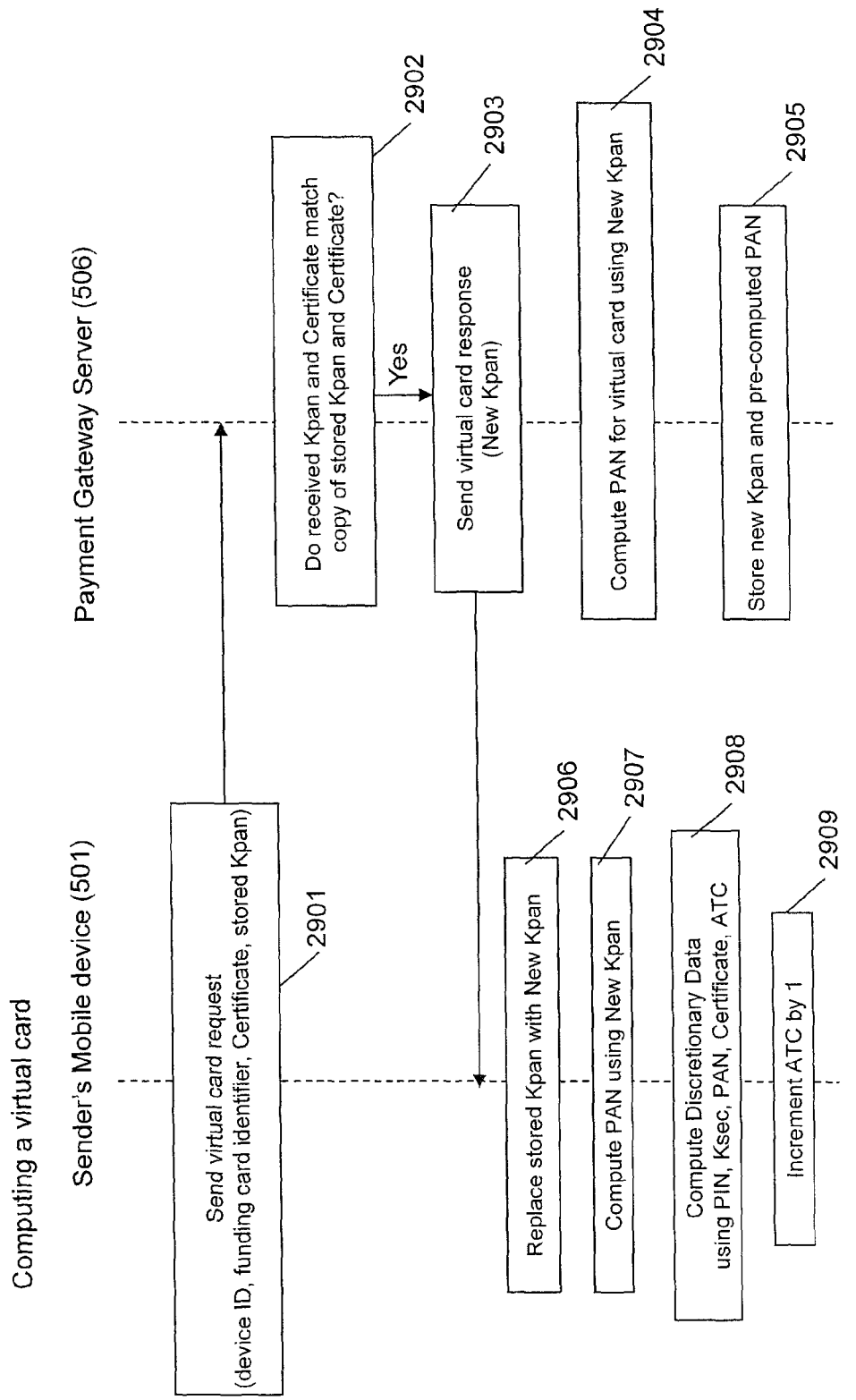
FIG. 29 is a flow diagram of an example embodiment of computer executable or processor implemented instructions for computing virtual card details including a primary account number and discretionary data, using the data exchanged during the registration process of FIG. 28.

Turning to FIG. 29, an example embodiment of computer executable or processor implemented instructions are provided for computing virtual card data. Such an embodiment can be used in combination with the principles described above for computing virtual card data. The sender's mobile device sends a virtual card request to the payment gateway server (block 2901). The request includes the device ID, the funding card identifier, the Certificate and the stored Kpan. The stored Kpan can be from registration or from the previous transaction.

The payment gateway server determines if the received Kpan and Certificate match the Kpan and Certificate stored on the payment gateway server (block 2902) associated with the DeviceID stored in the payment gateway server database. If so, then the payment gateway server sends a virtual card response to the sender's mobile device that includes a new Kpan (block 2903). A new Kpan is used to generate a new or different PAN for each transaction, and to also prevent against replay attacks. The payment gateway server computes the PAN for the virtual card using the new Kpan (block 2904). This new Kpan and the pre-computed PAN are stored by the payment gateway server for later use (block 2905).

After the mobile device receives the new Kpan, it replaces the stored Kpan with the new Kpan (block 2906). It uses the new Kpan to compute a PAN for the virtual card, in the same way the payment gateway server computed the PAN (block 2907). If the conditions and data are correct, although the mobile device computes the PAN independently of the payment gateway server, the PAN computed by the mobile device should be identical to the PAN computed by the payment gateway server.

The mobile device then computes the discretionary data (which is part of the Track Two data) using the PIN, the Ksec, the PAN, the Certificate, and the ATC (block 2908). The ATC and the PAN keep changing with each transaction, which causes the discretionary data to be dynamic data.

The mobile device increments the ATC by 1 (block 2909).

In particular, the PAN is computed by the mobile device and the payment gateway server according to the following:

$$PAN=BIN(6)+SHA256[Kpan](12)+Luhn(1)$$

wherein

BIN(6) is a 6-digit binary number to identify the payment gateway server;

SHA256[Kpan](12) is a 12-digit number generated by taking the sha256 of the Kpan value, further including converting the sha256 value to decimal and truncating to twelve digits from the hash value; and Luhn(1) is a single digit used to ensure the virtual card always passes LUHN algorithm.

The above values are concatenated together to form the PAN. The symbol "+" in the above computation refers to the concatenation operation.

The discretionary data is computed using the following:

$$\text{Discretionary data}=\text{HMAC\_SHA256}[Ksec+PIN,M] \quad (10)$$

where M=concatenation of (PAN, Certificate ID, ATC)

Truncation is performed by encoding the SHA results in decimal, then taking the left most digits. It can be appreciated that SHA256 is a known cryptographic hash function, and HMAC is a hash based message authentication code involving a cryptographic hash function in combination with a secret cryptographic key. The secret cryptographic key of the HMAC function is the concatenated values of Ksec and PIN. The message M is the concatenated values of PAN, Certificate ID and ATC. The Certificate ID is from the Certificate.

Figure 30:
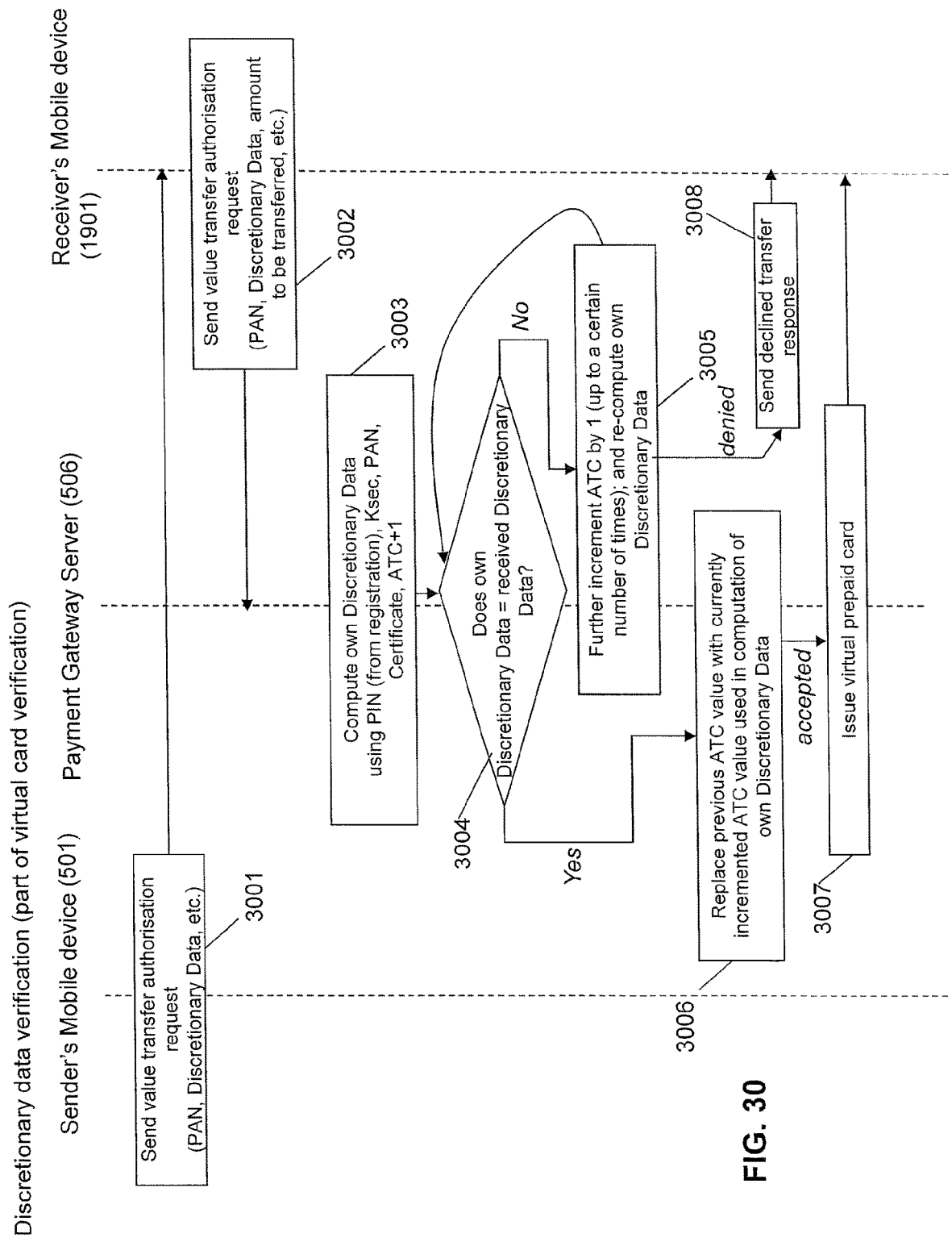
FIG. 30 is a flow diagram of an example embodiment of computer executable or processor implemented instructions for verifying the discretionary data of FIG. 29.

Turning to FIG. 30, an example embodiment of computer executable or processor implemented instructions are provided for verifying virtual card data, and in particular the verification by the payment gateway server of the discretionary data (e.g. the dynamic data). Such an embodiment can be used in combination with the principles described above for verifying the virtual card data. This can be a continuation of the process described in FIG. 26.

The sender's mobile device 501 sends a virtual card to the receiver's mobile device 1901 (block 3001). The receiver's mobile device 1901 then creates and sends a value transfer authorisation request to the payment gateway server 506 (block 3002). The value transfer authorisation request includes, among other things, the PAN and the discretionary data of the virtual card, as computed by the sender's mobile device. It also includes the amount of money or funds to be transferred from the sender to the receiver.

After receiving the request, the payment gateway server 506 uses the PAN to find the relevant stored associated data (e.g. Kpan, Certificate, Ksec, funding card identifier, device ID, and other user data). The relevant stored associated data is identified by the precomputed PAN, which acts as an index. In other words, the received PAN is compared with a number of precomputed PANs, and if a match is found with a given precomputed PAN, then the stored data associated with that given precomputed PAN is considered the relevant stored associated data.

The payment gateway server 506 uses the relevant stored associated data to computes its own discretionary data. This can include using the PIN (received during the user registration process), the stored Ksec, the Certificate ID from the stored Certificate, and an incremented value of the ATC (block 3003).

The computation of the payment gateway's own discretionary data uses the following:

$$\text{Discretionary data}=\text{HMAC\_SHA256}[Ksec+PIN,M] \quad (10)$$

where M=concatenation of (PAN, Certificate ID, (ATC+1))

The ATC+1 represents the incremented ATC value.

The payment gateway server 506 determines if its own discretionary data is equal to the received discretionary data (block 3004). If they are not equal, the payment gateway server further increments ATC by "1" and re-computes its own discretionary data (block 3005). The process returns to block 3004 to check if the discretionary data sets are equal. The process involving block 3005 can be repeated, such so that each time the ATC value is further incremented by 1. This can be done up to a certain number of times (e.g. 10 times), after which the transaction process will be stopped.

If the range of ATC values (e.g. between ATC+1 and ATC+10) does not generate an identical discretionary data set, then the verification is unsuccessful. The range is to account for the possibility that the mobile device's ATC counter may have incremented without the payment gateway server's knowledge. Therefore, a buffer or range or ATC values is used.

If the payment gateway server's own discretionary data is the same as the received discretionary data, then the payment gateway server replaces the previous ATC value with the currently incremented ATC value that is used in the computation of its own discretionary data (block 3006). In this way, the ATC value stored on the payment gateway server should now be equal to the ATC value stored on the mobile device. This leads to the authorisation request being accepted and, accordingly, the payment gateway server issues a virtual prepaid card for the receiver's mobile device (block 1607).

It is noted that if the PIN used by the mobile device to compute the discretionary data is incorrectly entered by the user (e.g. is not the same as the PIN provided at registration), then the discretionary data from the mobile device will not equal the payment gateway server's own discretionary data. This is because the payment gateway server's own discretionary data is computed using the PIN provided at registration. In this way, the PIN provided by the user into the mobile device during each transaction is implicitly verified by the payment gateway server.

Continuing with FIG. 30, after the data is successfully verified or not, the payment gateway server eventually responds to the receiver's mobile device 1901 by sending a response to the receiver's mobile device. The response may indicate that the transfer is declined, or may indicate that a virtual prepaid card has been issued.

In particular, as per block 3005, there is an upper limit of iterations that, when reached, means the discretionary data verification is not successful. If the verification is not successful, then a declined transfer response is sent to the receiver's mobile device 1901 (block 3008). If the verification is successful, as described above, the process to issue a virtual prepaid card is started and delivered to the receiver's mobile device 1901 (block 3007).

It can therefore be appreciated that a sending user can transfer value to a receiving user in various ways, including using a transfer ID or a virtual card. The result of successful transfer is that the receiving user has a prepaid virtual card.

In an example embodiment, after the receiving user receives the prepaid virtual card, the receiving user can use the prepaid virtual card to make a payment with a merchant. For example, the prepaid virtual card can be used to make a payment using a POS terminal 502 or an e-commerce and Internet base interface 1301.

The methods and systems described herein can be used with any type of funding card. The sender's funding cards and the mobile device are pre-registered with the payment gateway server 506. This registration is independent of any particular mobile phone carrier and any particular funding credit card issuer. As a result, no commercial agreement and additional infrastructure are required between a mobile phone carrier and a funding card issuer to facilitate contactless (e.g. NFC) payment using a mobile device. This in turn reduces the cost incurred by the funding card issuer to issue software cards to mobile devices.

In an example embodiment, a method performed by a server for facilitating a party-to-party value transfer is provided. The method includes: receiving a message from a sender's mobile device to transfer a specified amount using a funding card identifier; searching a database of multiple cards associated with the sender's mobile device for funding card details associated with the funding card identifier and amount; generating a transfer ID and associating the transfer ID with the funding card number and the specified amount; sending the transfer ID to the sender's mobile device; receiving a value transfer authorisation request from a receiver's mobile device, the request comprising the transfer ID; identifying the funding card number and authorised amount based on the transfer ID; sending a payment authorisation request to a funding card issuer, the request comprising the funding card number and the specified amount; receiving a payment authorisation response from the funding card issuer; and sending a value transfer authorisation response to the receiver's mobile device.

In an example aspect, the method further includes: if the value transfer authorisation response is positive, creating a prepaid virtual card associated with the receiver's mobile device and having the specified amount.

In another example embodiment, a method performed by a server is provided for facilitating a party-to-party value transfer. The method includes: receiving a message from a sender's mobile device identifying a funding card and amount; searching a database of multiple cards associated with the sender's mobile device for funding card details associated with the identified funding card and amount; computing data for a virtual card, the data comprising a card number and an expiry date; storing the data for the virtual card number in association with the funding card number; sending the data for the virtual card to the sender's mobile device; computing the card details using a PIN as input; receiving a value transfer authorisation request from a receiver's mobile device, the request comprising the data for the virtual card and a requested value transfer amount; retrieving the funding card details based on the data for the virtual card and amount; sending a payment authorisation request to a funding card issuer, the request comprising the funding card number and the requested payment amount; receiving a payment authorisation response from the funding card issuer; and sending a value transfer authorisation response to the receiver's mobile device.

The steps or operations in the flow charts described herein are just for example. There may be many variations to these steps or operations without departing from the spirit of the invention. For instance, the steps may be performed in a differing order, or steps may be added, deleted, or modified.

While the basic principles of this invention has been herein illustrated along with the example embodiments shown, it will be appreciated by those skilled in the art that variations in the disclosed arrangement, both as to its details and the organization of such details, may be made without departing from the spirit and scope thereof. Accordingly, it is intended that the foregoing disclosure and the showings made in the drawings will be considered only as illustrative of the principles of the invention, and not construed in a limiting sense.

The invention claimed is:

1. A method at a payment gateway server, the method comprising:
   prior to executing transactions associated with a mobile device:
      (i) obtaining and storing a personal identification number (PIN), and a set of card data defining a funding card,
      (ii) generating and storing a card identifier corresponding to the funding card, and distinct from the set of card data and from a user identifier associated with the mobile device; and and
      (iii) sending the card identifier to the mobile device;
   receiving, from the mobile device, a transaction request containing the card identifier and excluding the set of card data;
   responsive to receiving the transaction request, generating a first subset of virtual card data defining a virtual funding card, the first subset excluding a dynamic value corresponding to the virtual funding card;
   sending the first subset of virtual card data to the mobile device;
   responsive to sending the first subset of virtual card data, receiving, from a merchant system, (i) the first subset of virtual card data, and (ii) a second subset of virtual card data including a candidate dynamic value generated at the mobile device and presented to the merchant system with the first subset of virtual card data;
   generating the dynamic value using the stored PIN;
   determining whether the candidate dynamic value matches the dynamic value;
   responsive to determining that the candidate dynamic value matches the dynamic value, retrieving the set of card data and sending, to an issuer of the funding card, a payment authorization request containing the set of card data.

2. The method of claim 1, wherein the set of card data includes an expiry date of the funding card; and
   wherein generating the first subset of virtual card data includes generating a virtual expiry date.

3. The method of claim 2, wherein the virtual expiry date is the same as the expiry date of the funding card.

4. The method of claim 2, further comprising:
   generating and storing an internal virtual expiry date distinct from the virtual expiry date, wherein the first subset of the virtual card data sent to the mobile device excludes the internal expiry date;
   responsive to receiving the first subset of virtual card data from the merchant system, verifying that a current date does not exceed the internal expiry date.

5. The method of claim 4, wherein the virtual expiry date exceeds the internal virtual expiry date.

6. The method of claim 4, wherein generating the internal virtual expiry date includes incrementing a date on which the first subset of virtual card data was generated by a predefined number of days.

7. The method of claim 1, further comprising encrypting the first subset of virtual card data prior to sending the first subset of virtual card data to the mobile device.

8. A payment gateway server, comprising:
   one or more data processing apparatus configured to:
      prior to executing transactions ssociated with a mobile device:
         (i) obtain and storing a personal identification number (PIN), and a set of card data defining a funding card, (ii) generate and storing a card identifier corresponding to the funding card, and distinct from the set of card data and from a user identifier associated with the mobile device; and
(iii) send the card identifier to the mobile device;
receive, from the mobile device, a transaction request containing the card identifier and excluding the set of card data;
responsive to receiving the transaction request, generate a first subset of virtual card data defining a virtual funding card, the first subset excluding a dynamic value corresponding to the virtual funding card;
send the first subset of virtual card data to the mobile device;
responsive to sending the first subset of virtual card data, receive, from a merchant system, (i) the first subset of virtual card data, and (ii) a second subset of virtual card data including a candidate dynamic value generated at the mobile device and presented to the merchant system with the first subset of virtual card data;
generate the dynamic value using the stored PIN;
determine whether the candidate dynamic value matches the dynamic value;
responsive to determining that the candidate dynamic value matches the dynamic value, retrieve the set of card data and send, to an issuer of the funding card, a payment authorization request containing the set of card data.

9. The payment gateway server of claim 8, wherein the set of card data includes an expiry date of the funding card; and
wherein generating the first subset of virtual card data includes generating a virtual expiry date.

10. The payment gateway server of claim 9, wherein the virtual expiry date is the same as the expiry date of the funding card.

11. The payment gateway server of claim 9, further comprising:
generating and storing an internal virtual expiry date distinct from the virtual expiry date, wherein the first subset of the virtual card data sent to the mobile device excludes the internal expiry date;
responsive to receiving the first subset of virtual card data from the merchant system, verifying that a current date does not exceed the internal expiry date.

12. The payment gateway server of claim 11, wherein the virtual expiry date exceeds the internal virtual expiry date.

13. The payment gateway server of claim 11, wherein generating the internal virtual expiry date includes incrementing a date on which the first subset of virtual card data was generated by a predefined number of days.

14. The payment gateway server of claim 8, further comprising encrypting the first subset of virtual card data prior to sending the first subset of virtual card data to the mobile device.

* * * * *